United States Patent
Kawamura et al.

(10) Patent No.: US 9,395,520 B2
(45) Date of Patent: Jul. 19, 2016

(54) SINGLE FOCAL LENGTH LENS SYSTEM AND IMAGE PICKUP APPARATUS USING THE SAME

(71) Applicant: OLYMPUS CORPORATION, Tokyo (JP)

(72) Inventors: Kazuteru Kawamura, Tokyo (JP); Takashi Fujikura, Tokyo (JP); Kenichi Nagasawa, Tokyo (JP)

(73) Assignee: Olympus Corporation, Tokyo (JP)

(*) Notice: Subject to any disclaimer, the term of this patent is extended or adjusted under 35 U.S.C. 154(b) by 8 days.

(21) Appl. No.: 14/520,826

(22) Filed: Oct. 22, 2014

(65) Prior Publication Data

US 2015/0109669 A1    Apr. 23, 2015

(30) Foreign Application Priority Data

Oct. 22, 2013 (JP) ................... 2013-219664
Oct. 22, 2013 (JP) ................... 2013-219665

(51) Int. Cl.

| | | |
|---|---|---|
| G02B 13/00 | (2006.01) | |
| G02B 13/02 | (2006.01) | |
| G02B 27/64 | (2006.01) | |
| G02B 9/00 | (2006.01) | |
| G02B 9/04 | (2006.01) | |
| G02B 13/16 | (2006.01) | |

(52) U.S. Cl.
CPC   *G02B 13/02* (2013.01); *G02B 9/00* (2013.01); *G02B 9/04* (2013.01); *G02B 13/16* (2013.01); *G02B 27/646* (2013.01)

(58) Field of Classification Search
CPC ........ G02B 13/02; G02B 13/16; G02B 27/64; G02B 27/646; G02B 9/00; G02B 9/04
USPC ................................... 359/554, 557
See application file for complete search history.

(56) References Cited

U.S. PATENT DOCUMENTS

| | | | | |
|---|---|---|---|---|
| 6,384,975 B1 * | 5/2002 | Hayakawa | ........... | G02B 27/646 359/557 |
| 6,618,197 B1 * | 9/2003 | Hayakawa | ............... | G02B 9/60 359/557 |
| 8,730,593 B2 * | 5/2014 | Eguchi | ................... | G02B 13/02 359/557 |

(Continued)

FOREIGN PATENT DOCUMENTS

| | | |
|---|---|---|
| JP | 11-160617 | 6/1999 |
| JP | 2007-322986 | 12/2007 |
| JP | 2008-145584 | 6/2008 |

*Primary Examiner* — Bumsuk Won
*Assistant Examiner* — William R Alexander
(74) *Attorney, Agent, or Firm* — Kenyon & Kenyon LLP

(57) ABSTRACT

A single focal length lens system includes in order from an object side to an image side along an optical axis, a front lens unit, and a rear lens unit which includes an aperture stop. The single focal length lens system does not include any other lens unit on the optical axis, and the rear lens unit includes a focusing lens unit having a negative refractive power. The focusing lens unit is disposed on the image side of the aperture stop, and moves along the optical axis at the time of focusing from an object at infinity to an object at a close distance. The front lens unit does not include a lens which moves in an optical axial direction, and the rear lens unit does not include a lens which moves in the optical axial direction except at the time of focusing.

65 Claims, 15 Drawing Sheets

(56) References Cited

U.S. PATENT DOCUMENTS

| | | | | |
|---|---|---|---|---|
| 8,873,154 B2* | 10/2014 | Takemoto | ............... | G02B 15/12 359/672 |
| 2009/0273845 A1* | 11/2009 | Maetaki | ............... | G02B 1/00 359/676 |
| 2012/0050892 A1* | 3/2012 | Lai | ............... | G02B 13/0045 359/786 |
| 2012/0092779 A1* | 4/2012 | Maetaki | ............... | G02B 13/02 359/716 |
| 2013/0194487 A1* | 8/2013 | Eguchi | ............... | G02B 13/02 348/360 |

* cited by examiner

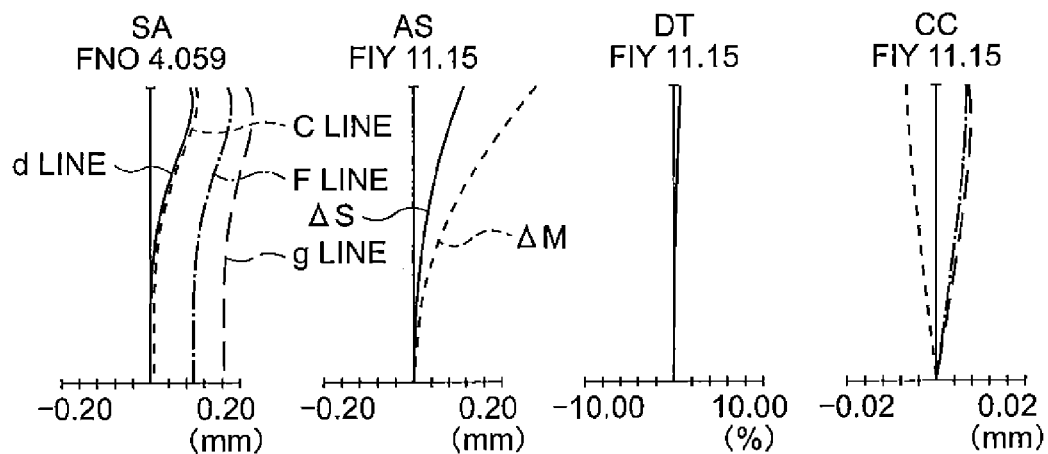
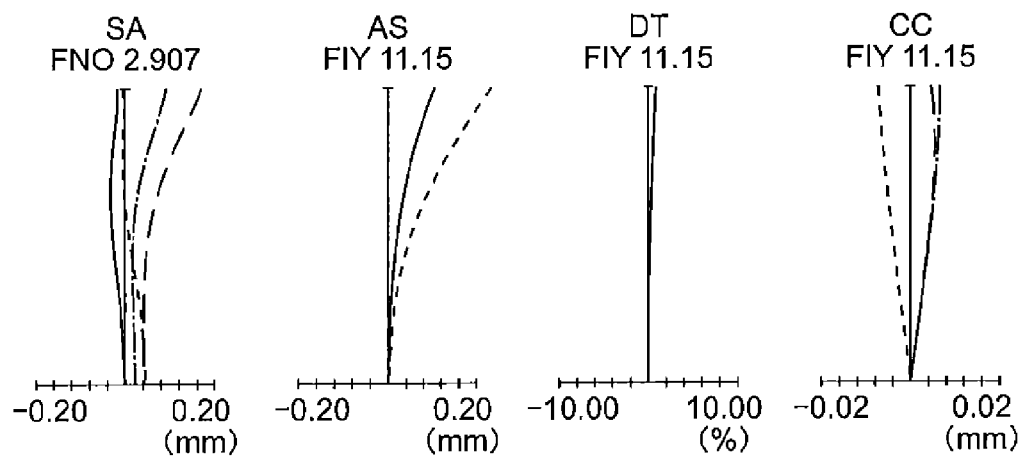

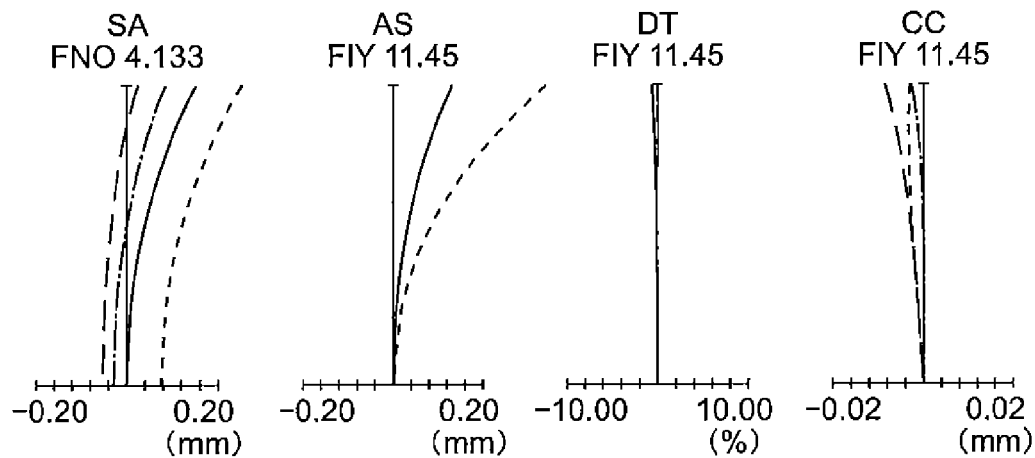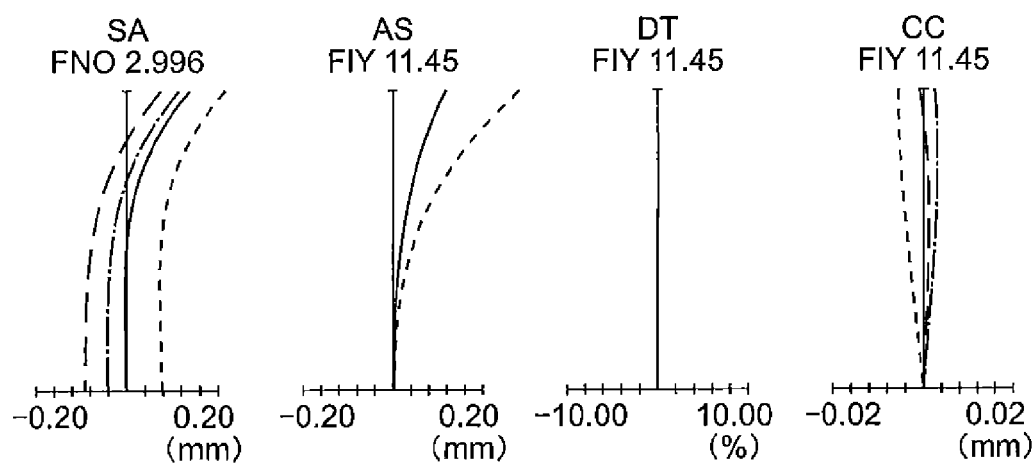

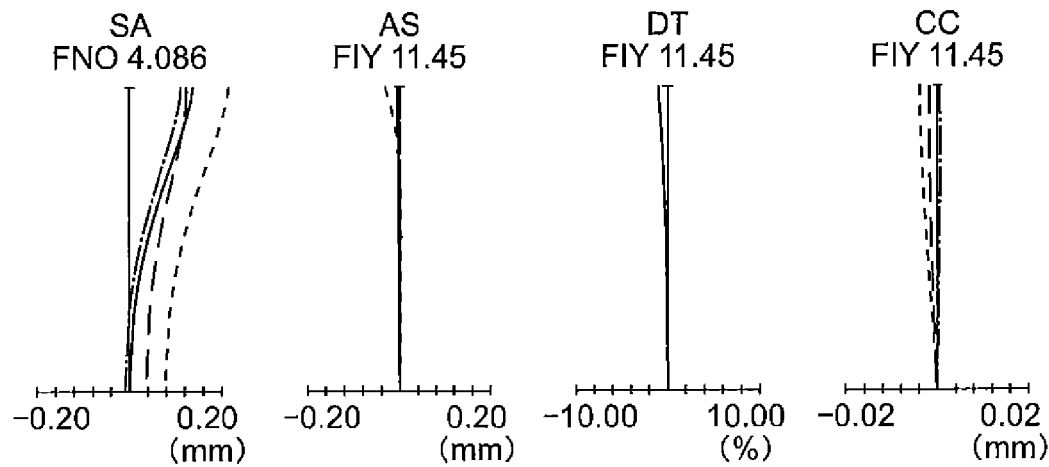
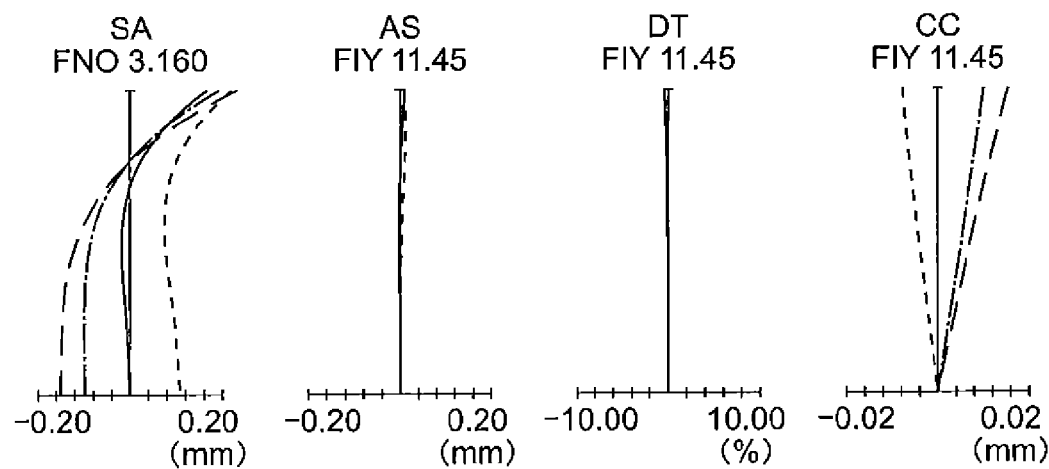

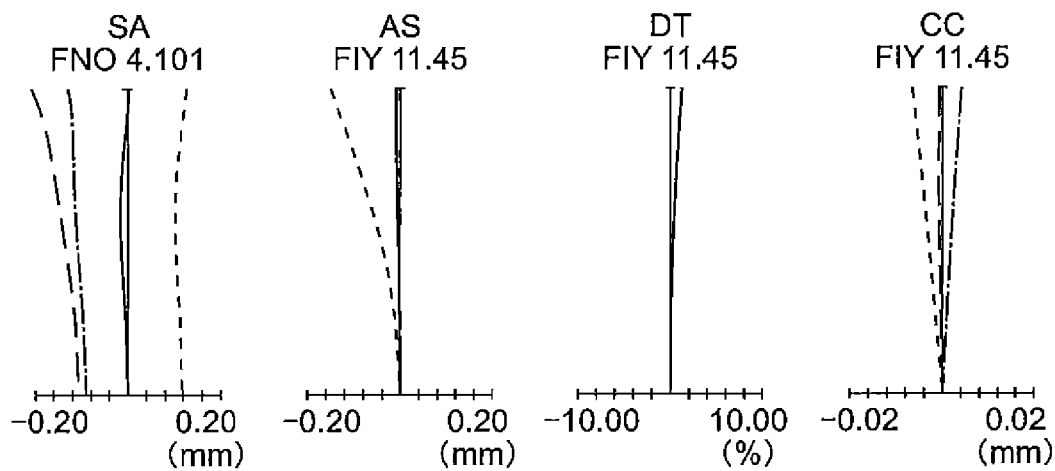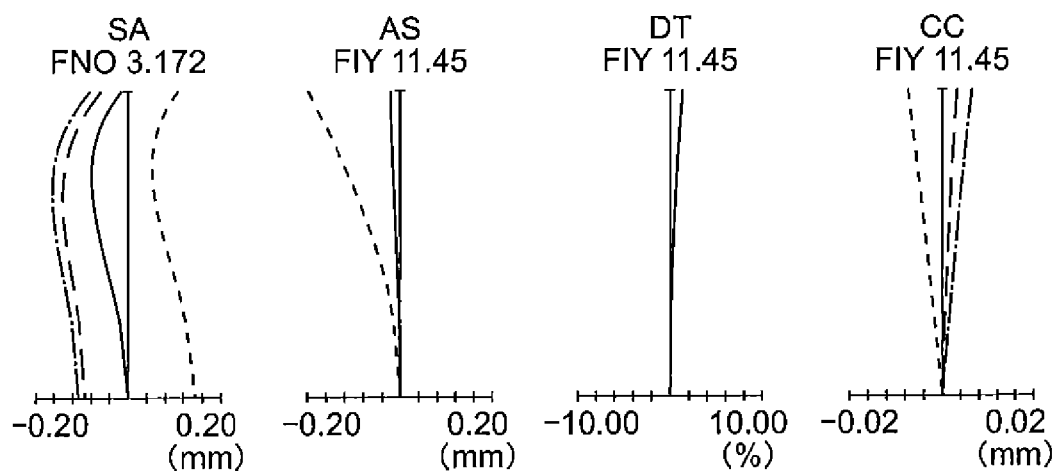

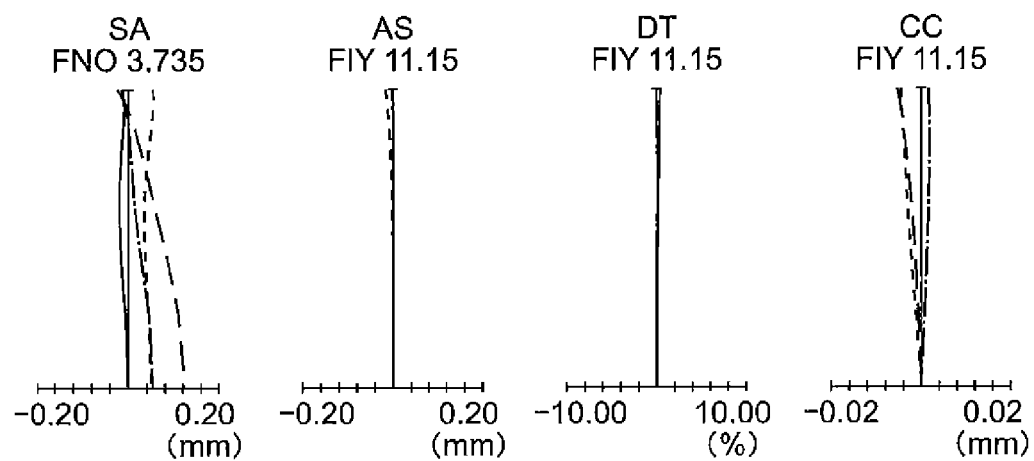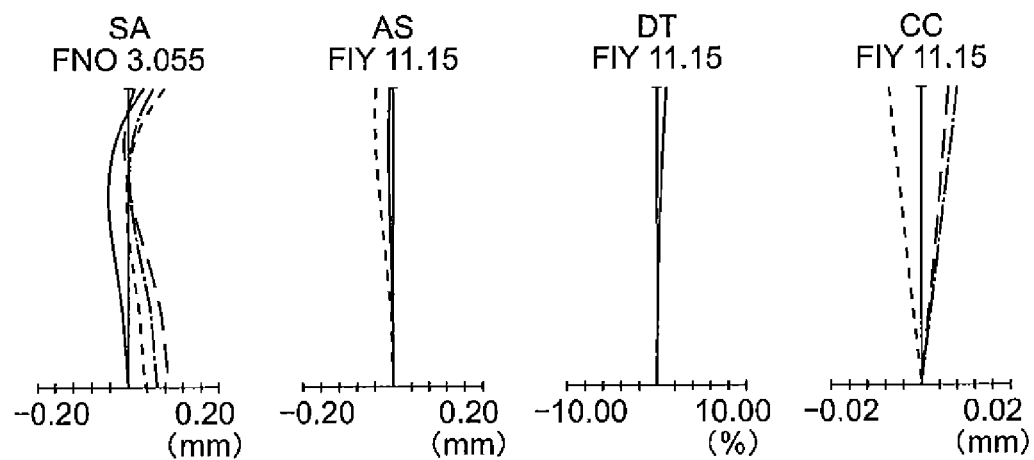

SINGLE FOCAL LENGTH LENS SYSTEM AND IMAGE PICKUP APPARATUS USING THE SAME

CROSS-REFERENCE TO RELATED APPLICATION

The present application is based upon and claims the benefit of priority from the prior Japanese Patent Application Nos. 2013-219664 filed on Oct. 22, 2013, 2013-219665 filed on Oct. 22, 2013; the entire contents of which are incorporated herein by reference.

BACKGROUND OF THE INVENTION

1. Field of the Invention

The present invention relates to a single focal length lens system and an image pickup apparatus using the same.

2. Description of the Related Art

In a photography in which, a telephoto lens or an ultra-telephoto lens (hereinafter, appropriately let to be telephoto lens) is used, an effect of drawing a distant object or a small object in front of an eye of a photographer is achieved. Therefore, the telephoto lens has widely been used in photography of various scenes such as photography of sport scenes, photography of wild animals such as wild birds, and photography of astronomical bodies.

As a telephoto lens to be used for photography of such scenes, telephoto lenses disclosed in Japanese Patent Application Laid-open Publication Nos. 2008-145584 and Hei 11-160617 are available.

In the photography of abovementioned scenes, relative merits of mobility of an image pickup apparatus become important. Here, the mobility refers to an ease of carrying, a stability at the time of hand-held photography, and a rapidity of focusing speed. For making the mobility of an apparatus superior, an optical system having a small size and light weight is desirable. Moreover, a feature that an optical system is capable of focusing an object rapidly is an important feature that decides the relative merits of mobility.

SUMMARY OF THE INVENTION

A single focal length lens system according to the present invention includes in order from an object side to an image side along an optical axis, a front lens unit, and a rear lens unit which includes an aperture stop, and the single focal length lens system does not include any other lens unit on the optical axis, and the rear lens unit includes a focusing lens unit having a negative refractive power, and the focusing lens unit is disposed on the image side of the aperture stop, and moves along the optical axis at the time of focusing from an object at infinity to an object at a close distance, and the front lens unit does not include a lens which moves in an optical axial direction, and the rear lens unit does not include a lens which moves in the optical axial direction except at the time of focusing.

Moreover, another single focal length lens system according to the present invention includes in order from an object side to an image side along an optical axis, a front lens unit, and a rear lens unit, and the single focal length lens system does not include any other lens unit on the optical axis, and the front lens unit includes in order from the object side to the image side, a first lens unit having a positive refractive power, and a second lens unit having a negative refractive power, and the rear lens unit includes a focusing lens unit, and the focusing lens unit moves along the optical axis at the time of focusing from an object at infinity to an object at a close distance, and the front lens unit does not include a lens which moves in the optical axial direction, and the rear lens unit does not include a lens which moves in the optical axial direction except at the time of focusing.

Moreover, an image pickup apparatus according to the present invention includes;

an optical system, and an image pickup element which has an image pickup surface, and which converts an image formed on the image pickup surface by the optical system to an electric signal, wherein the optical system is one of the abovementioned single focal length lens systems.

BRIEF DESCRIPTION OF THE DRAWINGS

FIG. 1A is a lens cross-sectional view of a single focal length lens system according to an example 1, and FIG. 1B is a lens cross-sectional view of a single focal length lens system according to an example 2;

FIG. 2A is a lens cross-sectional view of a single focal length lens system according to an example 3, and FIG. 2B is a lens cross-sectional view of a single focal length lens system according to an example 4;

FIG. 3A is a lens cross-sectional view of a single focal length lens system according to an example 5, and FIG. 3B is a lens cross-sectional view of a single focal length lens system according to an example 6;

FIG. 5A, FIG. 5B, FIG. 5C, and FIG. 5D are aberration diagrams at the time of focusing at an object at infinity of the single focal length lens system according to the example 1, and FIG. 5E, FIG. 5F, FIG. 5G, and FIG. 5H are aberration diagrams at the time of focusing at an object at a close distance of the single focal length lens system according to the example 1;

FIG. 7A, FIG. 7B, FIG. 7C, and FIG. 7D are aberration diagrams at the time of focusing at an object at infinity of the single focal length lens system according to the example 3, and FIG. 7E, FIG. 7F, FIG. 7G, and FIG. 7H are aberration diagrams at the time of focusing at an object at a close distance of the single focal length lens system according to the example 3;

FIG. 8A, FIG. 8B, FIG. 8C, and FIG. 8D are aberration diagrams at the time of focusing at an object at infinity of the single focal length lens system according to the example 4, and FIG. 8E, FIG. 8F, FIG. 8G, and FIG. 8H are aberration diagrams at the time of focusing at an object at a close distance of the single focal length lens system according to the example 4;

FIG. 9A, FIG. 9B, FIG. 9C, and FIG. 9D are aberration diagrams at the time of focusing at an object at infinity of the single focal length lens system according to the example 5, and FIG. 9E, FIG. 9F, FIG. 9G, and FIG. 9H are aberration diagrams at the time of focusing at an object at a close distance of the single focal length lens system according to the example 5;

FIG. 11A, FIG. 11B, FIG. 11C, and FIG. 11D are aberration diagrams at the time of focusing at an object at infinity of the single focal length lens system according to the example 7, and FIG. 11E, FIG. 11F, FIG. 11G, and FIG. 11H are aberration diagrams at the time of focusing at an object at a close distance of the single focal length lens system according to the example 7;

DETAILED DESCRIPTION OF THE INVENTION

Figure 1A:
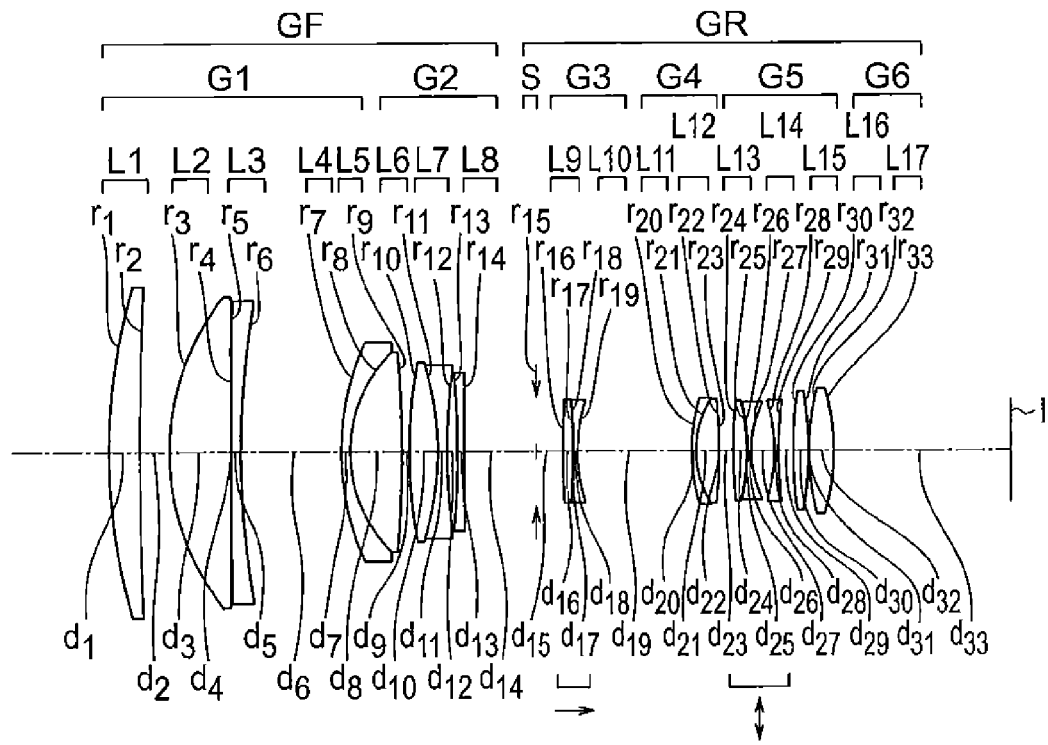
FIG. 1A and FIG. 1B are lens cross-sectional views at the time of focusing at an object at infinity of a single focal length lens systems according to the present invention, where.

Exemplary embodiments and examples of a single focal length lens system and an image pickup apparatus using the same according to the present invention will be described below in detail by referring to the accompanying diagrams. However, the present invention is not restricted to the embodiments and the examples described below.

Prior to the description of the single focal length lens system according to the present embodiment, a basic arrangement of the single focal length lens system of the present embodiment will be described below. Moreover, in the following description, the 'single focal length lens system' is appropriately called as a 'lens system'.

In a first basic arrangement, the lens system includes in order from an object side to an image side along an optical axis, a front lens unit, and a rear lens unit which includes an aperture stop, and the lens system does not include any other lens unit on the optical axis, and the rear lens unit includes a focusing lens unit having a negative refractive power, and the focusing lens unit is disposed on the image side of the aperture stop, and moves along the optical axis at the time of focusing from an object at infinity to an object at a close distance, and the front lens unit does not include a lens which moves in the optical axial direction, and the rear lens unit does not include a lens which moves in the optical axial direction except at the time of focusing.

As aforementioned, the lens system includes in order from the object side to the image side, the front lens unit, and the rear lens unit including the aperture stop. Here, the lens system does not include any other lens unit on the optical axis, or in other words, the lens system does not include a lens unit other than the front lens unit and the rear lens unit. Therefore, the lens units disposed on the optical axis are the front lens unit and the rear lens unit only. A cover glass and various optical filters, not being lens units, may be disposed on the optical axis (in an optical path).

By the rear lens unit including the aperture stop, the rear lens unit having the aperture stop is disposed on the image side of the front lens unit. By making such an arrangement, it is possible to make a diameter of the rear lens unit small. Moreover, by carrying out focusing by lenses (a lens unit) in the rear lens unit, it is possible to make a diameter of a focusing unit extremely small.

Moreover, an arrangement may be such that the aperture stop is independent of the rear lens unit. Even in this case, the rear lens unit including the aperture stop is disposed on the image side of the front lens unit. Therefore, it is possible to make the diameter of the rear lens unit small. Moreover, by carrying out focusing by the lenses (lens unit) in the rear lens unit, it is possible to make the diameter of the focusing unit extremely small.

For shortening the overall length of the lens system, it is necessary to arrange the lens system to include a telephoto arrangement, as well as to enhance an effect attributed to the telephoto arrangement (hereinafter, appropriately referred to as 'effect due to the telephoto arrangement'). For enhancing the effect due to the telephoto arrangement, it is preferable to dispose a lens unit having a positive refractive power nearest to the object, and to dispose a lens unit having a negative refractive power on the image side thereof. By making such an arrangement, correction of a spherical aberration, a coma, and an astigmatism becomes possible mainly, while enhancing the effect due to the telephoto arrangement.

Here, the rear lens unit includes the focusing lens unit having a negative refractive power. Therefore, by letting the refractive power of the front lens unit to be a positive refractive power, and making the positive refractive power large, it is possible to enhance the effect due to the telephoto arrangement. As a result, it is possible to shorten the overall length of the lens system.

Moreover, the focusing lens unit is disposed on the image side of the aperture stop, and the focusing lens unit moves along the optical axis at the time of focusing from an object at infinity to an object at a close distance. By making such an arrangement, it is possible to carry out focusing by the rear lens unit. As a result, it is possible to make a diameter of the focusing lens unit small. Moreover, since it is possible to make the diameter of the focusing lens unit small, it is also possible to make the diameter of the focusing unit (an arrangement including the focusing lens unit and a moving mechanism) extremely small. Although it is preferable that there is at least one focusing lens unit, there may be a plurality of focusing lens units.

Moreover, by making the refractive power of the focusing lens unit large, it is possible to enhance the effect due to the telephoto arrangement. Accordingly, since also a magnification of the focusing lens unit is enhanced, it is possible to improve a focusing sensitivity. Such improvement can be realized easily by disposing the focusing lens unit in the rear lens unit of which, the diameter can be made small. Accordingly, since it is possible to make the focusing lens unit light-weight, as well as to make an amount of movement of the focusing lens unit at the time of focusing small, it is possible to make a focusing speed high.

Moreover, the front lens unit does not include a lens which moves in the optical axial direction. In other words, the front lens unit is stationary all the time. In a case in which, the front lens unit does not include a lens which moves in the optical axial direction, even if the refractive power of the front lens unit is made large, by enhancing an effect of aberration correction of each lens in the front lens unit, it is possible to correct favorably the spherical aberration, the coma, and the astigmatism in the front lens unit. Furthermore, since correction of the aberrations in the front lens unit is made favorably, it is possible to reduce a proportion of load of aberration correction in the rear lens unit. As a result, the effect due to the telephoto arrangement is enhanced by making the refractive power of the focusing lens unit large, while an imaging performance is maintained to be favorable.

Meanwhile, when an attempt is made to carry out focusing, zooming, or image stabilization by a lens in the front lens unit, a lens in the front lens unit is to be moved. If a lens in the front lens unit is moved, the spherical aberration, the coma, and the astigmatism occur substantially with the movement of the lens.

Moreover, since a light ray height being high in the front lens unit, an amount of occurrence of the aberrations becomes large as compared to an amount of occurrence of aberrations in the rear lens unit. Accordingly, if a lens in the front lens unit is moved, the imaging performance is degraded. For preventing degradation of the imaging performance, it is necessary to reduce the occurrence of (fluctuation in) these aberrations.

Thus, if an attempt is made to move a lens in the front lens unit, it is necessary to achieve both of maintaining the effect due to the telephoto arrangement and an aberration correction in the front lens unit. Therefore, by not disposing a lens which moves in the front lens unit, a proportion of load of aberration correction in the front lens unit is reduced. As a result, even in a case in which, the refractive power of the front lens unit is let to be a positive refractive power, and the positive refractive power is made large, it is possible to enhance further the effect due to the telephoto arrangement by a combination of a lens unit having a negative refractive power in the rear lens unit.

Moreover, the rear lens unit does not include a lens which moves in the optical axial direction except at the time of focusing. By making such an arrangement, it is possible to simplify the arrangement of the rear lens unit.

A single focal length lens system according to a 1-1$^{th}$ embodiment will be described below. The single focal length lens system according to the 1-1$^{th}$ embodiment includes in order from an object side to an image side along an optical axis, a front lens unit, and a rear lens unit which includes an aperture stop, and the single focal length lens system does not include any other lens unit on the optical axis, and the rear lens unit includes a focusing lens unit having a negative refractive power, and the focusing lens unit is disposed on the image side of the aperture stop, and moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and the rear lens unit includes an image-side lens unit having a positive refractive power, and the image-side lens unit is disposed on the image side of the focusing lens unit, and includes at least a positive lens and a negative lens, and the following conditional expression (1) is satisfied:

$$0.06 < |f_{fo}/f| < 0.4 \quad (1)$$

where,
f denotes a focal length of the single focal length lens system at the time of focusing at an object at infinity, and
$f_{fo}$ denotes a focal length of the focusing lens unit.

In the lens system according to the 1-1$^{th}$ embodiment, in addition to having the abovementioned first basic arrangement, the rear lens unit includes the image-side lens unit having a positive refractive power, and the image-side lens unit is disposed on the image side of the focusing lens unit, and includes at least the positive lens and the negative lens, and conditional expression (1) is satisfied.

In the lens system according to the present embodiment, the rear lens unit includes the image-side lens unit having a positive refractive power, and the image-side lens unit is disposed on the image side of the focusing lens unit, and includes the positive lens and the negative lens.

By disposing the image-side lens unit having a positive refractive power on the image side of the focusing lens unit, since a magnification of the focusing lens unit is enhanced, it is possible to improve the focusing sensitivity. Accordingly, since it is possible to reduce the amount of movement of the focusing lens unit at the time of focusing, it is possible to make the focusing speed high. Moreover, by the image-side lens unit including the positive lens and the negative lens, it is possible to suppress an occurrence of a chromatic aberration in the image-side lens unit. As a result, it is possible to make small a fluctuation in the chromatic aberration at the time of focusing.

When falling below a lower limit value of conditional expression (1), the refractive power of the focusing lens unit becomes excessively large. In this case, at the time of focusing, since an amount of the spherical aberration that occurs (amount of fluctuation in the spherical aberration that occurs) becomes large mainly, a favorable imaging performance cannot be achieved at the time of focusing. Moreover, since a reduction in the spherical aberration leads to an increase in the number of lenses, it becomes difficult to make the focusing unit light-weight.

When exceeding an upper limit value of conditional expression (1), the amount of movement of the focusing lens unit at the time of focusing increases. Therefore, when an attempt is made to secure a space necessary for the movement of the focusing lens unit, shortening the overall length of the lens system becomes difficult. Moreover, for improving the focusing sensitivity, it is necessary to make the positive refractive power of the front lens unit large. In this case, in the front lens unit, since the spherical aberration, the coma, and the astigmatism increase, a favorable imaging performance cannot be achieved in the overall focusing range.

A single focal length lens system according to a 1-2$^{th}$ embodiment will be described below. The single focal length lens system according to the 1-2$^{th}$ embodiment includes in order from an object side to an image side along an optical axis, a front lens unit having a positive refractive power, and a rear lens unit which includes an aperture stop, and the single focal length lens system does not include any other lens unit on the optical axis, and the rear lens unit includes a focusing lens unit having a negative refractive power, and the focusing lens unit is disposed on the image side of the aperture stop, and moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and the following conditional expression (1) is satisfied, and the rear lens unit includes an image-side lens unit having a positive refractive power, and the image-side lens unit is disposed on the image side of the focusing lens unit, and the image-side lens unit satisfies the following conditional expression (3):

$$0.06 < |f_{fo}/f| < 0.4 \quad (1)$$

$$0.07 < f_{R2}/f < 0.7 \quad (3)$$

where, $f_{fo}$ denotes a focal length of the focusing lens unit, f denotes a focal length of the single focal length lens system at the time of focusing at an object at infinity, and $f_{R2}$ denotes a focal length of the image-side lens unit.

The lens system according to the 1-2$^{th}$ embodiment, in addition to having the abovementioned first basic arrangement, the conditional expression (1) is satisfied, and the rear lens unit includes the image-side lens unit having a positive refractive power, and the image-side lens unit is disposed on the image side of the focusing lens unit, and the image-side lens unit satisfies conditional expression (3).

A technical significance of conditional expression (1) being already explained, will not be described.

By disposing the image-side lens unit having a positive refractive power on the image side of the focusing lens unit, since the magnification of the focusing lens unit is enhanced, it is possible to improve the focusing sensitivity. Accordingly, since it is possible to reduce the amount of movement of the focusing lens unit at the time of focusing, it is possible to make a focusing speed high.

Moreover, in a case in which, a plurality of lens units having a positive refractive power is disposed on the image side of the focusing lens unit, each of the plurality of lens units having a positive refractive power can be deemed as an image-side lens unit. However, one lens unit from among the plurality of lens units having a positive refractive power may be let to be the image-side lens unit. In this case, it is preferable that, from among the plurality of lens unit having a positive refractive power, a lens unit positioned nearest to the focusing lens unit is the image-side lens unit.

When falling below a lower limit value of conditional expression (3), the magnification of the focusing lens unit is enhanced, but the number of lenses in the image-side lens unit increases. Falling below the lower limit value of conditional expression (3) leads to an increase in a weight of the image-side lens unit.

When exceeding an upper limit value of conditional expression (3), since it is not possible to enhance the magnification of the focusing lens unit, the amount of movement of the focusing lens unit at the time of focusing increases. As a result, small-sizing of the focusing unit becomes difficult.

Moreover, in a case in which, a plurality of lens units having a positive refractive power is disposed on the image side of the focusing lens unit, each of the plurality of lens units having the positive refractive power can be deemed as the image-side lens unit. In this case, it is preferable that, from among the plurality of lens units having a positive refractive power, at least a lens unit having a positive refractive power positioned nearest to the focusing lens unit is the image-side lens unit which satisfies conditional expression (3).

A single focal length lens system according to a 1-3$^{th}$ embodiment will be described below. The single focal length lens system according to the 1-3$^{th}$ embodiment includes in order from an object side to an image side along an optical axis, a front lens unit having a positive refractive power, and a rear lens unit which includes an aperture stop, and the single focal length lens system does not include any other lens unit on the optical axis, and the rear lens unit includes a focusing lens unit having a negative refractive power, and the focusing lens unit is disposed on the image side of the aperture stop, and moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and the front lens unit includes in order from the object side to the image side, a first lens unit having a positive refractive power, and a second lens unit having a negative refractive power including a positive lens and a negative lens, and the following conditional expression (2) is satisfied:

$$-2.0 < f_{G2}/f < -0.08 \quad (2)$$

where, f denotes a focal length of the single focal length lens system at the time of focusing at an object at infinity, and $f_{G2}$ denotes a focal length of the second lens unit.

In the lens system according to the 1-3$^{th}$ embodiment, in addition to the abovementioned first basic arrangement, the front lens unit has a positive refractive power, and includes in order from the object side to the image side, the first lens unit having a positive refractive power, and the second lens unit having a negative refractive power including the positive lens and the negative lens, and conditional expression (2) is satisfied.

In the lens system according to the present embodiment, the front lens unit has a positive refractive power.

In the front lens unit, it is desirable to impart a positive refractive power to the overall front lens unit while enhancing an effect due to the telephoto arrangement. Accordingly, since it is possible to reduce a proportion of load of the refractive power in the rear lens unit, it is possible to shorten the overall length of the lens system as well as to reduce an aberration which occurs in the rear lens unit. As a result, it is possible to secure a favorable imaging performance.

Moreover, by the front lens unit having a positive refractive power, light emerged from the front lens unit becomes convergent light, and the convergent light is guided to the rear lens unit including the aperture stop. As a result, it is possible to make a lens diameter small in lens units on the image side of the aperture stop, in the rear lens unit in particular.

Here, the front lens unit includes in order from the object side to the image side, the first lens unit having a positive refractive power and the second lens unit having a negative refractive power. Therefore, even in the lens system according to the present embodiment, since the effect due to the telephoto arrangement is enhanced, it is possible to shorten the overall length of the lens system. Moreover, by making such an arrangement, it is possible to correct mainly the spherical aberration, the coma, and the astigmatism favorably, while enhancing the effect due to the telephoto arrangement.

Moreover, by the second lens unit including the positive lens and the negative lens, it is possible to enhance an effect of correction of a chromatic aberration in the front lens unit. Therefore, even when the effect due to the telephoto arrangement is enhanced, it is possible to achieve a favorable imaging performance.

When falling below a lower limit value of conditional expression (2), since the effect due to the telephoto arrangement becomes weak, shortening the overall length of the lens system becomes difficult. When an attempt is made to shorten the overall length of the lens system in a state of falling below the lower limit value of conditional expression (2), it is necessary to make the negative refractive power of the focusing lens unit large. However, if the negative refractive power of the focusing lens unit is made large, a fluctuation in aberration at the time of focusing becomes large. Or, since the number of lenses in the focusing lens unit increases, it becomes difficult to make the focusing unit light-weight.

When exceeding an upper limit value of conditional expression (2), the refractive power of the second lens unit becomes excessively large. When an attempt is made to secure a favorable imaging performance in a state of the refractive power of the second lens unit large, the number of lenses in the front lens unit having a large aperture becomes large. Thus, exceeding the upper limit value of conditional expression (2) leads to an increase in weight of the front lens unit.

Next, a second basic arrangement of the single focal length lens system according to the present embodiment will be described below.

In the second basic arrangement, the lens system includes in order from an object side to an image side along an optical axis, a front lens unit and a rear lens unit, and the lens system does not include any other lens unit on the optical axis, and the front lens unit includes in order from the object side to the image side, a first lens unit having a positive refractive power and a second lens unit having a negative refractive power, and the rear lens unit includes a focusing lens unit, and the focusing lens unit moves along the optical axis at the time of focusing from an object at infinity to an object at a close distance, and the front lens unit does not include a lens which moves in an optical axial direction, and the rear lens unit does not include a lens which moves in the optical axial direction except at the time of focusing.

In the following description, since an arrangement which is same as the first basic arrangement and/or the arrangement in the embodiments from the 1-1$^{th}$ embodiment to the 1-3$^{th}$ embodiment has a similar technical significance, the description of such arrangement is omitted.

Moreover, the focusing lens unit is disposed in the rear lens unit, and the focusing lens unit is moved along the optical axis at the time of focusing from an object at infinity to an object at a close distance. By making such an arrangement, it is possible to carry out focusing by the rear lens unit. As a result, it is possible to make a diameter of the focusing lens unit small. Moreover, since it is possible to make the diameter of the focusing lens unit small, it is also possible to make the diameter of the focusing unit (the arrangement including the focusing lens unit and the moving mechanism) extremely small. Although it is preferable that there is at least one focusing lens unit, there may be a plurality of focusing lens units.

Moreover, if an attempt is made to move a lens in the front lens unit, it is necessary to achieve both of maintaining the effect due to the telephoto arrangement and an aberration correction in the front lens unit. Therefore, by not disposing a lens that moves in the front lens unit, a proportion of load of aberration correction in the front lens unit is reduced. As a result, in the front lens unit, it is possible to enhance the effect due to the telephoto arrangement.

A single focal length lens system according to a 2-1$^{th}$ embodiment will be described below. The single focal length lens system according to the 2-1$^{th}$ embodiment includes in order from an object side to an image side along an optical axis, a front lens unit and a rear lens unit, and the single focal length lens system does not include any other lens unit on the optical axis, and the front lens unit includes in order from the object side to the image side, a first lens unit having a positive refractive power and a second lens unit having a negative refractive power, and the rear lens unit includes a focusing lens unit, and the focusing lens unit moves along the optical axis at the time of focusing from an object at infinity to an object at a close distance, and the front lens unit does not include a lens which moves in the optical axial direction, and the rear lens unit does not include a lens which moves in the optical axial direction except at the time of focusing, and the rear lens unit includes an aperture stop, and also includes a first predetermined lens unit, and the first predetermined lens unit has a refractive power having a sign different from a sign of a refractive power of the focusing lens unit, and does not move in the optical axial direction at the time of focusing, and the following conditional expressions (18) and (7) are satisfied:

$$0.4 < D_{G1img}/f < 1.3 \tag{18}$$

$$0.31 < |f_{G1}/f_{G2}| < 3.0 \tag{7}$$

where, $D_{G1img}$ denotes a distance along the optical axis from an object-side lens surface of the first lens unit up to the image plane at the time of focusing at an object at infinity, f denotes the focal length of the single focal length lens system at the time of focusing at an object at infinity, $f_{G1}$ denotes a focal length of the first lens unit, and $f_{G2}$ denotes a focal length of the second lens unit.

In the lens system according to the 2-1$^{th}$ embodiment, in addition to having the abovementioned second basic arrangement, the rear lens unit includes the aperture stop and also includes the first predetermined lens unit. Moreover, the first predetermined lens unit has a refractive power having a sign different from a sign of a refractive power of the focusing lens unit, and does not move in the optical axial direction at the time of focusing. Furthermore, in the lens system according to the 2-1$^{th}$ embodiment, conditional expressions (18) and (7) are satisfied.

Moreover, the rear lens unit includes the first predetermined lens unit. Here, the first predetermined lens unit has a refractive power having a sign different from a sign of the refractive power of the focusing lens unit. For instance, in a case in which, the refractive power of the focusing lens unit is a negative refractive power, the refractive power of the first predetermined lens unit is a positive refractive power. By disposing the first predetermined lens unit in the rear lens unit, it is possible to enhance the magnification of the focusing lens unit. As a result, it is possible to reduce an amount of movement of the focusing lens unit at the time of focusing.

Moreover, the first predetermined lens unit does not move in the optical axial direction at the time of focusing. In other words, the first predetermined lens unit is stationary at the time of focusing. By making such an arrangement, it is possible to reduce the number of lens units which move at the time of focusing.

A technical significance of conditional expressions (18) and (7) will be described later.

A single focal length lens system according to a 2-2$^{th}$ embodiment includes in order from an object side to an image side along an optical axis, a front lens unit and a rear lens unit, and the single focal length lens system does not include any other lens unit on the optical axis, and the front lens unit includes in order from the object side to the image side, a first lens unit having a positive refractive power and a second lens unit having a negative refractive power, and the rear lens unit includes a focusing lens unit, and the focusing lens unit moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and the rear lens unit includes an aperture stop, and also includes a first predetermined lens unit, and the first predetermined lens unit has a refractive power having a sign different from a sign of a refractive power of the focusing lens unit, and does not move in the optical axial direction at the time of focusing, and the following conditional expressions (18) and (1) are satisfied:

$$0.4 < D_{G1img}/f < 1.3 \quad (18)$$

$$0.06 < |f_{fo}/f| < 0.4 \quad (1)$$

where, $D_{G1img}$ denotes a distance along the optical axis from an object-side lens surface of the first lens unit up to an image plane at the time of focusing at an object at infinity, f denotes a focal length of the single focal length lens system at the time of focusing at an object at infinity, and $f_{fo}$ denotes a focal length of the focusing lens unit.

In the lens system according to the 2-2$^{th}$ embodiment, in addition to having the abovementioned second basic arrangement, the rear lens unit includes the aperture stop and also includes the first predetermined lens unit. Moreover, the first predetermined lens unit has a refractive power having a sign different from a sign of a refractive power of the focusing lens unit, and does not move in the optical axial direction at the time of focusing. Furthermore, in the lens system according to the 2-2$^{th}$ embodiment, conditional expressions (18) and (1) are satisfied.

A single focal length lens system according to a 2-3$^{th}$ embodiment includes in order from an object side to an image side along an optical axis, a front lens unit and a rear lens unit, and the single focal length lens system does not include any other lens unit on the optical axis, and the front lens unit includes in order from the object side to the image side, a first lens unit having a positive refractive power and a second lens unit having a negative refractive power, and the rear lens unit includes a focusing lens unit, and the focusing lens unit moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and the rear lens unit includes an aperture stop, and also includes a first predetermined lens unit, and the first predetermined lens unit has a refractive power having a sign different from a sign of a refractive power of the focusing lens unit, and does not move in the optical axial direction at the time of focusing, and the following conditional expressions (18) and (5) are satisfied:

$$0.4 < D_{G1img}/f < 1.3 \quad (18)$$

$$1.5 < f_{G2}/f_{fo} < 6.0 \quad (5)$$

where, $D_{G1img}$ denotes a distance along the optical axis from an object-side lens surface of the first lens unit up to the image plane at the time of focusing at an object at infinity, f denotes the focal length of the single focal length lens system at the time of focusing at an object at infinity, $f_{G2}$ denotes the focal length of the second lens unit, and $f_{fo}$ denotes the focal length of the focusing lens unit.

In the lens system according to the 2-3$^{th}$ embodiment, in addition to having the abovementioned second basic arrangement, the rear lens unit includes the aperture stop and also includes the first predetermined lens unit. Moreover, the first predetermined lens unit has a refractive power having a sign different from a sign of a refractive power of the focusing lens unit, and does not move in the optical axial direction at the time of focusing. Furthermore, in the lens system according to the 2-3$^{th}$ embodiment, conditional expressions (18) and (5) are satisfied.

A technical significance of conditional expression (5) will be described below.

Moreover, in the lens systems according to 2-1$^{th}$ embodiment, 2-2$^{th}$ embodiment, and 2-3$^{th}$ embodiment, it is preferable that the front lens unit is disposed immediately before the aperture stop.

A single focal length lens system according to a 2-4$^{th}$ embodiment includes in order from an object side to an image side along an optical axis, a front lens unit and a rear lens unit, and the single focal length lens system does not include any other lens unit on the optical axis, and the front lens unit includes in order from the object side to the image side, a first lens unit having a positive refractive power and a second lens unit having a negative refractive power, and the rear lens unit includes a focusing lens unit, and the focusing lens unit moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and the rear lens unit includes an aperture stop, and also includes a first predetermined lens unit, and the first predetermined lens unit has a refractive power having a sign different from a sign of a refractive power of the focusing lens unit, and does not move in the optical axial direction at the time of focusing, and the aperture stop is disposed on the object side of any lens in the rear lens unit.

In the lens system according to the 2-4$^{th}$ embodiment, in addition to having the abovementioned second basic arrangement, the rear lens unit includes the aperture stop and also includes the first predetermined lens unit. Moreover, the first predetermined lens unit has a refractive power having a sign different from a sign of a refractive power of the focusing lens unit, and does not move in the optical axial direction at the time of focusing. Furthermore, the aperture stop is disposed on the image side of any lens in the rear lens unit.

In the lens system according to the present embodiment, the aperture stop is disposed on the object side of any lens in the rear lens unit. By making such an arrangement, it is possible to make a lens diameter small in the lens units on the image side of the aperture stop.

A single focal length lens system according to a 2-5$^{th}$ embodiment includes in order from an object side to an image side along an optical axis, a front lens unit and a rear lens unit, and the single focal length lens system does not include any other lens unit on the optical axis, and the front lens unit includes in order from the object side to the image side, a first lens unit having a positive refractive power and a second lens unit having a negative refractive power, and the rear lens unit includes a focusing lens unit, and the focusing lens unit moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and each of the first lens unit, the second lens unit, and the rear lens unit includes a positive lens and a negative lens, and the following conditional expression (7) is satisfied:

$$0.31 < |f_{G1}/f_{G2}| < 3.0 \quad (7)$$

where, $f_{G1}$ denotes a focal length of the first lens unit, and $f_{G2}$ denotes a focal length of the second lens unit.

In the lens system according to the 2-5$^{th}$ embodiment, in addition to having the abovementioned second basic arrangement, each of the first lens unit, the second lens unit, and the rear lens unit includes the positive lens and the negative lens, and conditional expression (7) is satisfied.

Moreover, the movement of a lens unit, apart from by focusing, is also carried out by zooming and by image stabilization. Even in the zooming and image stabilization, it is preferable not to dispose a lens unit for zooming and a lens unit for image stabilization in the lens unit. By making such an arrangement, it becomes possible to enhance further the effect due to the telephoto arrangement in the front lens unit.

Moreover, the refractive power of the front lens unit may be let to be a positive refractive power. By making such an arrangement, shortening the overall length of the lens system becomes easier.

Moreover, an aperture stop may be disposed on the image side of the second lens unit. By making such an arrangement, it is possible to make a lens diameter small in a lens unit on the image side of the aperture stop. Particularly, it is preferable to make the positive refractive power of the first lens unit and the negative refractive power of the second lens unit large, and to dispose the aperture stop on the image side of the second lens unit. By making such an arrangement, it is possible to make a lens diameter further smaller in the lens units on the image side of the aperture stop.

A technical significance of conditional expression (7) will be described later.

A single focal length lens system according to a 2-6$^{th}$ embodiment includes in order from an object side to an image side along an optical axis, a front lens unit and a rear lens unit, and the single focal length lens system does not include any other lens unit on the optical axis, and the front lens unit includes in order from the object side to the image side, a first lens unit having a positive refractive power and a second lens unit having a negative refractive power, and the rear lens unit includes a focusing lens unit, and the focusing lens unit moves along the optical axis at the time of focusing from an object at infinity to an object at a close distance, and the front lens unit does not includes a lens which moves in an optical axial direction, and the rear lens unit does not include a lens which moves in the optical axial direction except at the time of focusing, and each of the first lens unit, the second lens unit, and the rear lens unit includes a positive lens and a negative lens, and the following conditional expression (1) is satisfied:

$$0.06 < |f_{fo}/f| < 0.4 \qquad (1)$$

where, f denotes a focal length of the single focal length lens system at the time of focusing at an object at infinity, and $f_{fo}$ denotes a focal length of the focusing lens unit.

In the lens system according to the 2-6$^{th}$ embodiment, in addition to having the abovementioned second basic arrangement, each of the first lens unit, the second lens unit, and the rear lens unit includes the negative lens and the positive lens, and conditional expression (1) is satisfied.

A single focal length lens system according to a 2-7$^{th}$ embodiment includes in order from an object side to an image side along an optical axis, a front lens unit and a rear lens unit, and the single focal length lens system does not include any other lens unit on the optical axis, and the front lens unit includes in order from the object side to the image side, a first lens unit having a positive refractive power and a second lens unit having a negative refractive power, and the rear lens unit includes a focusing lens unit, and the focusing lens unit moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and each of the first lens unit, the second lens unit, and the rear lens unit includes a positive lens and a negative lens, and an aperture stop is disposed on the object side of the focusing lens unit, and the following conditional expression (14) is satisfied:

$$1 < \nu_{G2nMAX} - \nu_{G2pMIN} < 40 \qquad (14)$$

where, $\nu_{G2nMAX}$ denotes a maximum Abbe number from among Abbe numbers for negative lenses in the second lens unit, and $\nu_{G2pmiN}$ denotes a minimum Abbe number from among Abbe numbers for positive lenses in the second lens unit.

In the lens system according to the 2-7$^{th}$ embodiment, in addition to having the abovementioned second basic arrangement, each of the first lens unit, the second lens unit, and the rear lens unit includes the positive lens and the negative lens, and the aperture stop is disposed on the object side of the focusing lens unit, and conditional expression (14) is satisfied.

In the lens system according to the present embodiment, the aperture stop is disposed on the object side of the focusing lens unit. In this case, the focusing lens unit is positioned on the image side of the aperture stop. By making such an arrangement, it is possible to enhance the magnification of the focusing lens unit. As a result, it is possible to improve a focusing sensitivity, and it becomes possible to make the lens system small and light-weight.

Moreover, in the front lens unit, it is desirable to impart a positive refractive power to the overall front lens unit while enhancing the effect due to the telephoto arrangement. Accordingly, since it is possible to reduce a proportion of load of the refractive power in the rear lens unit, it is possible to shorten the overall length of the lens system as well as to reduce an aberration which occurs in the rear lens unit. As a result, it is possible to secure a favorable imaging performance.

A technical significance of conditional expression (14) will be described later.

A single focal length lens system according to a 2-8$^{th}$ embodiment includes in order from an object side to an image side along an optical axis, a front lens unit and a rear lens unit, and the single focal length lens system does not include any other lens unit on the optical axis, and the front lens unit includes in order from the object side to the image side, a first lens unit having a positive refractive power and a second lens unit having a negative refractive power, and the rear lens unit includes a focusing lens unit, and the focusing lens unit moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and each of the first lens unit and the second lens unit includes a positive lens and a negative lens, and the focusing lens unit has a negative refractive power, and the following conditional expression (1) is satisfied:

$$0.06 < |f_{fo}/f| < 0.4 \qquad (1)$$

where, f denotes a focal length of the single focal length lens system at the time of focusing at an object at infinity, and $f_{fo}$ denotes a focal length of the focusing lens unit.

In the lens system according to the 2-8$^{th}$ embodiment, in addition to having the abovementioned second basic arrangement, each of the first lens unit and the second lens unit includes the positive lens and the negative lens, and the focusing lens unit has a negative refractive power, and conditional expression (1) is satisfied.

The focusing lens unit has a negative refractive power. Since the focusing lens unit is included in the rear lens unit, the focusing lens unit having a negative refractive power is disposed on the image side of the front lens unit. Accordingly, since the focusing lens unit is not disposed in the front lens unit, it becomes unnecessary to suppress a fluctuation in aberration due to focusing in the front lens unit. As a result, it is possible to reduce an occurrence of aberration in the overall front lens unit, while enhancing the effect due to the telephoto arrangement in the front lens unit.

Moreover, by making the refractive power of the front lens unit large by shortening the overall length of the lens system, and disposing a lens unit having a negative refractive power on the image side thereof, it becomes further easier to achieve the telephoto arrangement.

Moreover, as aforementioned, since it is possible to reduce the occurrence of aberration in the overall front lens unit, by carrying out focusing by the lens unit having a negative refractive power (focusing lens unit) it is possible to make the focusing lens unit light-weight, and to carry out an efficient focusing by saving an electric power at the time of focusing. As a result, it is possible to make an arrangement of the lens system an arrangement in which, fluctuation in the spherical aberration and astigmatism due to focusing is extremely small.

Moreover, in the single focal length lens system according to the embodiment (hereinafter, appropriately referred to as the lens system according to the present embodiment), it is preferable that the front lens unit has a positive refractive power as a whole.

In the front lens unit, it is desirable to impart a positive refractive power to the overall front lens unit while enhancing an effect due to the telephoto arrangement. Accordingly, since it is possible to reduce a proportion of load of the refractive power in the rear lens unit, it is possible to shorten the overall length of the lens system as well as to reduce an aberration which occurs in the rear lens unit. As a result, it is possible to secure a favorable imaging performance.

In the lens system according to the present embodiment, it is preferable that the front lens unit is disposed immediately before the aperture stop.

When such an arrangement is made, it is possible to make a lens diameter small in the lens units on the image side of the aperture stop.

Moreover, in the lens system according to the present embodiment, it is preferable that the image-side lens unit satisfies the following conditional expression (3):

$$0.07<f_{R2}/f<0.7 \qquad (3)$$

where, $f_{R2}$ denotes a focal length of the image-side lens unit, and
f denotes a focal length of the single focal length lens system at the time of focusing at an object at infinity.

Since the technical significance of conditional expression (3) has already been explained, the description thereof is omitted. Moreover, it is preferable that the refractive power of the image-side lens unit is a positive refractive power. Moreover, it is preferable that the image-side lens unit is disposed on the image side of the focusing lens unit.

By disposing the image-side lens unit having a positive refractive power on the image side of the focusing lens unit, since the magnification of the focusing lens unit is enhanced, it is possible to improve the focusing sensitivity. Accordingly, since it is possible to reduce an amount of movement of the focusing lens unit at the time of focusing, it is possible to make the focusing speed high.

Moreover, in a case in which, a plurality of lens units having a positive refractive power is disposed on the image side of the focusing lens unit, each of the plurality of lens units having a positive refractive power can be deemed as the image-side lens unit. In this case, it is preferable that, from among the plurality of lens units having a positive refractive power, at least a lens unit having a positive refractive power positioned nearest to the focusing lens unit is the image-side lens unit which satisfies conditional expression (3).

Moreover, in the lens system according to the present embodiment, it is preferable that the rear lens unit includes an image-side lens unit having a positive refractive power, and the image-side lens unit is disposed on the image side of the focusing lens unit, and includes at least a positive lens and a negative lens.

By disposing the image-side lens unit having a positive refractive power on the image side of the focusing lens unit, since the magnification of the focusing lens unit is enhanced, it is possible to improve the focusing sensitivity. Accordingly, since it is possible to reduce the amount of movement of the focusing lens unit at the time of focusing, it is possible to make the focusing speed high. Moreover, by the image-side lens unit including the positive lens and the negative lens, it is possible to suppress the occurrence of the chromatic aberration in the image-side lens unit. As a result, it is possible to make small a fluctuation in the chromatic aberration at the time of focusing.

Moreover, in a case in which, a plurality of lens unit having a positive refractive power is disposed on the image side of the focusing lens unit, each of the plurality of lens units having a positive refractive power can be deemed as the image-side lens unit. However, from among the plurality of lens units having a positive refractive power, one lens unit may be let to be the image-side lens unit. In this case, it is preferable that the image-side lens unit is a lens unit positioned nearest to the focusing lens units, from among the plurality of lens units having a positive refractive power.

Moreover, in the lens system according to the present embodiment, it is preferable that the image-side lens unit is disposed on the image side of the focusing lens unit, immediately after the focusing lens unit.

The effect of disposing the image-side lens unit having a positive refractive power on the image side of the focusing lens unit is as already been described. By disposing the image-side lens unit on the image side of the focusing lens unit, immediately after the focusing lens unit, or in other words, by letting a state to be such that there is no other lens unit between the image-side lens unit and the focusing lens unit, it is possible to further improve that effect.

Moreover, in the lens unit according to the present embodiment, it is preferable that the front lens unit includes a positive lens which satisfies the following conditional expression (4):

$$80<vd_{Fp}<98 \qquad (4)$$

where, $vd_{Fp}$ denotes Abbe number for one of the positive lenses in the front lens unit.

The chromatic aberration which occurs in the front lens unit is augmented in the rear lens unit. Therefore, it is necessary to make an amount of the chromatic aberration which occurs in the front lens unit to be as small as possible.

When falling below a lower limit value of conditional expression (4), since an amount of chromatic aberration remained in the front lens unit increases, a favorable imaging performance is not achieved. When exceeding an upper limit value of conditional expression (4), since the correction of the chromatic aberration in the front lens unit becomes excessive, a merit of using a glass material having a low dispersion becomes small.

Moreover, in the lens unit according to the present embodiment, it is preferable that the following conditional expression (5) is satisfied:

$$1.5 < f_{G2}/f_{fo} < 6.0 \quad (5)$$

where, $f_{G2}$ denotes the focal length of the second lens unit, and
$f_{fo}$ denotes the focal length of the focusing lens unit.

When falling below a lower limit value of conditional expression (5), the refractive power of the focusing lens unit becomes excessively small. In this case, the amount of movement of the focusing lens unit at the time of focusing increases. Therefore, when an attempt is made to secure a space which is necessary for movement of the focusing lens unit, shortening the overall length of the lens system becomes difficult.

When exceeding an upper limit value of conditional expression (5), correction of the spherical aberration, the coma, and the astigmatism in the front lens unit becomes difficult. When an attempt is made to correct these aberrations in the rear lens unit, since a proportion of load of aberration correction in the focusing lens unit increases, a favorable imaging performance cannot be achieved at the time of focusing.

Moreover, in the front lens unit, by disposing the first lens unit having a positive refractive power and the second lens unit having a negative refractive power in this order from the object side to the image side, it is possible to enhance the effect due to the telephoto arrangement even in the front lens unit. As a result, shortening the overall length of the lens system becomes possible. Moreover, by the second lens unit including the positive lens and the negative lens, it is possible to enhance the effect of correction of the chromatic aberration in the front lens unit. Therefore, even when the effect due to the telephoto arrangement is enhanced, it is possible to achieve a favorable imaging performance.

Moreover, in the lens system according to the present embodiment, it is preferable that the aforementioned conditional expression (1) is satisfied.

Since the technical significance of conditional expression (1) has already been explained, the description thereof is omitted.

Moreover, in the lens system according to the present embodiment, it is preferable that the front lens unit includes in order from the object side to the image side, a first lens unit having a positive refractive power and a second lens unit having a negative refractive power, and the following conditional expression (7) is satisfied:

$$0.31 < |f_{G1}/f_{G2}| < 3.0 \quad (7)$$

where, $f_{G1}$ denotes a focal length of the first lens unit, and
$f_{G2}$ denotes the focal length of the second lens unit.

The front lens unit includes in order from the object side to the image side, the first lens unit having a positive refractive power and the second lens unit having a negative refractive power. Therefore, even in the lens system according to the present embodiment, since the effect due to the telephoto arrangement is enhanced, it is possible to shorten the overall length of the lens system. Moreover, by making such an arrangement, it is possible to correct mainly the spherical aberration, the coma, and the astigmatism favorably, while enhancing the effect due to the telephoto arrangement.

When falling below a lower limit value of conditional expression (7), it is advantageous for shortening the overall length of the lens system, but the refractive power of the first lens unit with a large aperture becomes excessively large. In this case, since a proportion of the refractive power of the first lens unit with respect to the refractive power of the overall lens system becomes large, it becomes difficult to make the overall lens system light-weight.

When exceeding an upper limit value of conditional expression (7), the refractive power of the second lens unit becomes excessively large. In this case, since a proportion of the refractive power of the second lens unit with respect to the refractive power of the overall lens system becomes large, shortening the overall length of the lens system becomes difficult.

Moreover, in the front lens unit, by disposing the first lens unit having a positive refractive power and the second lens unit having a negative refractive power in this order from the object side to the image side, it is possible to enhance the effect due to the telephoto arrangement even in the front lens unit. As a result, shortening the overall length of the lens system becomes possible. Moreover, by the second lens unit including the positive lens and the negative lens, it is possible to enhance the effect of correction of the chromatic aberration in the front lens unit. Therefore, even when the effect due to the telephoto arrangement is enhanced, it is possible to achieve a favorable imaging performance.

Moreover, in the lens system according to the present embodiment, it is preferable that the second lens unit includes a positive lens and a negative lens.

By the second lens unit including the positive lens and the negative lens, it is possible to enhance the effect of correction of the chromatic aberration in the front lens unit. Therefore, even when the effect due to the telephoto arrangement is enhanced, it is possible to achieve a favorable imaging performance.

In the lens system according to the present embodiment, it is preferable that the aforementioned conditional expression (2) is satisfied.

Since the technical significance of conditional expression (2) has already been explained, the description thereof is omitted.

Moreover, in the lens system according to the present embodiment, it is preferable that the focusing lens unit is disposed on the image side of the aperture stop, immediately after the aperture stop.

In the front lens unit, it is desirable to impart a positive refractive power to the overall front lens unit while enhancing the effect due to the telephoto arrangement. Accordingly, since it is possible to reduce a proportion of load of the refractive power in the rear lens unit, it is possible to shorten the overall length of the lens system as well as to reduce an aberration which occurs in the rear lens unit. As a result, it is possible to secure a favorable imaging performance.

Moreover, by disposing the aperture stop between the front lens unit and the rear lens unit, it is possible to make a lens diameter small in a lens unit on the image side of the aperture stop. Immediately after the aperture stop, since a converged light is incident on the rear lens unit from a direction of the front lens unit, it is easy to facilitate making a diameter of the rear lens unit small. Therefore, by letting the focusing lens unit to be immediately after the aperture stop, it is possible to make a lens diameter small in the focusing lens unit.

Moreover, an arrangement is let to be such that, there is no lens included between the focusing lens unit and the front lens unit, or in other words, an arrangement consisting of the front lens unit, the aperture stop, and the focusing lens unit in order from the object side, and the refractive power of the focusing lens unit is let to be a negative refractive power. By making such an arrangement, it is possible to enhance further the effect due to the telephoto arrangement efficiently.

Moreover, by making such an arrangement, since it is possible to dispose the focusing lens unit at a position at which, a light ray is converged gradually, it is possible to make a lens diameter small in the focusing lens unit, and as a result of which, it is possible to make the focusing unit small-sized and light-weight.

Moreover, when such an arrangement is made, even if the refractive power of the focusing lens unit is made large, it is possible to make diverging of a light ray small after the light ray has passed through the focusing lens unit. Therefore, it is possible to make a diameter of the overall rear lens unit small while improving the focusing sensitivity. Furthermore, since it is possible to make the diameter of the rear lens unit small, and an amount of movement of the focusing lens unit even smaller, it is possible to make the focusing unit further smaller and light-weight.

Moreover, it is preferable to dispose a lens unit on the image side of the focusing lens unit, and to let a refractive power of the lens unit to be a refractive power having a sign different from a sign of the refractive power of the focusing lens unit. By making such an arrangement, it is possible to improve the focusing sensitivity easily. Moreover, it is preferable that the lens unit includes a positive lens and a negative lens for suppressing a fluctuation in the chromatic aberration at the time of focusing. Moreover, it is preferable that the lens unit includes not more than two lenses. By making such an arrangement, making the lens system light-weight is facilitated.

Moreover, in the lens system according to the present embodiment, it is preferable that the rear lens unit includes an image-side lens unit having a positive refractive power, and the image-side lens unit is disposed on the image side of the focusing lens unit, and includes at least a positive lens and a negative lens.

By disposing the image-side lens unit having a positive refractive power on the image side of the focusing lens unit, since the magnification of the focusing lens unit is enhanced, it is possible to improve the focusing sensitivity. Accordingly, since it is possible to reduce the amount of movement of the focusing lens unit at the time of focusing, it is possible to make the focusing speed high. Moreover, by the image-side lens unit including the positive lens and the negative lens, it is possible to suppress the occurrence of the chromatic aberration in the image-side lens unit. As a result, it is possible to make small the fluctuation in the chromatic aberration at the time of focusing.

Moreover, in the lens system according to the present embodiment, it is preferable that the front lens unit includes in order from an object side to the image side, a first lens unit having a positive refractive power, and a second lens unit having a negative refractive power, and each of the first lens unit and the second lens unit includes a positive lens and a negative lens.

The front lens unit includes in order from the object side to the image side, the first lens unit having a positive refractive power and the second lens unit having a negative refractive power. Therefore, even in the lens system according to the present embodiment, since the effect due to the telephoto arrangement is enhanced, it is possible to shorten the overall length of the lens system. Moreover, by making such an arrangement, it is possible to correct mainly the spherical aberration, the coma, and the astigmatism favorably, while enhancing the effect due to the telephoto arrangement.

For enhancing the effect due to the telephoto arrangement in the lens unit, it is preferable that each of the first lens unit and the second lens unit includes at least the positive lens and the negative lens. By making such an arrangement, it is possible to reduce the occurrence of aberrations such as the spherical aberration, the coma, the astigmatism, and the chromatic aberration in each of the first lens unit and the second lens unit. As a result, it is possible to achieve a favorable imaging performance even while small-sizing the lens system.

Moreover, in the lens system according to the present embodiment, it is preferable that the rear lens unit includes a positive lens and a negative lens.

By disposing at least the positive lens and the negative lens in the rear lens unit, it is possible to suppress the occurrence of the spherical aberration and the coma in the rear lens unit. As a result, a favorable imaging performance is achieved. Moreover, the positive lens and the negative lens are to be disposed regardless of order of disposing.

Moreover, in the lens system according to the present embodiment, it is preferable that an overall combined lens unit from the first lens unit up to a position immediately before the focusing lens unit has a positive refractive power, and the focusing lens unit has a negative refractive power, and the following conditional expression (9) is satisfied:

$$-4.5 < f_{FA}/f_{fo} < -1.5 \tag{9}$$

where, $f_{FA}$ denotes a focal length of the overall combined lens unit, and $f_{fo}$ denotes the focal length of the focusing lens unit.

By letting the refractive power of the overall combined lens unit to be a positive refractive power and the refractive power of the focusing lens unit to be a negative refractive power, since it is possible to enhance the effect due to the telephoto arrangement in the overall lens system, shortening the overall length of the lens system becomes possible.

When falling below a lower limit value of conditional expression (9), the refractive power of the focusing lens unit becomes excessively large. In this case, since the spherical aberration which occurs in the focusing lens unit increases, a favorable imaging performance is not achieved in the overall focusing range.

When exceeding an upper limit value of conditional expression (9), the refractive power of the focusing lens unit becomes excessively small. In this case, since the focusing sensitivity is degraded, the amount of movement of the focusing lens unit at the time of focusing increases. As a result, shortening the overall length of the lens system becomes difficult.

Moreover, in the lens system according to the present embodiment, it is preferable that the front lens unit has a positive refractive power, and the focusing lens unit has a negative refractive power, and the following conditional expression (10) is satisfied:

$$-8.0 < f_{FF}/f_{fo} < -1.8 \tag{10}$$

where, $f_{FF}$ denotes a focal length of the front lens unit, and
$f_{fo}$ denotes the focal length of the focusing lens unit.

By letting the refractive power of the front lens unit to be a positive refractive power, and the refractive power of the focusing lens unit to be a negative refractive power, since it is possible to enhance the effect due to the telephoto arrangement in the overall lens system, shortening the overall length of the lens system becomes possible.

When falling below a lower limit value of conditional expression (10), the refractive power of the focusing lens unit becomes excessively large. In this case, since the spherical aberration which occurs in the focusing lens unit increases, a favorable imaging performance is not achieved in the overall focusing range.

When exceeding an upper limit value of conditional expression (10), the refractive power of the focusing lens unit becomes excessively small. In this case, since the focusing sensitivity is degraded, the amount of movement of the focusing lens unit at the time of focusing increases. As a result, shortening the overall length of the lens system becomes difficult.

Moreover, in the lens unit according to the present embodiment, it is preferable that the first lens unit includes a 1-1$^{th}$ sub lens unit on the object side, and a 1-2$^{th}$ sub lens unit on the image side, and an air space on an optical axis between the 1-1$^{th}$ sub lens unit and the 1-2$^{th}$ sub lens unit is the longest in the first lens unit, and each of the 1-1$^{th}$ sub lens unit and the 1-2$^{th}$ sub lens unit has a positive refractive power, and each of the 1-1$^{th}$ sub lens unit and the 1-2$^{th}$ sub lens unit includes a positive lens and a negative lens, and the following conditional expression (11) is satisfied:

$$0.35 < D_{G1}/f_{G1} < 1.3 \qquad (11)$$

where, $D_{G1}$ denotes a distance on the optical axis from a lens surface nearest to an object of the first lens unit up to a lens surface nearest to an image of the first lens unit, and $f_{G1}$ denotes the focal length of the first lens unit.

For shortening the overall length of the lens system, in the front lens unit, it is necessary to dispose the first lens unit having a positive refractive power on the object side, and also to make the positive refractive power of the first lens unit large. However, when an attempt is made to enhance the effect due to the telephoto arrangement by forming the first lens unit with a single (one) positive lens, since only the one positive lens has to bear a load of the refractive power, a curve (amount of occurrence) of the spherical aberration becomes large in the first lens unit.

Therefore, the positive refractive power of the first lens unit is distributed between the 1-1$^{th}$ sub lens unit and the 1-2$^{th}$ sub lens unit. By making such an arrangement, even when the refractive power of the first lens unit is made large, it is possible to make an arrangement which enables to make the curve of the spherical aberration small. Furthermore, each of the 1-1$^{th}$ sub lens unit and the 1-2$^{th}$ sub lens unit is let to include the positive lens and the negative lens. By making such an arrangement, it is possible to reduce a curve (amount of occurrence) of the chromatic aberration in the first lens unit.

When falling below a lower limit value of conditional expression (11), a lens diameter in the 1-2$^{th}$ sub lens unit becomes large. Therefore, making the overall lens system light-weight cannot be facilitated. Furthermore, since the curve of the spherical aberration increases, securing a favorable imaging performance becomes difficult.

When exceeding an upper limit value of conditional expression (11), shortening the overall length of the lens system becomes difficult.

Moreover, for enhancing the effect due to the telephoto arrangement in the front lens unit, it is necessary to form the front lens unit by a first lens unit having a positive refractive power and a second lens unit having a negative refractive power in order from the object side to the image side, and to make the positive refractive power of the first lens unit large. However, when an attempt is made to enhance the effect due to the telephoto arrangement by forming the first lens unit with a single (one) positive lens, since only the one positive lens has to bear a load of refractive power, the curve (amount of occurrence) of the spherical aberration becomes large in the first lens unit. Therefore, in view of this, it is preferable that the first lens unit includes two sub lens units, and conditional expression (11) is satisfied.

Moreover, in the lens system according to the present embodiment, it is preferable that the first lens unit includes a 1-1$^{th}$ sub lens unit on the object side, and a 1-2$^{th}$ sub lens unit on the image side, and an air space on an optical axis between the 1-1$^{th}$ sub lens unit and the 1-2$^{th}$ sub lens unit is the longest in the first lens unit, and each of the 1-1$^{th}$ sub lens unit and the 1-2$^{th}$ sub lens unit has a positive refractive power, and each of the 1-1$^{th}$ sub lens unit and the 1-2$^{th}$ sub lens unit includes a positive lens and a negative lens, and the following conditional expression (12) is satisfied:

$$0.1 < D_{G112}/f_{G1} < 0.6 \qquad (12)$$

where, $D_{G112}$ denotes a distance on the optical axis between the 1-1$^{th}$ sub lens unit and the 1-2$^{th}$ sub lens unit, and $f_{G1}$ denotes the focal length of the first lens unit.

For shortening the overall length of the lens system, in the front lens unit, it is necessary to dispose the first lens unit having a positive refractive power on the object side, and also to make the positive refractive power of the first lens unit large. However, when an attempt is made to enhance the effect due to the telephoto arrangement by forming the first lens unit with a single (one) positive lens, since only the one positive lens has a load of the refractive power, the curve (amount of occurrence) of the spherical aberration becomes large in the first lens unit.

Therefore, the positive refractive power of the first lens unit is distributed between the 1-1$^{th}$ sub lens unit and the 1-2$^{th}$ sub lens unit. By making such an arrangement, even when the refractive power of the first lens unit is made large, it is possible to make an arrangement which enables to make the curve of the spherical aberration small. Furthermore, each of the 1-1$^{th}$ sub lens unit and the 1-2$^{th}$ sub lens unit is let to include the positive lens and the negative lens. By making such an arrangement, it is possible to reduce a curve (amount of occurrence) of the chromatic aberration in the first lens unit.

When falling below a lower limit value of conditional expression (12), a lens diameter in the 1-2$^{th}$ sub lens unit becomes large. Therefore, making the overall lens system light-weight cannot be facilitated. Furthermore, since the curve of the spherical aberration increases, securing a favorable imaging performance becomes difficult.

When exceeding an upper limit value of conditional expression (12), shortening the overall length of the lens system becomes difficult.

Moreover, for enhancing the effect due to the telephoto arrangement in the front lens unit, it is necessary to form the front lens unit by a first lens unit having a positive refractive power and a second lens unit having a negative refractive power in order from the object side to the image side, and to make the positive refractive power of the first lens unit large. However, when an attempt is made to enhance the effect due to the telephoto arrangement by forming the first lens unit with a single (one) positive lens, since only the one positive lens has to bear a load of refractive power, the curve (amount of occurrence) of the spherical aberration becomes large in the first lens unit. Therefore, in view of this, it is preferable that conditional expression (12) is satisfied.

Moreover, in the lens system according to the present embodiment, it is preferable that only one focusing lens unit is disposed in the rear lens unit.

In the front lens unit, it is desirable to impart a positive refractive power to the overall front lens unit while enhancing the effect due to the telephoto arrangement. Accordingly, since it is possible to reduce a proportion of load of the refractive power in the rear lens unit, it is possible to shorten the overall length of the lens system as well as to reduce an aberration which occurs in the rear lens unit. As a result, it is possible to secure a favorable imaging performance. Moreover, by such an arrangement, it is possible to make the diameter of the rear lens unit small.

Therefore, by disposing the focusing lens unit in the rear lens unit, it is possible to form the focusing lens unit to be small-sized. As a result of this, it is possible to make the focusing unit small-sized and light-weight.

Furthermore, in the basic arrangement of the present embodiment, as aforementioned, it is possible to correct the spherical aberration, the coma, and the astigmatism favorably in the front lens unit. Therefore, by disposing the focusing lens unit in the rear lens unit, it is possible to improve the stability of focusing performance. Moreover, with the improvement in the stability of focusing performance, even if the number of focusing lens units disposed in the rear lens unit is one, a stable focusing performance is achieved.

Moreover, it is preferable to dispose a lens unit on the image side of the focusing lens unit, and to let the refractive power of the lens unit to be a refractive power having a sign different from a sign of the refractive power of the focusing lens unit. By making such an arrangement, it is possible to improve the focusing sensitivity more easily.

Moreover, in the lens system according to the present embodiment, it is preferable that the rear lens unit includes an image-motion correcting lens unit, and the image-motion correcting lens unit moves in a direction different from a direction of the optical axis to reduce an image motion due to shaking of the single focal length lens system.

By shifting a lens unit having a refractive power, it is possible to correct a shift in an imaging position caused due to camera shake. Here, shifting the lens unit means moving the lens unit in the direction different from the direction of the optical axis to reduce an image motion due to shaking of the lens system. It is desirable that the lens unit which is to be shifted is small-sized and light-weight.

In a lens system having a telephoto arrangement, the rear lens unit becomes a lens unit having the smallest lens diameter. Therefore, since the lens system according to the present embodiment adopts the telephoto arrangement, it is preferable to dispose the lens unit to be shifted, or in other words, the image-motion correcting lens unit, in the rear lens unit. By making such an arrangement, since it is possible to make the image-motion correcting lens unit small-sized and light-weight, it is possible to improve a response of the image-motion correction.

Moreover, in the lens system according to the present embodiment, it is preferable that the rear lens unit includes a second predetermined lens unit which is disposed immediately before the image-motion correcting lens unit, and the second predetermined lens unit has a refractive power having a sign different from a sign of a refractive power of the image-motion correcting lens unit.

By making such an arrangement, it is possible to make the refractive power of the image-motion correcting lens unit large. As a result, it is possible to make an amount of shift in the imaging position large with respect to an amount of shift of the image-motion correcting lens unit. Accordingly, it is possible to carry out image-motion correction of higher accuracy with a small amount of shift.

Moreover, the first predetermined lens unit and the second predetermined lens unit may be the same.

Moreover, in the lens system according to the present embodiment, it is preferable that the rear lens unit includes a third predetermined lens unit which is disposed immediately after the image-motion correcting lens unit, and the third predetermined lens unit has a refractive power having a sign different from a sign of the refractive power of the image-motion correcting lens unit.

By making such an arrangement, it is possible to make the refractive power of the image-motion correcting lens unit large. As a result, it is possible to make an amount of shift in the imaging position large with respect to an amount of shift of the image-motion correcting lens unit. Accordingly, it is possible to carry out image-motion correction of higher accuracy with a small amount of shift.

Moreover, the first predetermined lens unit and the third predetermined lens unit may be the same.

Moreover, in the lens system according to the present embodiment, it is preferable that the image-motion correcting lens unit includes a plurality of lenses and a predetermined lens, and the plurality of lenses have a refractive power having a sign same as the sign of the refractive power of the image-motion correcting lens unit, and the predetermined lens has a refractive power having a sign different from the sign of the refractive power of the image-motion correcting lens unit.

Aberrations which occur when there is a shaking are mainly, the spherical aberration, a curvature of field, and a chromatic aberration of magnification. For reducing degradation of correction performance with respect to the shaking, it is necessary to reduce an amount of the aberrations which occur. Here, in the image-motion correcting lens unit, since a proportion of load of the refractive power being large (the refractive power being large), the aberration is susceptible to occur.

Therefore, the image-motion correcting lens unit is formed by the plurality of lenses and the predetermined lens. Moreover, by the plurality of lenses having the refractive power having a sign same as the sign of the refractive power of the image-motion correcting lens unit, it is possible to reduce occurrence of the spherical aberration and the curvature of field. Furthermore, by the predetermined lens having the refractive power having a sign different from the sign of the refractive power of the image-motion correcting lens unit, it is possible to correct the chromatic aberration favorably.

Furthermore, it is desirable to let the number of the plurality of lenses to be two and the number of the predetermined lenses to be one, and to form the image-motion correcting lens unit by a total of three lenses.

Moreover, in the lens system according to the present embodiment, it is preferable that the rear lens unit includes a second predetermined lens unit which is disposed immediately before the image-motion correcting lens unit, and a third predetermined lens unit which is disposed immediately after the image-motion correcting lens unit, and each of the second predetermined lens unit and the third predetermined lens unit has a refractive power having a sign different from the sign of the refractive power of the image-motion correcting lens unit.

By making such an arrangement, it is possible to make the refractive power of the image-motion correcting lens unit further larger, while suppressing the occurrence of aberration. As a result, it is possible to make the amount of shift in the imaging position further larger with respect to the amount of shift in the image-motion correcting lens unit. Accordingly, it is possible to carry out image-motion correction of higher accuracy with a small amount of shift.

Moreover, in the lens system according to the present embodiment, it is preferable that the image-motion correcting lens unit has a negative refractive power.

In the image-motion correction, the image-motion correcting lens unit is shifted. For the image-motion correction, it is preferable to make the amount of movement of the image-motion correcting lens unit small (to narrow a range of movement). For making the amount of movement small, it is desirable to let a lens unit (lens) having a smaller lens diameter to be the image-motion correcting lens unit. By letting the refractive power of the image-motion correcting lens unit to be a negative refractive power, it is possible to adopt an optical lay out in which, it is easy to make the lens diameter of the image-motion correcting lens unit small, and therefore it is preferable.

Moreover, in the lens system according to the present embodiment, it is preferable that only the focusing lens unit is a lens unit which is movable in the optical axial direction.

By letting only the focusing lens unit to be a lens unit which is movable in the optical axial direction, it is possible to reduce the number of lenses which are to be moved. Accordingly, it is possible to make a lens unit which is to be moved at the time of focusing light-weight.

Moreover, in the lens system according to the present embodiment, it is preferable that only the focusing lens unit and the image-motion correcting lens unit are the lens units which are movable.

By letting only the focusing lens unit and the image-motion correcting lens unit to be the lens units which are movable, it is possible to reduce the number of lenses which are to be moved. Accordingly, it is possible to make the lens units which are to be moved at the time of focusing and at the time of image-motion correction light-weight.

Moreover, in the lens system according to the present embodiment, it is preferable that the second lens unit is a lens unit which is disposed nearest to the image in the front lens unit.

Making such an arrangement is preferable as it becomes easy to enhance the effect due to the telephoto arrangement.

Moreover, in the lens system according to the present embodiment, it is preferable that the second lens unit includes a negative lens which satisfies the following conditional expression (13):

$$37 < \nu_{G2nMAX} < 60 \quad (13)$$

where, $\nu_{G2nMAX}$ denotes a maximum Abbe number from among Abbe numbers for the negative lenses in the second lens unit.

When falling below a lower limit value of conditional expression (13), since a dispersion by the negative lens becomes excessively large, correction of a longitudinal chromatic aberration is susceptible to be insufficient. When exceeding an upper limit value of conditional expression (13), since the correction of the longitudinal chromatic aberration tends to be excessive, it becomes difficult to correct the longitudinal chromatic aberration favorably.

Moreover, in the lens system according to the present embodiment, it is preferable that the focusing lens unit is disposed on the image side of the aperture stop, and the following conditional expression (14) is satisfied:

$$1 < \nu_{G2nMAX} - \nu_{G2pMIN} < 40 \quad (14)$$

where, $\nu_{G2nMAX}$ denotes a maximum Abbe number from among Abbe numbers for the negative lenses in the second lens unit, and $\nu_{G2pMIN}$ denotes a minimum Abbe number from among Abbe numbers for positive lenses in the second lens unit.

By the focusing lens unit being disposed on the image side of the aperture stop, it is possible to make a lens diameter small in the lens units on the image side of the aperture stop.

Moreover, in the front lens unit, it is desirable to impart a positive refractive power to the overall front lens unit while enhancing the effect due to the telephoto arrangement. Accordingly, since it is possible to reduce a proportion of load of the refractive power in the rear lens unit, it is possible to shorten the overall length of the lens system as well as to reduce an aberration which occurs in the rear lens unit. As a result, it is possible to secure a favorable imaging performance.

When falling below a lower limit value of conditional expression (14), since the longitudinal chromatic aberration and the chromatic aberration of magnification which occur in the second lens unit become large, a favorable correction of the chromatic aberration in the front lens unit becomes difficult. In this case, a proportion of load of the chromatic aberration in the rear lens unit increases, but since the rear lens unit is not capable of bearing this load completely, it becomes difficult to correct the chromatic aberration in the rear lens unit sufficiently. Therefore, the occurrence of the chromatic aberration in the rear lens unit becomes conspicuous at the time of focusing.

When exceeding an upper limit value of conditional expression (14), since correction of the longitudinal chromatic aberration or the chromatic aberration of magnification becomes excessive, a favorable correction of the chromatic aberration in the front lens unit becomes difficult. As a result, the occurrence of the chromatic aberration in the rear lens unit becomes conspicuous at the time of focusing.

Moreover, in the lens system according to the present embodiment, it is preferable that the focusing lens unit consists of not more than two lenses.

In the basic arrangement according to the present embodiment, as aforementioned, it is possible to correct the spherical aberration, the coma, and the astigmatism favorably in the front lens unit. Therefore, by disposing the focusing lens unit in the rear lens unit, it is possible to improve stability of focusing performance. Moreover, with the improvement in the stability of focusing performance, even if the focusing lens unit is formed by a small number of lenses, not more than two, securing improved focusing performance and making the focusing lens unit light-weight are possible.

Moreover, in the lens system according to the present embodiment, it is preferable that the focusing lens unit consists of two lenses, which are, one positive lens and one negative lens.

By forming the focusing lens unit by one positive lens and one negative lens, it is possible to reduce occurrence of the chromatic aberration in the focusing lens unit. As a result, it is possible to secure stable focusing performance at the time of focusing. Moreover, by carrying out the correction of chromatic aberration by the minimum number lenses which is two, it is possible to achieve both of securing the improved focusing performance and making the focusing lens unit light-weight.

Moreover, in the lens system according to the present embodiment, it is preferable that the rear lens unit includes in order from the object side, a focusing lens unit having a negative refractive power, a lens unit having a positive refractive power, an image-motion correcting lens unit having a negative refractive power, and a lens unit having a positive refractive power.

When shortening of the overall length of the lens system is taken into consideration, it is preferable to let a refractive power of a lens unit positioned on the object side of the focusing lens unit to be a positive refractive power, and a refractive power of the focusing lens unit to be a negative refractive power. Since making such an arrangement leads to enhance further the effect due to the telephoto arrangement, such an arrangement is effective in shortening the overall length of the lens system. Moreover, if such an arrangement is made, since it is possible to dispose the focusing lens unit at a position where a light ray is converged gradually, it is possible to make a lens diameter small in the focusing lens unit. As a result of this, it is possible to make the focusing unit small-sized and light-weight.

Moreover, when such an arrangement is made, even if the refractive power of the focusing lens unit is made large, it is possible to make diverging of a light ray small after the light ray has passed through the focusing lens unit. Therefore, it is possible to make a diameter of the overall rear lens unit small while improving the focusing sensitivity. Furthermore, since it is possible to make the diameter of the rear lens unit small and an amount of movement of the focusing lens unit even smaller, it is possible to make the focusing unit further smaller and light-weight.

Therefore, it is preferable to let the refractive power of the focusing lens unit to be a negative refractive power, and to dispose the positive lens unit on the image side of the focusing lens unit. By making such an arrangement, since the magnification of the focusing lens unit is enhanced, it is possible to improve the focusing sensitivity more easily. Accordingly, since it is possible to reduce the amount of movement of the focusing lens unit at the time of focusing, it is possible to make the focusing speed high.

Moreover, in the image-motion correction, the image-motion correcting lens unit is shifted. For the image-motion correction, it is preferable to make the amount of movement of the image-motion correcting lens unit small (to narrow the range of movement). For making the amount of movement small, it is desirable to let a lens unit (lens) having a smaller lens diameter to be the image-motion correcting lens unit. By letting the refractive power of the image-motion correcting lens unit to be a negative refractive power, it is possible to adopt an optical lay out in which, it is easy to make the lens diameter of the image-motion correcting lens unit small, and therefore it is preferable.

Therefore, a lens unit having a positive refractive power is disposed on the object side of the image-motion correcting lens unit, and a lens unit having a positive refractive power is disposed on the image side of the image-motion correcting lens unit. By making such an arrangement, it is possible to make the refractive power of the image-motion correcting lens unit large. As a result, it is possible to make an amount of shift in the imaging position large with respect to an amount of shift of the image-motion correcting unit. Accordingly, it is possible to carry out image-motion correction of higher accuracy with a small amount of shift.

Meanwhile, the coma occurs due to shifting of the image-motion correcting lens unit. Therefore, if the focusing lens unit is disposed on the image side of the image-motion correcting lens unit, an effect of correction of the coma fluctuates substantially due to focusing. Therefore, it is not preferable to dispose the focusing lens unit on the image side of the image-motion correcting lens unit.

Moreover, the lens unit having a positive refractive power which is disposed on the object side of the image-motion correcting lens unit is also the positive lens unit disposed on the image side of the focusing lens unit. In such manner, when the lens unit disposed on the object side of the image-motion correcting lens unit and the lens unit disposed on the image side of the focusing lens unit are let to be common, it is possible to make an optical lay out of the rear lens unit simple.

Moreover, by disposing all the lens units in the rear lens unit on the image side of the aperture stop, it is possible to make the diameter of the rear lens unit even smaller.

Moreover, aberrations which occur at the time of focusing are mainly the spherical aberration and the longitudinal chromatic aberration. For reducing degradation of the focusing performance, it is necessary to reduce an amount of occurrence of these aberrations. For this, it is desirable that the focusing lens unit includes at least a positive lens and a negative lens. Furthermore, an aberration occurred in the focusing lens unit is relayed by a lens unit having a positive refractive power which is disposed between the focusing lens unit and the image-motion correcting lens unit. Therefore, it is desirable that the lens unit having a positive refractive power also includes a positive lens and a negative lens. Moreover, aberrations which occur when there is a shaking are mainly, the spherical aberration, the curvature of field, and the chromatic aberration of magnification. For reducing degradation of correction performance with respect to the shaking, it is necessary to reduce an amount of the aberrations which occur. Here, in the image-motion correcting lens unit, since the proportion of load of the refractive power being large (the refractive power being large), the aberration is susceptible to occur.

Therefore, the image-motion correcting lens unit is formed by the plurality of lenses and the predetermined lens. Moreover, by the plurality of lenses having the refractive power having a sign same as the sign of the refractive power of the image-motion correcting lens unit, it is possible to reduce occurrence of the spherical aberration and the curvature of field. Furthermore, by the predetermined lens having the refractive power having a sign different from the sign of the refractive power of the image-motion correcting lens unit, it is possible to correct the chromatic aberration favorably.

Moreover, it is desirable to let the plurality of lenses to be negative lenses, and the predetermined lens to be a positive lens, and to include at least one positive lens and two negative lenses.

Moreover, it is preferable that the focusing lens unit includes two lenses, and the lens unit having a positive refractive power, which is disposed between the focusing lens unit and the image-motion correcting lens unit, includes not more than two lenses, and the image-motion correcting lens unit includes three lenses. By making such an arrangement, it is possible to achieve a lens system having a small number of lenses, and in which, the focusing performance and correction performance with respect to the shaking are favorable.

Moreover, in the lens system according to the present embodiment, it is preferable that the single focal length lens system includes an image-motion correcting lens unit which satisfies the following conditional expression (15):

$$0.8 < |MG_{ISback} \times (MG_{IS} - 1)| < 5.0 \qquad (15)$$

where, $MG_{IS}$ denotes a lateral magnification of the image-motion correcting lens unit in an arbitrary focused state, and $MG_{ISback}$ denotes a lateral magnification of an overall optical system between the image-motion correcting lens unit and the image plane, in an arbitrary focused state.

When falling below a lower limit value of conditional expression (15), an effect of image-motion correction by shifting the image-motion correcting lens unit is not achieved sufficiently. When exceeding an upper limit value of conditional expression (15), since a proportion of load of the refractive power on the image-motion correcting lens unit becomes large, degradation of the correction performance with respect to the shaking becomes large.

Moreover, in the lens system according to the present embodiment, it is preferable that the focusing lens unit satisfies the following conditional expression (16):

$$1.5 < |(MG_{foback})^2 \times \{(MG_{fo})^2 - 1\}| < 8.0 \quad (16)$$

where, $MG_{fo}$ denotes a lateral magnification of the focusing lens unit in an arbitrary focused state, and $MG_{foback}$ denotes a lateral magnification of the overall optical system between the focusing lens unit and the image plane, in an arbitrary focused state.

When falling below a lower limit value of conditional expression (16), since the amount of movement of the focusing lens unit become excessively large, shortening the overall length of the lens system becomes difficult. When exceeding an upper limit value of conditional expression (16), since a position control of the focusing lens unit becomes difficult, it is not possible to carry out an accurate focusing.

Moreover, in the lens system according to the present embodiment, it is preferable that the front lens unit consists of the first lens unit and the second lens unit.

For shortening the overall length of the lens system, it is necessary to arrange the lens system to include a telephoto arrangement, as well as to enhance an effect due to the telephoto arrangement. For enhancing the effect due to the telephoto arrangement, it is preferable to dispose a lens unit having a positive refractive power nearest to the object, and to dispose a lens unit having a negative refractive power on the image side thereof. By making such an arrangement, correction of the spherical aberration, the coma and the astigmatism becomes possible mainly, while enhancing the effect due to the telephoto arrangement.

Here, the front lens unit consists of, in order from the object side to the image side, the first lens unit having a positive refractive power and the second lens unit having a positive refractive power. Accordingly, since the effect due to the telephoto arrangement is enhanced, it is possible to shorten the overall length of the lens system. Moreover, by making such an arrangement, it is possible to correct mainly the spherical aberration, the coma, and the astigmatism favorably, while enhancing the effect due to the telephoto arrangement.

Moreover, in the lens system according to the present embodiment, it is preferable that the aperture stop is disposed on the image side of any lens in the rear lens unit.

By making such an arrangement, it is possible to make a lens diameter small in the lens units on the image side of the aperture stop.

Moreover, in the lens system according to the present embodiment, it is preferable that the rear lens unit includes a positive lens unit which is disposed immediately before the aperture stop.

By making such an arrangement, it is possible to make an aperture diameter of the aperture stop even smaller.

Moreover, in the lens system according to the present embodiment, it is preferable that the positive lens unit which is disposed immediately before the aperture stop in the rear lens unit is a single lens.

By making such an arrangement, it is possible to make the lens unit light-weight, and moreover, it is possible to make a diaphragm unit light-weight.

Moreover, in the lens system according to the present embodiment, it is preferable that the following conditional expression (17) is satisfied:

$$0 < MG_{G2} \quad (17)$$

where, $MG_{G2}$ denotes a lateral magnification of the second lens unit at the time of focusing at an object at infinity.

When falling below a lower limit value of conditional expression (17), since the refractive power of the second lens unit becomes large, correction of the spherical aberration and the astigmatism becomes difficult. Moreover, since a light beam emerged from the second lens unit is diverged, a lens diameter in the rear lens unit becomes large. Therefore, small-sizing of a lens unit positioned on the image side of the second lens unit becomes difficult.

Moreover, in the lens system according to the present embodiment, it is preferable that the following conditional expression (18) is satisfied:

$$0.4 < D_{G1img}/f < 1.3 \quad (18)$$

where, $D_{G1img}$ denotes a distance along the optical axis from an object-side lens surface of the first lens unit up to the image plane at the time of focusing at an object at infinity, and f denotes the focal length of the single focal length lens system at the time of focusing at an object at infinity.

Conditional expression (18) is an expression which specifies a preferable ratio of the focal length of the overall lens system and the total length of the lens system (distance from a surface of incidence nearest to the object of the lens system up to an image plane). Satisfying conditional expression (18) is advantageous for achieving both of small sizing of the lens system and securing a favorable imaging performance. If conditional expression (18) is satisfied, the arrangement becomes more preferable for achieving both of the small-sizing of the lens system and securing an imaging performance, particularly when the lens system is formed as a telephoto lens system with a total angle of view not more than 28° and furthermore, not more than 20°.

Falling below a lower limit value of conditional expression (18) means carrying out further shortening of the lens system. When an attempt is made to carry out further shortening of the lens system, the total number of lenses in the lens system is to be increased and a special glass material is to be used for securing a favorable imaging performance. Therefore, if the value falls below the lower limit value of conditional expression (18), reducing the number lenses to be used and reducing cost become difficult.

If exceeding an upper limit value of conditional expression (18), since the overall length of the lens system with respect to the focal length of the overall lens system becomes long, a weight of the lens system is susceptible to become heavy.

Moreover, in the lens system according to the present embodiment, it is preferable that the focusing lens unit has a negative refractive power, and the rear lens unit includes an image-side lens unit having a positive refractive power which is disposed on the image side of the focusing lens unit.

When shortening of the overall length of the lens system is taken into consideration, it is preferable to let the refractive power of a lens unit positioned on the object side of the focusing lens unit to be a positive refractive power, and a refractive power of the focusing lens unit to be a negative refractive power. Since making such an arrangement leads to enhance further the effect due to the telephoto arrangement, such an arrangement is effective in shortening the overall length of the lens system. Moreover, if such an arrangement is made, since it is possible to dispose the focusing lens unit at a position where a light ray is converged gradually, it is possible to make a lens diameter small in the focusing lens unit. As a result of this, it is possible to make the focusing unit small-sized and light-weight.

Moreover, when such an arrangement is made, even if the refractive power of the focusing lens unit is made large, it is possible to make diverging of a light ray small after the light ray has passed through the focusing lens unit. Therefore, it is possible to make a diameter of the overall rear lens unit small while improving the focusing sensitivity. Furthermore, since it is possible to make the diameter of the rear lens unit small and an amount of movement of the focusing lens unit even smaller, it is possible to make the focusing unit further smaller and light-weight.

Moreover, by disposing the positive lens unit on the image side of the focusing lens unit, it is possible to improve the focusing sensitivity easily.

Moreover, in the lens system according to the present embodiment, it is preferable that the front lens unit has a positive refractive power as a whole, and the focusing lens unit has a negative refractive power.

In the front lens unit, it is desirable to impart a positive refractive power to the overall front lens unit while enhancing the effect due to the telephoto arrangement. Accordingly, since it is possible to reduce a proportion of load of the refractive power in the rear lens unit, it is possible to shorten the overall length of the lens system as well as to reduce an aberration which occurs in the rear lens unit. As a result, it is possible to secure a favorable imaging performance.

Moreover, by letting the refractive power of the focusing lens unit to be a negative refractive power, it is possible to enhance an effect of bringing a principal point closer to the object side. As a result, shortening the overall length of the lens system becomes easier.

Moreover, in the lens system according to the present embodiment, it is preferable that the diaphragm unit does not include a lens.

By making such an arrangement, it is possible to reduce an effect of a manufacturing error (tilt and shift) between the front lens unit and the rear lens unit.

Moreover, in the lens system according to the present embodiment, it is preferable that the diaphragm unit is disposed nearest to the object side of the rear lens unit.

In the front lens unit, it is desirable to impart a positive refractive power to the overall front lens unit while enhancing the effect due to the telephoto arrangement. Accordingly, since it is possible to reduce a proportion of load of the refractive power in the rear lens unit, it is possible to shorten the overall length of the lens system as well as to reduce an aberration which occurs in the rear lens unit. As a result, it is possible to secure a favorable imaging performance.

Here, the aperture stop can be deemed as one of the components that forms the rear lens unit, and can be deemed as a component that is independent of the front lens unit and the rear lens unit. In the latter case, the aperture stop becomes an component which forms the diaphragm unit.

Therefore, in a case in which, the diaphragm unit is let to be an independent component, it is preferable that the diaphragm unit is disposed nearest to the object side of the rear lens unit. Or, it is preferable that the diaphragm unit is disposed immediately after the front lens unit. By making such an arrangement, it is possible to make a diameter small in a lens unit on the image side of the diaphragm unit (aperture stop).

Moreover, when such an arrangement is made, the diaphragm unit is disposed between the front lens unit and the rear lens unit. Even in this case, since the aperture stop is disposed between the front lens unit and the rear lens unit, it is possible to make a lens diameter small in the lens units on the image side of the aperture stop.

Moreover, in the lens system according to the present embodiment, it is preferable that the diaphragm unit includes a lens unit having a positive refractive power only on the object side of a position of the aperture stop, and the lens unit having a positive refractive power is disposed close to the aperture stop.

As aforementioned, in a case in which, the diaphragm unit does not include a lens unit, it is possible to reduce an effect of a manufacturing error (tilt and shift) between the front lens unit and the rear lens unit. Whereas, by the diaphragm unit including a lens unit having a positive refractive power on the object side of the aperture stop, it is possible to make smaller an aperture diameter of the aperture stop.

Furthermore, it is preferable that the lens unit having a positive refractive power consists of one positive lens. By making such an arrangement, it is possible to make the lens unit light-weight.

Moreover, an arrangement may be made such that a single focal length lens system includes in order from an object side to an image side along an optical axis, a front lens unit having a positive refractive power, and a rear lens unit which includes an aperture stop, and the single focal length lens system does not include any other lens unit on the optical axis, and the rear lens unit includes a focusing lens unit having a negative refractive power, and the focusing lens unit is disposed on the image side of the aperture stop, and moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and the aforementioned conditional expressions (1) and (3) may be satisfied.

Moreover, an arrangement may be made such that the single focal length lens system includes in order from the object side to the image side along the optical axis, a front lens unit which includes an aperture stop, and a rear lens unit, and the single focal length lens system does not include any other lens unit on the optical axis, and the rear lens unit includes a focusing lens unit having a negative refractive power, and the focusing lens unit is disposed on the image side of the aperture stop, and moves along the optical axis at the time of focusing from an object at infinity to an object at a close distance, and the front lens unit does not include a lens which moves in the optical axial direction. Moreover, in this arrangement, an arrangement according to the aforementioned preferable embodiments may be provided as may be necessary. Moreover, an arrangement may be made to satisfy conditional expressions.

Moreover, in the lens system according to the present embodiment, it is preferable that the aperture stop is disposed on the image side of the second lens unit.

By making such an arrangement, it is possible to make a lens diameter small in the lens units on the image side of the aperture stop.

Moreover, in the lens system according to the present embodiment, it is preferable that the image-side lens unit includes a positive lens and a negative lens.

Moreover, in the lens system according to the present embodiment, it is preferable that the rear lens unit includes an aperture stop which is disposed immediately before the focusing lens unit.

By making such an arrangement, it is possible to make a lens diameter small in the lens units on the image side of the aperture stop.

Moreover, in the lens system according to the present embodiment, it is preferable that the rear lens unit includes an image-side lens unit having a positive refractive power, and the image-side lens unit is disposed on the image side of the focusing lens unit.

Moreover, in the lens system according to the present embodiment, it is preferable that the rear lens unit includes an aperture stop which is disposed on the object side of any lens in the rear lens unit.

Moreover, in the lens system according to the present embodiment, it is preferable that the rear lens unit includes an aperture stop, and a lens unit having a positive refractive power which is disposed immediately before the aperture stop.

By making such an arrangement, it is possible to make an aperture diameter of the aperture stop small.

Moreover, in the lens system according to the present embodiment, it is preferable that the lens unit having a positive refractive power which is disposed immediately before the aperture stop in the rear lens unit consists of one single lens.

Moreover, in the lens system according to the present embodiment, it is preferable that the focusing lens unit is disposed immediately after the diaphragm unit.

Moreover, in the lens system according to the present embodiment, it is preferable that the refractive power of the focusing lens unit is a negative refractive power, and the focusing lens unit is disposed immediately after the diaphragm unit.

Moreover, by disposing the focusing lens unit immediately on the image side of the diaphragm unit, it becomes easy to enhance the magnification of the focusing lens unit, and it is possible to further improve the focusing sensitivity. As a result, it is possible to make the focusing unit small-sized and light-weight.

Moreover, in the lens system according to the present embodiment, it is preferable that the diaphragm unit is disposed on the most object side of the rear lens unit. Or, in the lens system according to the present embodiment, it is preferable that the diaphragm unit is disposed immediately after the front lens unit.

Moreover, in the lens system according to the present embodiment, it is preferable that the following conditional expression (19) is satisfied:

$$0 \leq |f/r_{G2b}| < 7.0 \tag{19}$$

where, f denotes the focal length of the single focal length lens system at the time of focusing at an object at infinity, and $r_{G2b}$ denotes a paraxial radius of curvature of a lens surface on the object side of the focusing lens unit, immediately before the focusing lens unit.

When exceeding an upper limit value of conditional expression (19), an amount of occurrence of the spherical aberration and the coma increases at a lens surface immediately before the object side of the focusing lens unit. Since an effect of correction of these aberrations affect the focusing lens unit, it is not possible to secure a stable imaging performance at the time of focusing. Moreover, the lens surface on the object side of the focusing lens unit, immediately before the focusing lens unit, is a lens surface which is positioned on the object side of the focusing lens unit, and is a lens surface which is positioned nearest to the focusing lens unit.

Moreover, in the lens system according to the present embodiment, it is preferable that the following conditional expression (20) is satisfied:

$$0.5 \leq \phi_{fo}/\phi_{La} \leq 0.92 \tag{20}$$

where, $\phi_{fo}$ denotes a maximum effective aperture from among effective apertures of lenses in the focusing lens unit, and $\phi_{La}$ denotes a maximum effective aperture of a lens positioned nearest to the image in the single focal length lens system.

When exceeding a lower limit value of conditional expression (20), it is possible to suppress the refractive power of the focusing lens unit from becoming large, and to reduce the number of lenses in the focusing lens unit. As a result, it is possible to make the focusing lens unit light-weight. When falling below an upper limit value of conditional expression (20), it is possible to suppress the refractive power of the focusing lens unit from becoming excessively small, and to make the diameter of the focusing lens unit small. Moreover, it is possible to make the amount of movement of the focusing lens unit at the time of focusing small. As a result, it is possible to make the focusing unit small, to shorten the overall length of the optical system, and also to make a diameter of a lens frame small.

Moreover, in a case in which, the focusing lens unit includes a plurality of lenses, $\phi_{fo}$ is a maximum effective aperture from among effective apertures of surfaces of lenses. Moreover, a lens positioned nearest to the image has an object-side surface and an image-side surface. Therefore, $\phi_{La}$ is a maximum effective aperture from among an effective aperture of the object-side surface and an effective aperture of the image-side surface.

Moreover, in the lens system according to the present embodiment, it is preferable that the following conditional expression (21) is satisfied:

$$0.023 \leq D_{sfo}/D_{LTL} \leq 0.110 \tag{21}$$

where, $D_{sfo}$ denotes a distance on the optical axis from the aperture stop up to a lens surface nearest to an object of the focusing lens unit, $D_{LTL}$ denotes a distance on the optical axis from a lens surface nearest to the object of the single focal length lens system up to an image plane, and both $D_{sfo}$ and $D_{LTL}$ are distances at the time of focusing at an object at infinity.

In the lens system according to the present embodiment, a light beam is converged by using a positive refractive power of a lens unit which is positioned before the aperture stop. When exceeding a lower limit value of conditional expression (21), it is possible to achieve sufficiently an effect of converging the light beam. Therefore, it is possible to suppress the diameter of the focusing lens unit from becoming large. When falling below an upper limit value of conditional expression (21), it is possible to shorten the overall length of the optical system.

Moreover, in the lens system according to the present embodiment, it is preferable that the following conditional expression (22) is satisfied:

$$0.2 \leq D_{sfo}/\phi_s \leq 0.8 \tag{22}$$

where, $D_{sfo}$ denotes the distance on the optical axis from the aperture stop up to a lens surface nearest to an object of the focusing lens unit, and is a distance at the time of focusing at an object at infinity, and $\Phi_s$ denotes a maximum diameter of the aperture stop.

In the lens system according to the present embodiment, a light beam is converged by using a positive refractive power of a lens unit which is positioned before the aperture stop. When exceeding a lower limit value of conditional expression (22), it is possible to achieve sufficiently an effect of converging the light beam. Therefore, it is possible to make the diameter of the focusing lens unit small. When falling below an upper limit value of conditional expression (22), it is possible to shorten the overall length of the optical system.

Moreover, in the lens system according to the present embodiment, it is preferable that an optical system positioned on the image side of the focusing lens unit includes at least two positive lenses and one negative lens.

If the small-sizing of the focusing lens unit is carried out, the refractive power of the focusing lens unit becomes large. Therefore, in the focusing lens unit, the amount of occurrence of the spherical aberration, the longitudinal chromatic aberration, and the astigmatism tends to increase mainly. Here, the optical system positioned on the image side of the focusing lens unit has a positive refractive power. For suppressing a fluctuation in these aberrations at the time of focusing, it is preferable to make the amount of occurrence of these aberrations small in the optical system on the image side of the focusing lens unit.

The optical system positioned on the image side of the focusing lens unit is formed by one positive lens and one negative lens. At this time, by making Abbe number for the negative lens to be smaller than Abbe number for the positive lens, it is possible to suppress the occurrence of the chromatic aberration and the spherical aberration. Moreover, by using one more positive lens, it is possible to suppress the occurrence of the astigmatism easily. Moreover, for making the occurrence of these aberrations even smaller, it is preferable that the optical system positioned on the image side of the focusing lens unit includes at least two positive lenses.

Moreover, an image pickup apparatus according to the present embodiment includes an optical system, and an image pickup element which has an image pickup surface, and which converts an image formed on the image pickup surface by the optical system to an electric signal, and the optical system is one of the single focal length lens systems according to the aforementioned embodiments.

It is possible to realize an image pickup apparatus which has a superior mobility, and which is capable of carrying out photography with high resolution.

It is preferable that a plurality of abovementioned arrangements is satisfied simultaneously.

Moreover, by restricting either both or one of the upper limit value and the lower limit value in each conditional expression, it is possible to have that function assuredly, and therefore it is preferable.

For conditional expression (1), it is more preferable to let the lower limit value to be 0.08, and 0.1 is even more preferable.

Moreover, for conditional expression (1), it is more preferable to let the upper limit value to be 0.3, and 0.25 is even more preferable.

For conditional expression (2), it is more preferable to let the lower limit value to be −1.5, and −1.0 is even more preferable.

Moreover, for conditional expression (2), it is more preferable to let the upper limit value to be −0.1, and −0.12 is even more preferable.

For conditional expression (3), it is more preferable to let the lower limit value to be 0.1, and 0.15 is even more preferable.

Moreover, for conditional expression (3), it is more preferable to let the upper limit value to be 0.5, and 0.34 is even more preferable.

For conditional expression (5), it is more preferable to let the lower limit value to be 2.0.

Moreover, for conditional expression (5), it is more preferable to let the upper limit value to be 4.5.

For conditional expression (7), it is more preferable to let the lower limit value to be 0.35.

Moreover, for conditional expression (7), it is more preferable to let the upper limit value to be 1.0.

For conditional expression (9), it is more preferable to let the lower limit value to be −4.0, and −3.5 is even more preferable.

Moreover, for conditional expression (9), it is more preferable to let the upper limit value to be −1.7, and −1.8 is even more preferable.

For conditional expression (10), it is more preferable to let the lower limit value to be −6.0, and −3.5 is even more preferable.

Moreover, for conditional expression (10), it is more preferable to let the upper limit value to be −1.9, and −2.0 is even more preferable.

For conditional expression (14), it is more preferable to let the lower limit value to be 6, and 11 is even more preferable.

Moreover, for conditional expression (14), it is more preferable to let the upper limit value to be 30, and 27 is even more preferable.

For conditional expression (15), it is more preferable to let the lower limit value to be 1.3.

Moreover, for conditional expression (15), it is more preferable to let the upper limit value to be 3.5.

For conditional expression (16), it is more preferable to let the lower limit value to be 2.5.

Moreover, for conditional expression (16), it is more preferable to let the upper limit value to be 6.5.

For conditional expression (18), it is more preferable to let the lower limit value to be 0.5.

Moreover, for conditional expression (18), it is more preferable to let the upper limit value to be 1.0.

For conditional expression (19), it is more preferable to let the upper limit value to be 6.5. It is even more preferable to let the upper limit value to be 4.0, and 2.0 is all the more preferable.

For conditional expression (20), it is more preferable to let the lower limit value to be 0.6.

Moreover, for conditional expression (20), it is more preferable to let the upper limit value to be 0.88, and 0.85 is even more preferable.

For conditional expression (21), it is more preferable to let the lower limit value to be 0.025, and 0.04 is even more preferable.

Moreover, for conditional expression (21), it is more preferable to let the upper limit value to be 0.1, and 0.090 is even more preferable.

For conditional expression (22), it is more preferable to let the lower limit value to be 0.3, and 0.45 is even more preferable.

Moreover, for conditional expression (22), it is more preferable to let the upper limit value to be 0.75, and 0.7 is even more preferable.

Moreover, the aforementioned single focal length lens system and the image pickup apparatus may satisfy the plurality of arrangements simultaneously. Making such an arrangement is preferable for achieving a favorable single focal length lens system and an image pickup apparatus. Moreover, combinations of preferable arrangements are arbitrary. Moreover, for each conditional expression, only an upper limit value or a lower limit value of a numerical range of a conditional expression further restricted may be restricted.

Examples of the single focal length lens system according to the present invention will be described below in detail by referring to the accompanying diagrams. However, the present invention is not restricted to the examples described below.

Examples from an example 1 to an example 7 of the single focal length lens system will be described below. Lens cross-sectional views at the time of focusing at an object at infinity of the examples from the example 1 to the example 7 are shown in FIG. 1A, FIG. 1B, FIG. 2A, FIG. 2B, FIG. 3A, FIG. 3B, and FIG. 4. Each of the diagrams is a lens cross-sectional view at the time of focusing at an object at infinity.

In the lens cross-sectional diagrams, a first lens unit is denoted by G1, a second lens unit is denoted by G2, an aperture stop (brightness stop) is denoted by S, a third lens unit is denoted by G3, a fourth lens unit is denoted by G4, a fifth lens unit is denoted by G5, a sixth lens unit is denoted by G6, a seventh lens unit is denoted by G7, and an image plane is denoted by I. Although it is not shown in the diagrams, a parallel flat plate which forms a low-pass filter, and a cover glass of an electronic image pickup element may be disposed between a last lens unit and the image plane I. A wavelength region restricting coating which restricts infrared light may be applied to a surface of the parallel flat plate. Moreover, a multilayer film for restricting a wavelength region may be formed on a surface of the cover glass. Furthermore, the cover glass may be imparted a low-pass filter effect. An image pickup element is disposed on the image plane I.

In each example, the single focal length lens system includes in order from an object side to an image side, a front lens unit GF and a rear lens unit GR. Here, the rear lens unit GR includes an aperture stop S. However, the single focal length lens system may include the front lens unit GF, a diaphragm unit, and the rear lens unit GR in order from the object side to the image side. In a case of such arrangement, in lens systems according the example 1, the example 2, the example 3, the example 5, and the example 7, the diaphragm unit includes only the aperture stop S, and in the lens system of the example 4, the diaphragm unit includes the third lens unit G3 and an aperture stop.

A single focal length lens system according to the example 1, as shown in FIG. 1A, includes in order from an object side to an image side, a front lens unit GF having a positive refractive power and a rear lens unit GR having a negative refractive power. The rear lens unit GR includes an aperture stop. Here, r15 is the aperture stop and r23 is a virtual surface.

The front lens unit GF includes in order from the object side to the image side, a first lens unit G1 having a positive refractive power and a second lens unit G2 having a negative refractive power. The rear lens unit GR includes a third lens unit G3 having a negative refractive power, a fourth lens unit G4 having a positive refractive power, a fifth lens unit G5 having a negative refractive power, and a sixth lens unit G6 having a positive refractive power.

The first lens unit G1 includes a positive meniscus lens L1 having a convex surface directed toward the object side, a biconvex positive lens L2, a negative meniscus lens L3 having a convex surface directed toward the object side, a negative meniscus lens L4 having a convex surface directed toward the object side, and a biconvex positive lens L5. Here, the negative meniscus lens L4 and the biconvex positive lens L5 are cemented.

Moreover, a 1-1$^{th}$ sub lens unit includes the positive meniscus lens L1, the biconvex positive lens L2, and the negative meniscus lens L3. A 1-2$^{th}$ sub lens unit includes a negative meniscus lens L4 and the biconvex positive lens L5.

The second lens unit G2 includes a biconvex positive lens L6, a biconcave negative lens L7, and a biconcave negative lens L8. Here, the biconvex positive lens L6 and the biconcave negative lens L7 are cemented.

The third lens unit G3 includes a biconvex positive lens L9 and a biconcave negative lens L10. The third lens unit G3 is a focusing lens unit, and moves toward the image side along an optical axis at the time of focusing from an object at infinity to an object at a close distance.

The fourth lens unit G4 includes a negative meniscus lens L11 having a convex surface directed toward the object side and a biconvex positive lens L12. Here, the negative meniscus lens L11 and the biconvex positive lens L12 are cemented.

The fifth lens unit G5 includes a biconvex positive lens L13, a biconcave negative lens L14, and a biconcave negative lens L15. The fifth lens unit G5 is an image-motion correcting lens unit, and moves in a direction different from an optical axial direction, such as a direction orthogonal to the optical axis, at the time of image-motion correction.

The sixth lens unit G6 includes a biconvex positive lens L16 and a biconvex positive lens L17.

Figure 1B:
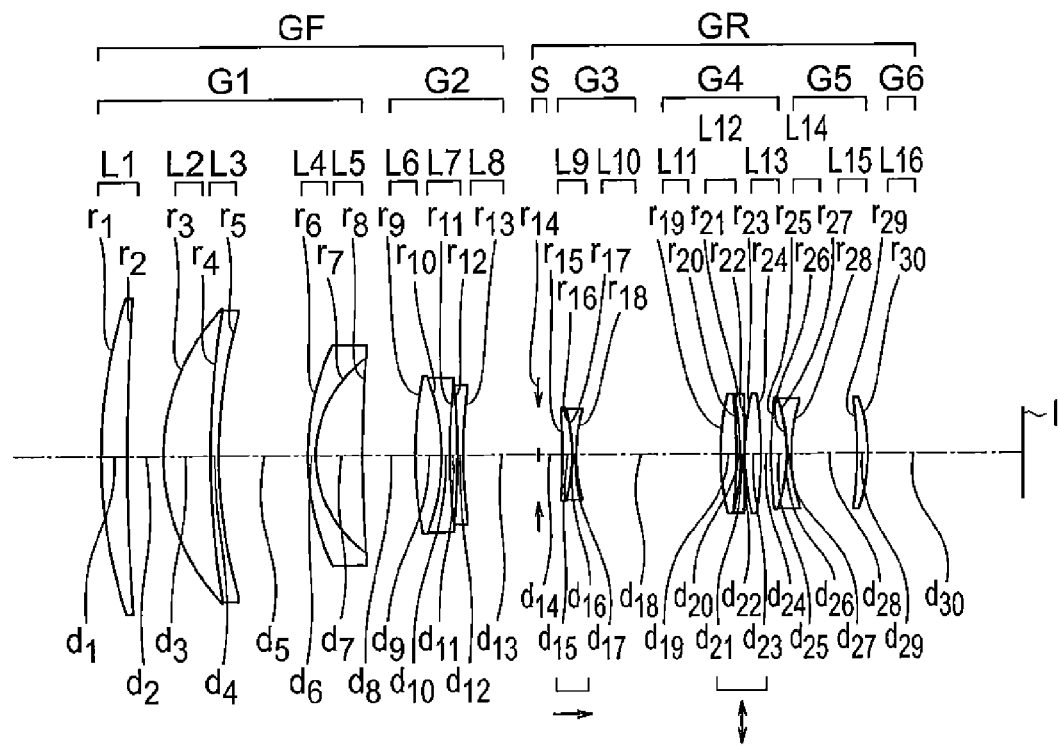

A single focal length lens system according to the example 2, as shown in FIG. 1B, includes in order from an object side to an image side, a front lens unit GF having a positive refractive power and a rear lens unit GR having a negative refractive power. The rear lens unit GR includes an aperture stop. Here, r14 is the aperture stop and there is no virtual surface.

The front lens unit GF includes in order from the object side to the image side, a first lens unit G1 having a positive refractive power and a second lens unit G2 having a negative refractive power. The rear lens unit GR includes a third lens unit G3 having a negative refractive power, a fourth lens unit G4 having a positive refractive power, a fifth lens unit G5 having a negative refractive power, and a sixth lens unit G6 having a positive refractive power.

The first lens unit G1 includes a positive meniscus lens L1 having a convex surface directed toward the object side, a positive meniscus lens L2 having a convex surface directed toward the object side, a negative meniscus lens L3 having a convex surface directed toward the object side, a negative meniscus lens L4 having a convex surface directed toward the object side, and a positive meniscus lens L5 having a convex surface directed toward the object side. Here, the positive meniscus lens L2 and the negative meniscus lens L3 are cemented. Moreover, the negative meniscus lens L4 and the positive meniscus lens L5 are cemented.

Moreover, a 1-1$^{th}$ sub lens unit includes the positive meniscus lens L1, the positive meniscus lens L2, and the negative meniscus lens L3. A 1-2$^{th}$ sub lens unit includes a negative meniscus lens L4 and the positive meniscus lens L5.

The second lens unit G2 includes a biconvex positive lens L6 and a biconcave negative lens L8. Here, the biconvex positive lens L6 and the biconcave negative lens L7 are cemented.

The third lens unit G3 includes a positive meniscus lens L9 having a convex surface directed toward the image side and a biconcave negative lens L10. The third lens unit G3 is a focusing lens unit, and moves toward the image side along an optical axis at the time of focusing from an object at infinity to an object at a close distance.

The fourth lens unit G4 includes a biconvex positive lens L11, a negative meniscus lens L12 having a convex surface directed toward the image side, and a biconvex positive lens L13. The fourth lens unit G4 is an image-motion correcting lens unit, and moves in a direction different from an optical axial direction, such as a direction orthogonal to the optical axis, at the time of image-motion correction.

The fifth lens unit G5 includes a biconvex positive lens L14 and a biconcave negative lens L15.

The sixth lens unit G6 includes a positive meniscus lens L16 having a convex surface directed toward the image side.

Figure 2A:
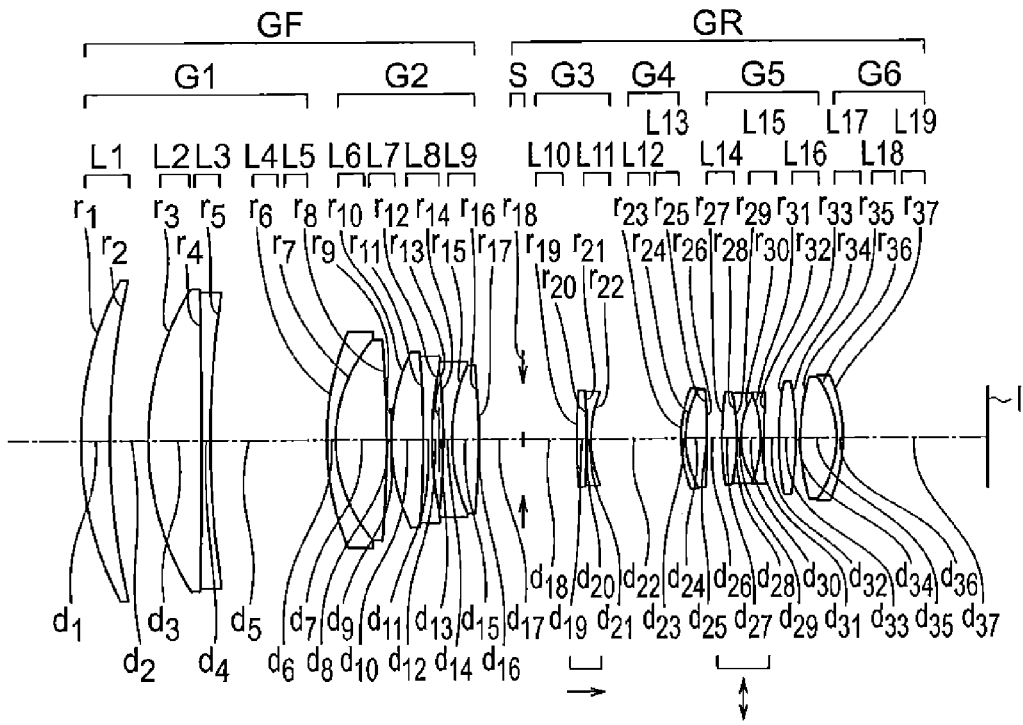
FIG. 2A and FIG. 2B are lens cross-sectional views at the time of focusing at an object at infinity of a single focal length lens systems according to the present invention, where.

A single focal length lens system according to the example 3, as shown in FIG. 2A, includes in order from an object side to an image side, a front lens unit GF having a positive refractive power and a rear lens unit GR having a negative refractive power. The rear lens unit GR includes an aperture stop. Here, r18 is the aperture stop and r9, r13, r17, and r26 are virtual surfaces.

The front lens unit GF includes in order from the object side to the image side, a first lens unit G1 having a positive refractive power and a second lens unit G2 having a negative refractive power. The rear lens unit GR includes a third lens unit G3 having a negative refractive power, a fourth lens unit G4 having a positive refractive power, a fifth lens unit G5 having a negative refractive power, and a sixth lens unit G6 having a positive refractive power.

The first lens unit G1 includes a positive meniscus lens L1 having a convex surface directed toward the object side, a biconvex positive lens L2, a biconcave negative lens L3, a negative meniscus lens L4 having a convex surface directed toward the object side, and a biconvex positive lens L5. Here, the biconvex positive lens L2 and the biconcave negative lens L3 are cemented. Moreover, the negative meniscus lens L4 and the biconvex positive lens L5 are cemented.

Moreover, a 1-1$^{th}$ sub lens unit includes the positive meniscus lens L1, the biconvex positive lens L2, and the biconcave negative lens L3. A 1-2$^{th}$ sub lens unit includes a negative meniscus lens L4 and the biconvex positive lens L5.

The second lens unit G2 includes a biconvex positive lens L6, a biconcave negative lens L7, a biconvex positive lens L8, and a biconcave negative lens L9. Here, the biconvex positive lens L6 and the biconcave negative lens L7 are cemented. Moreover, the biconvex positive lens L8 and the biconcave negative lens L9 are cemented.

The third lens unit G3 includes a biconvex positive lens L10 and a biconcave negative lens L11. The third lens unit is a focusing lens unit, and moves toward the image side along an optical axis at the time of focusing from an object at infinity to an object at a close distance.

The fourth lens unit G4 includes a negative meniscus lens L12 having a convex surface directed toward the object side and a biconvex positive lens L13. Here, the negative meniscus lens L12 and the biconvex positive lens L13 are cemented.

The fifth lens unit G5 includes a biconvex positive lens L14, a biconcave negative lens L15, and a biconvex positive lens L16. The fifth lens unit G5 is an image-motion correcting lens unit, and moves in a direction different from an optical axial direction, such as a direction orthogonal to the optical axis, at the time of image-motion correction.

The sixth lens unit G6 includes a biconvex positive lens L17, a biconvex positive lens L18, and a negative meniscus lens L19 having a convex surface directed toward the image side. Here, the biconvex positive lens L18 and the negative meniscus lens L19 are cemented.

Figure 2B:
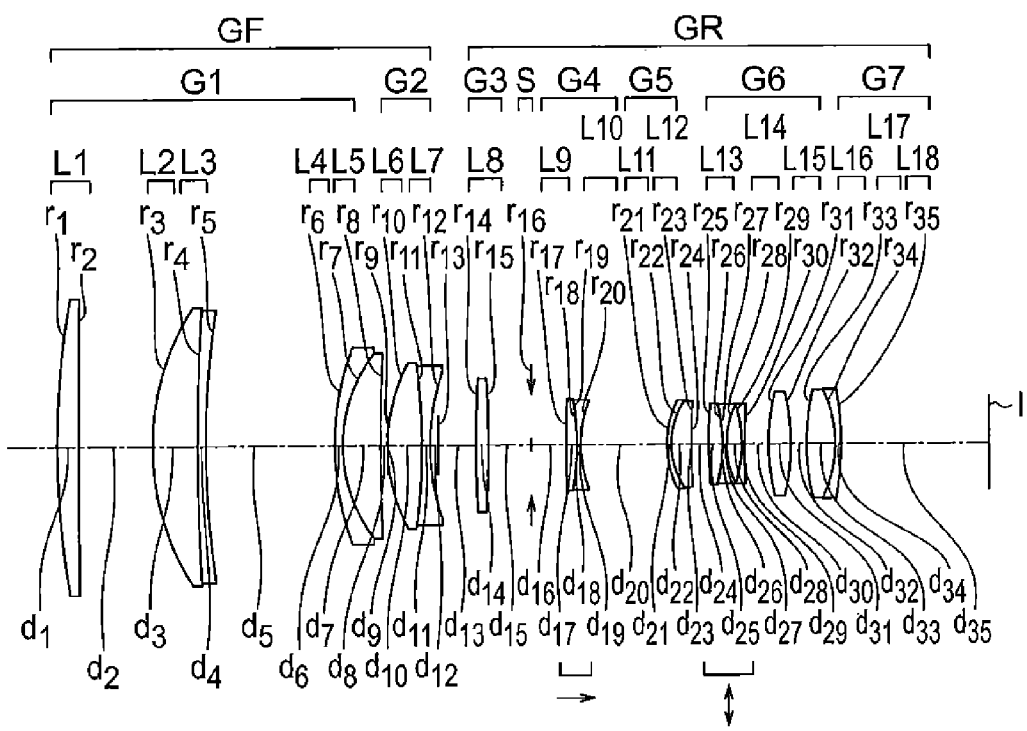

A single focal length lens system according to the example 4, as shown in FIG. 2B, includes in order from an object side to an image side, a front lens unit GF having a positive refractive power and a rear lens unit GR having a negative refractive power. The rear lens unit GR includes an aperture stop. Here, r16 is the aperture stop, and r9, r13, and r24 are virtual surfaces.

The front lens unit GF includes in order from the object side to the image side, a first lens unit G1 having a positive refractive power and a second lens unit G2 having a negative refractive power. The rear lens unit GR includes a third lens unit G3 having a positive refractive power, a fourth lens unit G4 having a negative refractive power, a fifth lens unit G5 having a positive refractive power, a sixth lens unit G6 having a negative refractive power, and a seventh lens unit G7 having a positive refractive power.

The first lens unit G1 includes a positive meniscus lens L1 having a convex surface directed toward the object side, a positive meniscus lens L2 having a convex surface directed toward the object side, a negative meniscus lens L3 having a convex surface directed toward the object side, a negative meniscus lens L4 having a convex surface directed toward the object side, and a positive meniscus lens L5 having a convex surface directed toward the object side. Here, the positive meniscus lens L2 and the negative meniscus lens L3 are cemented. Moreover, the negative meniscus lens L4 and the positive meniscus lens L5 are cemented.

Moreover, a 1-1$^{th}$ sub lens unit includes the positive meniscus lens L1, the positive meniscus lens L2, and the negative meniscus lens L3. A 1-2$^{th}$ sub lens unit includes the negative meniscus lens L4 and the positive meniscus lens L5.

The second lens unit G2 includes a biconvex positive lens L6 and a biconcave negative lens L7. Here, the biconvex positive lens L6 and the biconcave negative lens L7 are cemented.

The third lens unit G3 includes a biconvex positive lens L8. The biconvex positive lens L8, together with the aperture stop S, forms a diaphragm unit.

The fourth lens unit G4 includes a biconvex positive lens L9 and a biconcave negative lens L10. The fourth lens unit G4 is a focusing lens unit, and moves toward the image side along an optical axis at the time of focusing from an object at infinity to an object at a close distance.

The fifth lens unit G5 includes a negative meniscus lens L11 having a convex surface directed toward the object side and a positive meniscus lens L12 having a convex surface directed toward the object side. Here, the negative meniscus lens L11 and the positive meniscus lens L12 are cemented.

The sixth lens unit G6 includes a biconvex positive lens L13, a biconcave negative lens L14, and a biconvex positive lens L15. The sixth lens unit G6 is an image-motion correcting lens unit, and moves in a direction different from an optical axial direction, such as a direction orthogonal to the optical axis, at the time of image-motion correction.

The seventh lens unit G7 includes a biconvex positive lens L16, a biconvex positive lens L17, and a negative meniscus lens L18 having a convex surface directed toward the image side. Here, the biconvex positive lens L17 and the negative meniscus lens L18 are cemented.

Figure 3A:
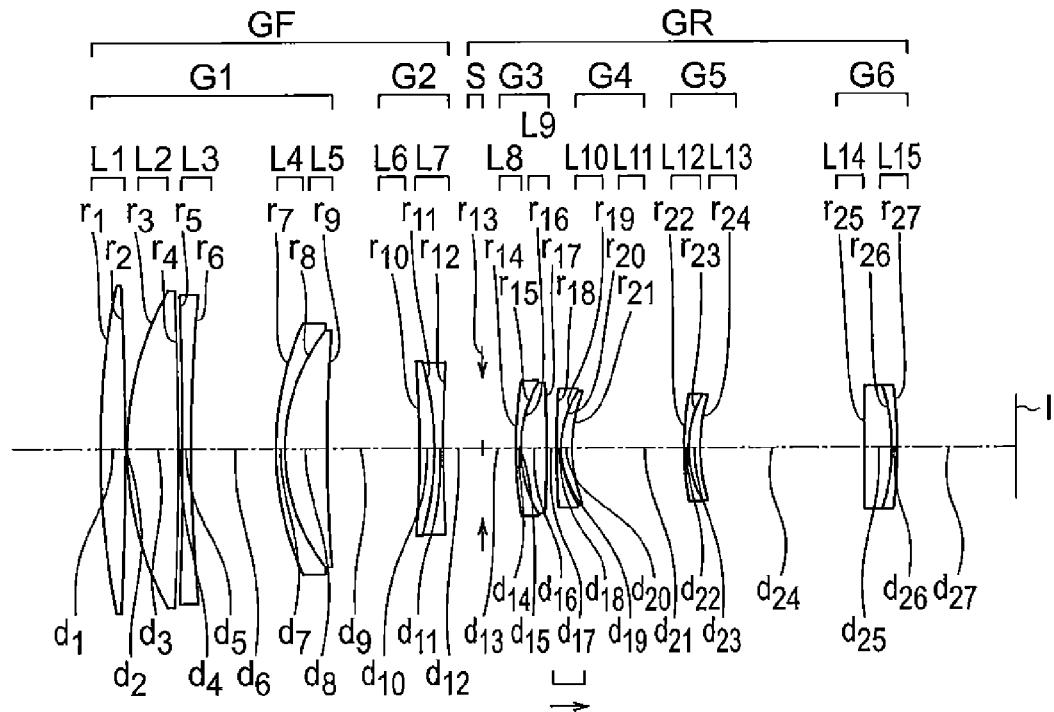
FIG. 3A and FIG. 3B are lens cross-sectional views at the time of focusing at an object at infinity of a single focal length lens systems according to the present invention, where.

A single focal length lens system according to the example 5, as shown in FIG. 3A, includes in order from an object side to an image side, a front lens unit GF having a positive refractive power and a rear lens unit GR having a negative refractive power. The rear lens unit GR includes an aperture stop. Here, r13 is the aperture stop, and there no virtual surface.

The front lens unit GF includes in order from the object side to the image side, a first lens unit G1 having a positive refractive power and a second lens unit G2 having a negative refractive power. The rear lens unit GR includes a third lens unit G3 having a positive refractive power, a fourth lens unit G4 having a negative refractive power, a fifth lens unit G5 having a negative refractive power, and a sixth lens unit G6 having a positive refractive power.

The first lens unit G1 includes a biconvex positive lens L1, a biconvex positive lens L2, a biconcave negative lens L3, a negative meniscus lens L4 having a convex surface directed toward the object side, and a positive meniscus lens L5 having a convex surface directed toward the object side. Here, the negative meniscus lens L4 and the positive meniscus lens L5 are cemented.

Moreover, a 1-1$^{th}$ sub lens unit includes the biconvex positive lens L1, the biconvex positive lens L2, and the biconcave negative lens L3. A 1-2$^{th}$ sub lens unit includes the negative meniscus lens L4 and the positive meniscus lens L5.

The second lens unit G2 includes a positive meniscus lens L6 having a convex surface directed toward the image side and a biconcave negative lens L7. Here, the positive meniscus lens L6 and the biconcave negative lens L7 are cemented.

The third lens unit G3 includes a negative meniscus lens L8 having a convex surface directed toward the object side and a biconvex positive lens L9.

The fourth lens unit G4 includes a negative meniscus lens L10 having a convex surface directed toward the object side and a positive meniscus lens L11 having a convex surface directed toward the object side. The fourth lens unit G4 is a focusing lens unit, and moves toward the image side along an optical axis at the time of focusing from an object at infinity to an object at a close distance.

The fifth lens unit G5 includes a negative meniscus lens L12 having a convex surface directed toward the object side and a positive meniscus lens L13 having a convex surface directed toward the object side. Here, the negative meniscus lens L12 and the positive meniscus lens L13 are cemented.

The sixth lens unit G6 includes a biconvex positive lens L14 and a negative meniscus lens L15 having a convex surface directed toward the image side. Here, the biconvex positive lens L14 and the negative meniscus lens L15 are cemented.

Figure 3B:
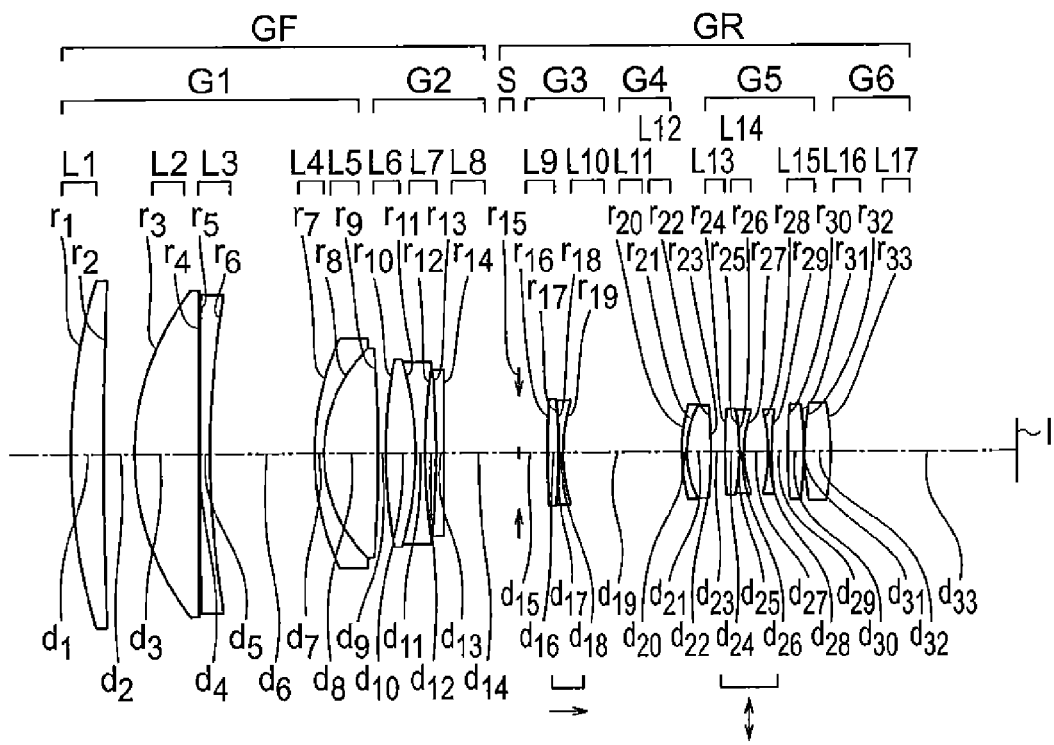

A single focal length lens system according to the example 6, as shown in FIG. 3B, includes in order from an object side to an image side, a front lens unit GF having a positive refractive power and a rear lens unit GR having a negative refractive power. The rear lens unit GR includes an aperture stop. Here, r15 is the aperture stop, and r23 is a virtual surface.

The front lens unit GF includes in order from the object side to the image side, a first lens unit G1 having a positive refractive power and a second lens unit G2 having a negative refractive power. The rear lens unit GR includes a third lens unit having a negative refractive power, a fourth lens unit G4 having a positive refractive power, a fifth lens unit G5 having a negative refractive power, and a sixth lens unit G6 having a positive refractive power.

The first lens unit G1 includes a positive meniscus lens L1 having a convex surface directed toward the object side, a biconvex positive lens L2, a negative meniscus lens L3 having a convex surface directed toward the object side, a negative meniscus lens L4 having a convex surface directed toward the object side, and biconvex positive lens L5. Here, the negative meniscus lens L4 and the biconvex positive lens L5 are cemented.

Moreover, a 1-1$^{th}$ sub lens unit includes the positive meniscus lens L1, the biconvex positive lens L2, and the negative meniscus lens L3. A 1-2$^{th}$ sub lens unit includes the negative meniscus lens L4 and the biconvex positive lens L5.

The second lens unit G2 includes a biconvex positive lens L6, a biconcave negative lens L7, and a biconcave negative lens L8. Here, the biconvex positive lens L6 and the biconcave negative lens L7 are cemented.

The third lens unit G3 includes a biconvex positive lens 9 and a biconcave negative lens L10. The third lens unit G3 is a focusing lens unit, and moves toward the image side along an optical axis at the time of focusing from an object at infinity to an object at a close distance.

The fourth lens unit G4 includes a negative meniscus lens L11 having a convex surface directed toward the object side and a biconvex positive lens L12. Here, the negative meniscus lens L11 and the biconvex positive lens L12 are cemented.

The fifth lens unit G5 includes a biconvex positive lens L13, a biconcave negative lens L14, and a biconcave negative lens L15. The fifth lens unit G5 is an image-motion correcting lens unit, and moves in a direction different from an optical axial direction, such as a direction orthogonal to the optical axis, at the time of image-motion correction.

The sixth lens unit G6 includes a biconvex positive lens L16 and a biconvex positive lens L17.

Figure 4:
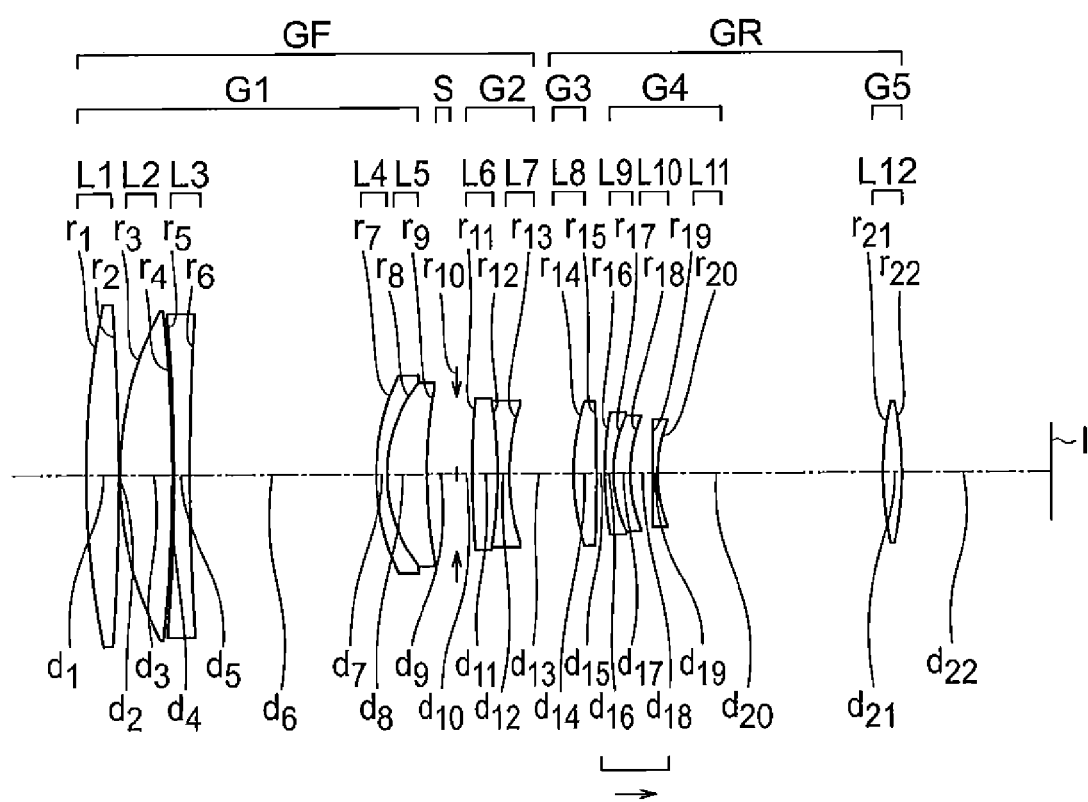
FIG. 4 is a lens cross-sectional view at the time of focusing at an object at infinity of a single focal length lens system according to the present invention, and is a lens cross-sectional view of a single focal length lens system according to an example 7.
Figures 6A, 6B, 6C, 6D:
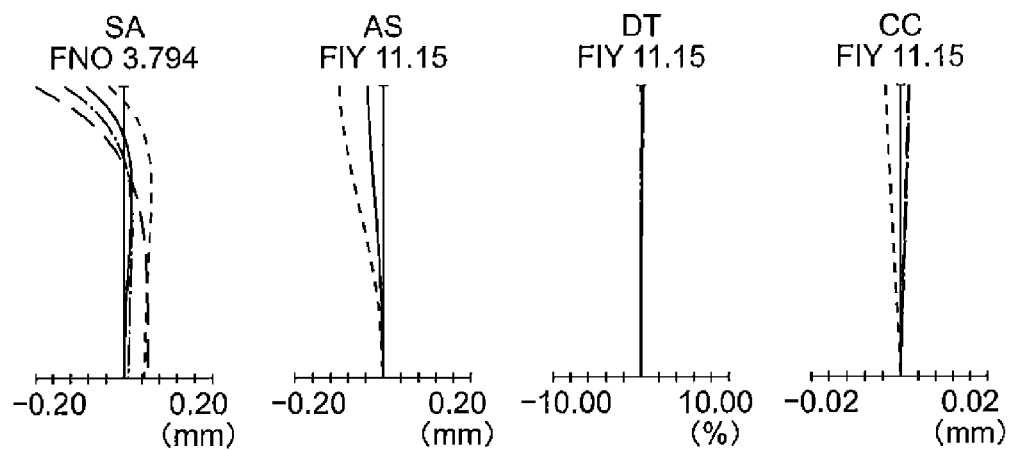
FIG. 6A, FIG. 6B, FIG. 6C, and FIG. 6D are aberration diagrams at the time of focusing at an object at infinity of the single focal length lens system according to the example 2.
Figures 6E, 6F, 6G, 6H:
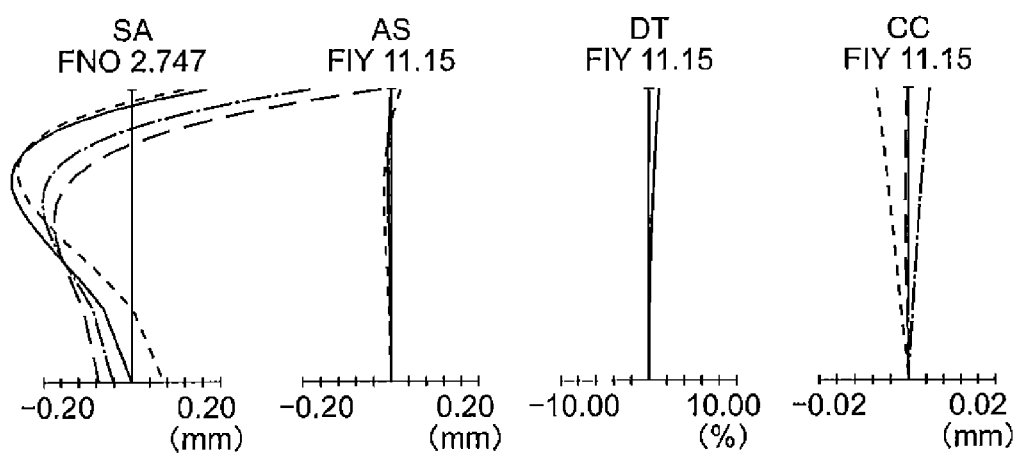
FIG. 6E, FIG. 6F, FIG. 6G, and FIG. 6H are aberration diagrams at the time of focusing at an object at a close distance of the single focal length lens system according to the example 2.
Figures 10A, 10B, 10C, 10D:
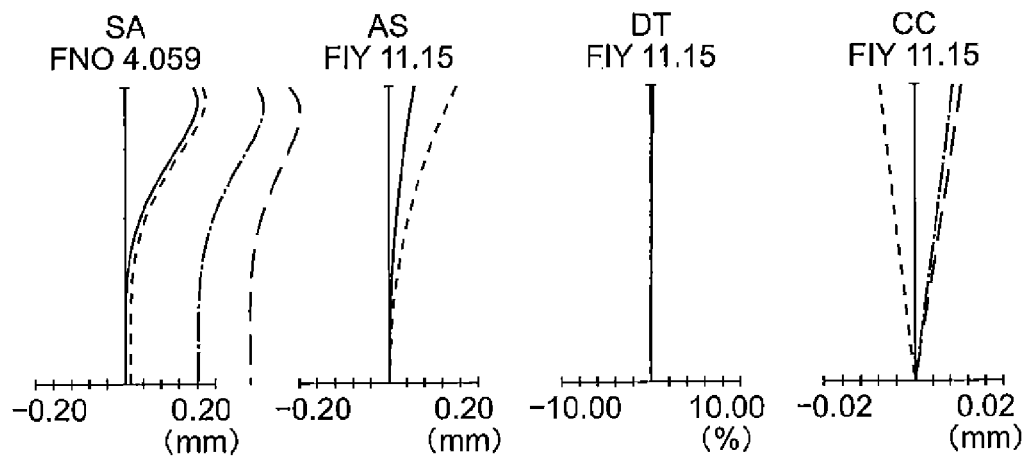
FIG. 10A, FIG. 10B, FIG. 10C, and FIG. 10D are aberration diagrams at the time of focusing at an object at infinity of the single focal length lens system according to the example 6.
Figures 10E, 10F, 10G, 10H:
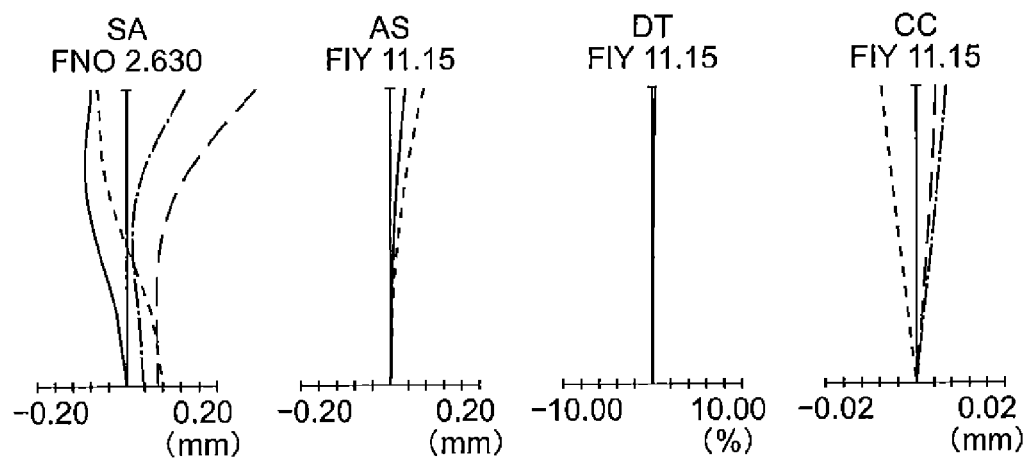
FIG. 10E, FIG. 10F, FIG. 10G, and FIG. 10H are aberration diagrams at the time of focusing at an object at a close distance of the single focal length lens system according to the example 6.

A single focal length lens system according to the example 7, as shown in FIG. 4, includes in order from an object side to an image side, a front lens unit GF having a positive refractive power and a rear lens unit GR having a positive refractive power. The front lens unit GF includes an aperture stop.

The front lens unit GF includes in order from the object side to the image side, a first lens unit G1 having a positive refractive power, an aperture stop S, and a second lens unit G2 having a negative refractive power. The rear lens unit GR includes a third lens unit G3 having a positive refractive power, a fourth lens unit G4 having a negative refractive power, and a fifth lens unit G5 having a positive refractive power.

The first lens unit G1 includes a biconvex positive lens L1, a biconvex positive lens L2, a biconcave negative lens L3, a negative meniscus lens L4 having a convex surface directed toward the object side, and a positive meniscus lens L5 having a convex surface directed toward the object side. Here, the negative meniscus lens L4 and the positive meniscus lens L5 are cemented.

Moreover, a 1-1$^{th}$ sub lens unit includes the biconvex positive lens L1, the biconvex positive lens L2, and the biconcave negative lens L3. A 1-2$^{th}$ sub lens unit includes the negative meniscus lens L4 and the positive meniscus lens L5.

The second lens unit G2 includes a biconvex positive lens L6 and a biconcave negative lens L7. Here, the biconvex positive lens L6 and the biconcave negative lens L7 are cemented.

The third lens unit G3 includes a biconvex positive lens L8.

The fourth lens unit G4 includes a negative meniscus lens L9 having a convex surface directed toward the object side, a positive meniscus lens L10 having a convex surface directed toward the object side, and a biconcave negative lens L11. Here, the negative meniscus lens L9 and the positive meniscus lens L10 are cemented. The fourth lens unit G4 is a focusing lens unit, and moves toward the image side along an optical axis at the time of focusing from an object at infinity to an object at a close distance.

The fifth lens unit G5 includes a biconvex positive lens L12.

Numerical data of each example is shown below. Apart from the aforementioned symbols, r denotes a radius of curvature of a lens surface, d denotes a distance between lens surfaces, nd denotes a refractive index for a d-line of each lens, and vd denotes Abbe number for each lens. Moreover f denotes a focal length of the overall single focal length lens system, FNO. denotes an F-number, ω denotes a half angle of view, IH denotes an image height, FB denotes a back focus, and Lens total length is a distance from a lens surface nearest to the object of the single focal length lens system up to a lens surface nearest to the image of the single focal length lens system. FB (back focus) is a value which is a distance from the last lens surface up to a paraxial image plane expressed upon air conversion. Moreover, the unit of length for each numerical value is mm, and the unit of angle is ° (degree).

Moreover, Infinity indicates the time of focusing at an object at infinity and Close distance indicates the time of focusing at an object at a close distance. Here, values in a column of close distance are values in a state of being focused at an object at a closest distance. A practical distance between an object and an image in the state of being focused at an object at a closest distance is 1.4 m in the examples 1, 2, 3, 4, 5, and 7, and 2 m in the example 6.

EXAMPLE 1

Unit mm

Surface data

| Surface no. | r | d | nd | vd |
|---|---|---|---|---|
| 1 | 132.985 | 6.746 | 1.48749 | 70.23 |
| 2 | 833.805 | 6.500 | | |
| 3 | 56.824 | 13.500 | 1.49700 | 81.54 |
| 4 | −18692.587 | 0.100 | | |
| 5 | 2292.831 | 2.000 | 1.83481 | 42.71 |
| 6 | 194.055 | 22.000 | | |
| 7 | 58.436 | 2.000 | 1.79952 | 42.22 |
| 8 | 31.339 | 11.474 | 1.43875 | 94.93 |
| 9 | −283.074 | 1.600 | | |
| 10 | 114.275 | 6.289 | 1.75520 | 27.51 |
| 11 | −67.671 | 2.000 | 1.91082 | 35.25 |
| 12 | 130.501 | 2.322 | | |
| 13 | −202.441 | 1.500 | 1.78590 | 44.20 |
| 14 | 1233.704 | 16.000 | | |
| 15(Stop) | ∞ | Variable | | |
| 16 | 282.863 | 2.200 | 1.84666 | 23.78 |
| 17 | −124.870 | 0.100 | | |
| 18 | −110.471 | 0.900 | 1.80139 | 45.45 |
| 19 | 38.312 | Variable | | |
| 20 | 39.801 | 1.000 | 1.92286 | 18.90 |
| 21 | 22.065 | 4.963 | 1.58267 | 46.42 |
| 22 | −136.632 | 0.100 | | |
| 23 | ∞ | 3.000 | | |
| 24 | 112.013 | 3.000 | 1.84666 | 23.78 |
| 25 | −47.684 | 0.100 | | |
| 26 | −51.871 | 0.900 | 1.80400 | 46.57 |
| 27 | 24.988 | 5.044 | | |
| 28 | −37.965 | 0.800 | 1.69680 | 55.53 |
| 29 | 77.357 | 3.300 | | |
| 30 | 95.000 | 3.393 | 1.72342 | 37.95 |
| 31 | −82.082 | 0.100 | | |
| 32 | 55.512 | 5.500 | 1.51633 | 64.14 |
| 33 | −51.010 | | | |
| Image plane | ∞ | | | |

Various data

| | Infinity | Close distance |
|---|---|---|
| f | 293.568 | 211.066 |
| FNO. | 4.059 | 2.907 |
| 2ω(Angle of view) | 4.3 | |
| IH | 11.15 | 11.15 |
| FB | 39.180 | 39.180 |
| Lens total length | 198.6775 | 198.6775 |
| d15 | 6.000 | 24.855 |
| d19 | 25.067 | 6.212 |

EXAMPLE 2

Unit mm

Surface data

| Surface no. | r | d | nd | vd |
|---|---|---|---|---|
| 1 | 129.053 | 6.500 | 1.48749 | 70.23 |
| 2 | 524.363 | 9.000 | | |
| 3 | 54.665 | 11.500 | 1.49700 | 81.54 |
| 4 | 227.526 | 2.000 | 1.83481 | 42.71 |
| 5 | 127.067 | 22.000 | | |
| 6 | 65.938 | 2.000 | 1.80100 | 34.97 |
| 7 | 30.235 | 11.510 | 1.49700 | 81.54 |
| 8 | 333.862 | 13.109 | | |
| 9 | 101.957 | 6.630 | 1.84666 | 23.78 |
| 10 | −55.370 | 2.000 | 1.80100 | 34.97 |
| 11 | 150.959 | 1.850 | | |
| 12 | −226.650 | 1.500 | 1.80000 | 29.84 |
| 13 | 137.511 | 18.804 | | |
| 14(Stop) | ∞ | Variable | | |
| 15 | −172.777 | 2.409 | 1.84666 | 23.78 |
| 16 | −40.436 | 0.100 | | |
| 17 | −42.309 | 0.900 | 1.77250 | 49.60 |
| 18 | 40.347 | Variable | | |
| 19 | 68.843 | 3.787 | 1.88300 | 40.76 |
| 20 | −129.270 | 0.954 | | |
| 21 | −70.637 | 1.000 | 1.92286 | 18.90 |
| 22 | −1887.125 | 0.100 | | |
| 23 | 65.708 | 4.000 | 1.60311 | 60.64 |
| 24 | −108.573 | 2.500 | | |
| 25 | 123.098 | 3.866 | 1.71736 | 29.52 |
| 26 | −41.995 | 0.100 | | |
| 27 | −41.898 | 1.000 | 1.88300 | 40.76 |
| 28 | 43.554 | 16.332 | | |
| 29 | −94.313 | 2.610 | 1.60342 | 38.03 |
| 30 | −44.999 | | | |
| Image plane | ∞ | | | |

Various data

| | Infinity | Close distance |
|---|---|---|
| f | 293.991 | 214.486 |
| FNO. | 3.794 | 2.747 |
| 2ω(Angle of view) | 4.3 | |
| IH | 11.15 | 11.15 |
| FB | 38.733 | 38.733 |
| Lens total length | 228.5778 | 228.5778 |
| d14 | 6.000 | 33.785 |
| d18 | 35.785 | 8.000 |

EXAMPLE 3

Unit mm

Surface data

| Surface no. | r | d | nd | vd |
|---|---|---|---|---|
| 1 | 80.000 | 6.500 | 1.48749 | 70.23 |
| 2 | 163.286 | 8.700 | | |
| 3 | 67.218 | 12.000 | 1.48749 | 70.23 |

-continued

| Unit mm | | | | |
|---|---|---|---|---|
| 4 | −1613.765 | 2.000 | 1.77250 | 49.60 |
| 5 | 219.580 | 26.200 | | |
| 6 | 65.771 | 2.000 | 1.80440 | 39.59 |
| 7 | 35.383 | 11.500 | 1.43875 | 94.93 |
| 8 | −297.854 | 1.000 | | |
| 9 | ∞ | 0.100 | | |
| 10 | 46.341 | 7.300 | 1.43875 | 94.93 |
| 11 | −244.075 | 2.000 | 1.75500 | 52.32 |
| 12 | 86.236 | 1.600 | | |
| 13 | ∞ | 1.000 | | |
| 14 | −155.994 | 2.000 | 1.83400 | 37.16 |
| 15 | 43.082 | 6.005 | 1.74000 | 28.30 |
| 16 | −186.865 | 0.000 | | |
| 17 | ∞ | 10.058 | | |
| 18(Stop) | ∞ | Variable | | |
| 19 | 151.273 | 2.200 | 1.84666 | 23.78 |
| 20 | −169.720 | 0.100 | | |
| 21 | −169.720 | 0.900 | 1.80400 | 46.57 |
| 22 | 27.611 | Variable | | |
| 23 | 31.737 | 1.000 | 1.92286 | 18.90 |
| 24 | 22.839 | 4.900 | 1.57135 | 52.95 |
| 25 | −187.931 | 0.100 | | |
| 26 | ∞ | 3.272 | | |
| 27 | 78.111 | 3.300 | 1.84666 | 23.78 |
| 28 | −49.169 | 0.100 | | |
| 29 | −49.169 | 0.900 | 1.77250 | 49.60 |
| 30 | 19.331 | 4.379 | | |
| 31 | −27.665 | 0.800 | 1.72916 | 54.68 |
| 32 | 188.751 | 3.300 | | |
| 33 | 71.535 | 3.850 | 1.66680 | 33.05 |
| 34 | −73.227 | 1.000 | | |
| 35 | 51.022 | 8.100 | 1.53172 | 48.84 |
| 36 | −24.541 | 1.500 | 1.92286 | 18.90 |
| 37 | −35.734 | | | |
| Image plane | ∞ | | | |

Various data

| | Infinity | Close distance |
|---|---|---|
| f | 296.636 | 216.939 |
| FNO. | 4.133 | 2.996 |
| 2ω(Angle of view) | 4.3 | |
| IH | 11.45 | 11.45 |
| FB | 32.811 | 32.811 |
| Lens total length | 205.0604 | 205.0604 |
| d18 | 12.186 | 28.886 |
| d22 | 20.399 | 3.700 |

EXAMPLE 4

Unit mm

Surface data

| Surface no. | r | d | nd | vd |
|---|---|---|---|---|
| 1 | 211.537 | 5.200 | 1.48749 | 70.23 |
| 2 | 2910.618 | 18.098 | | |
| 3 | 65.000 | 11.000 | 1.48749 | 70.23 |
| 4 | 588.917 | 2.000 | 1.77250 | 49.60 |
| 5 | 212.141 | 31.500 | | |
| 6 | 69.815 | 2.000 | 1.80440 | 39.59 |
| 7 | 37.924 | 9.200 | 1.43875 | 94.93 |
| 8 | 434.246 | 1.711 | | |
| 9 | ∞ | 0.100 | | |
| 10 | 43.603 | 8.500 | 1.43875 | 94.93 |
| 11 | −161.049 | 2.000 | 1.77250 | 49.60 |
| 12 | 55.257 | 2.000 | | |
| 13 | ∞ | 9.352 | | |
| 14 | 307.448 | 3.000 | 1.80810 | 22.76 |
| 15 | −274.895 | 10.557 | | |
| 16(Stop) | ∞ | Variable | | |

-continued

| Unit mm | | | | |
|---|---|---|---|---|
| 17 | 280.313 | 2.600 | 1.83400 | 37.16 |
| 18 | −65.868 | 0.100 | | |
| 19 | −65.868 | 0.900 | 1.75500 | 52.32 |
| 20 | 30.383 | Variable | | |
| 21 | 26.080 | 1.000 | 1.84666 | 23.78 |
| 22 | 19.668 | 4.900 | 1.53996 | 59.46 |
| 23 | 168.839 | 0.100 | | |
| 24 | ∞ | 4.218 | | |
| 25 | 97.746 | 3.300 | 1.84666 | 23.78 |
| 26 | −40.187 | 0.100 | | |
| 27 | −40.187 | 0.900 | 1.77250 | 49.60 |
| 28 | 22.475 | 3.722 | | |
| 29 | −33.295 | 0.800 | 1.72916 | 54.68 |
| 30 | 241.876 | 5.718 | | |
| 31 | 52.470 | 5.500 | 1.63980 | 34.46 |
| 32 | −54.148 | 3.779 | | |
| 33 | 57.978 | 7.000 | 1.53172 | 48.84 |
| 34 | −31.015 | 1.500 | 1.92286 | 18.90 |
| 35 | −71.450 | | | |
| Image plane | ∞ | | | |

Various data

| | Infinity | Close distance |
|---|---|---|
| f | 294.032 | 229.457 |
| FNO. | 4.086 | 3.160 |
| 2ω(Angle of view) | 4.4 | |
| IH | 11.45 | 11.45 |
| FB | 36.300 | 36.300 |
| Lens total length | 228.4685 | 228.4685 |
| d16 | 8.545 | 26.113 |
| d20 | 21.268 | 3.700 |

EXAMPLE 5

Unit mm

Surface data

| Surface no. | r | d | nd | vd |
|---|---|---|---|---|
| 1 | 192.006 | 5.529 | 1.48749 | 70.23 |
| 2 | −759.266 | 0.479 | | |
| 3 | 75.914 | 11.157 | 1.43875 | 94.93 |
| 4 | −749.613 | 0.849 | | |
| 5 | −1141.990 | 1.958 | 1.88300 | 40.76 |
| 6 | 393.624 | 18.621 | | |
| 7 | 69.365 | 1.968 | 1.83481 | 42.71 |
| 8 | 43.544 | 9.367 | 1.49700 | 81.54 |
| 9 | 346.336 | 20.517 | | |
| 10 | −251.866 | 3.284 | 1.74077 | 27.79 |
| 11 | −72.652 | 1.902 | 1.65412 | 39.68 |
| 12 | 309.545 | 8.777 | | |
| 13(Stop) | ∞ | 7.438 | | |
| 14 | 98.462 | 1.092 | 1.67790 | 50.72 |
| 15 | 29.008 | 0.000 | | |
| 16 | 29.008 | 5.718 | 1.51633 | 64.14 |
| 17 | −311.324 | Variable | | |
| 18 | 252.739 | 0.979 | 1.67003 | 47.23 |
| 19 | 22.588 | 0.000 | | |
| 20 | 22.588 | 2.505 | 1.76182 | 26.52 |
| 21 | 33.442 | Variable | | |
| 22 | 72.342 | 0.944 | 1.70154 | 41.24 |
| 23 | 24.365 | 2.571 | 1.72825 | 28.46 |
| 24 | 42.042 | 36.154 | | |
| 25 | 624.538 | 6.081 | 1.85026 | 32.27 |
| 26 | −45.882 | 1.142 | 1.80810 | 22.76 |
| 27 | −117.152 | | | |
| Image plane | ∞ | | | |

-continued

Unit mm

Various data

|  | Infinity | Close distance |
|---|---|---|
| f | 295.915 | 229.691 |
| FNO. | 4.101 | 3.172 |
| 2ω(Angle of view) | 4.3 | |
| IH | 11.45 | 11.45 |
| FB | 26.611 | 26.611 |
| Lens total length | 202.5992 | 202.5992 |
| d17 | 2.105 | 19.275 |
| d21 | 24.852 | 7.682 |

EXAMPLE 6

Unit mm

Surface data

| Surface no. | r | d | nd | νd |
|---|---|---|---|---|
| 1 | 226.165 | 11.472 | 1.48749 | 70.23 |
| 2 | 1418.036 | 11.054 | | |
| 3 | 96.639 | 22.959 | 1.49700 | 81.54 |
| 4 | −31790.114 | 0.170 | | |
| 5 | 3899.372 | 3.401 | 1.83481 | 42.71 |
| 6 | 330.026 | 37.415 | | |
| 7 | 99.381 | 3.401 | 1.79952 | 42.22 |
| 8 | 53.297 | 19.514 | 1.43875 | 94.93 |
| 9 | −481.418 | 2.721 | | |
| 10 | 194.345 | 10.696 | 1.75520 | 27.51 |
| 11 | −115.087 | 3.402 | 1.91082 | 35.25 |
| 12 | 221.940 | 3.949 | | |
| 13 | −344.287 | 2.551 | 1.78590 | 44.20 |
| 14 | 2098.137 | 27.211 | | |
| 15(Stop) | ∞ | Variable | | |
| 16 | 481.059 | 3.741 | 1.84666 | 23.78 |
| 17 | −212.365 | 0.170 | | |
| 18 | −187.876 | 1.531 | 1.80139 | 45.45 |
| 19 | 65.157 | Variable | | |
| 20 | 67.689 | 1.701 | 1.92286 | 18.90 |
| 21 | 37.526 | 8.440 | 1.58267 | 46.42 |
| 22 | −232.367 | 0.170 | | |
| 23 | ∞ | 5.102 | | |
| 24 | 190.499 | 5.102 | 1.84666 | 23.78 |
| 25 | −81.096 | 0.170 | | |
| 26 | −88.216 | 1.531 | 1.80400 | 46.57 |
| 27 | 42.496 | 8.578 | | |
| 28 | −64.567 | 1.361 | 1.69680 | 55.53 |
| 29 | 131.560 | 5.612 | | |
| 30 | 161.565 | 5.770 | 1.72342 | 37.95 |
| 31 | −139.595 | 0.170 | | |
| 32 | 94.408 | 9.354 | 1.51633 | 64.14 |
| 33 | −86.751 | | | |
| Image plane | ∞ | | | |

Various data

|  | Infinity | Close distance |
|---|---|---|
| f | 499.265 | 325.022 |
| FNO. | 4.059 | 2.630 |
| 2ω(Angle of view) | 2.6 | |
| IH | 11.15 | 11.15 |
| FB | 66.633 | 66.633 |
| Lens total length | 337.887 | 337.887 |
| d15 | 10.204 | 51.386 |
| d19 | 42.631 | 1.449 |

EXAMPLE 7

Unit mm

Surface data

| Surface no. | r | d | nd | νd |
|---|---|---|---|---|
| 1 | 210.940 | 7.500 | 1.49700 | 81.54 |
| 2 | −594.912 | 0.300 | | |
| 3 | 84.134 | 12.000 | 1.49700 | 81.54 |
| 4 | −376.138 | 0.500 | | |
| 5 | −435.916 | 3.500 | 1.88300 | 40.76 |
| 6 | 571.205 | 43.110 | | |
| 7 | 54.718 | 2.500 | 1.84020 | 33.38 |
| 8 | 35.511 | 9.240 | 1.49700 | 81.54 |
| 9 | 113.892 | 7.000 | | |
| 10(Stop) | ∞ | 3.500 | | |
| 11 | 204.348 | 5.980 | 1.80810 | 22.76 |
| 12 | −112.102 | 2.570 | 1.88300 | 40.76 |
| 13 | 50.433 | 15.000 | | |
| 14 | 55.276 | 5.390 | 1.49700 | 81.54 |
| 15 | −447.250 | Variable | | |
| 16 | 80.000 | 2.000 | 1.54711 | 53.00 |
| 17 | 32.225 | 4.000 | 1.85818 | 27.52 |
| 18 | 36.616 | 5.209 | | |
| 19 | −570.008 | 1.000 | 1.49700 | 81.55 |
| 20 | 34.412 | Variable | | |
| 21 | 77.042 | 4.500 | 1.49700 | 81.55 |
| 22 | −77.403 | | | |
| Image plane | ∞ | | | |

Various data

|  | Infinity | Close distance |
|---|---|---|
| F | 293.998 | 241.182 |
| FNO. | 3.735 | 3.055 |
| 2ω(Angle of view) | 4.3 | |
| IH | 11.15 | 11.15 |
| FB | 34.733 | 34.733 |
| Lens total length | 223.5778 | 223.5778 |
| d15 | 2.000 | 27.373 |
| d20 | 52.046 | 26.671 |

Aberrations diagrams of the examples from the example 1 to the example 7 are shown in FIG. 5A, FIG. 5B, FIG. 5C, FIG. 5D, FIG. 5E, FIG. 5F, FIG. 5G, and FIG. 5H to FIG. 11A, FIG. 11B, FIG. 11C, FIG. 11D, FIG. 11E, FIG. 11F, FIG. 11G, and FIG. 11H. In each diagram, FIY denotes the maximum image height.

In these aberration diagrams, FIG. 5A, FIG. 6A, FIG. 7A, FIG. 8A, FIG. 9A, FIG. 10A, and FIG. 11A show a spherical aberration (SA) at the time of focusing at an object at infinity, FIG. 5B, FIG. 6B, FIG. 7B, FIG. 8B, FIG. 9B, FIG. 10B, and FIG. 11B show an astigmatism (AS) at the time of focusing at an object at infinity, FIG. 5C, FIG. 6C, FIG. 7C, FIG. 8C, FIG. 9C, FIG. 10C, and FIG. 11C show a distortion (DT) at the time of focusing at an object at infinity, and FIG. 5D, FIG. 6D, FIG. 7D, FIG. 8D, FIG. 9D, FIG. 10D, and FIG. 11D show chromatic aberration of magnification (CC) at the time of focusing at an object at infinity.

Moreover, FIG. 5E, FIG. 6E, FIG. 7E, FIG. 8E, FIG. 9E, FIG. 10E, and FIG. 11E show a spherical aberration (SA) at the time of focusing at an object at a close distance, FIG. 5F, FIG. 6F, FIG. 7F, FIG. 8F, FIG. 9F, FIG. 10F, and FIG. 11F show an astigmatism (AS) at the time of focusing at an object at a close distance, FIG. 5G, FIG. 6G, FIG. 7G, FIG. 8G, FIG. 9G, FIG. 10G, and FIG. 11G show a distortion (DT) at the time of focusing at the time of focusing at an object at a close distance, and FIG. 5H, FIG. 6H, FIG. 7H, FIG. 8H, FIG. 9H, FIG. 10H, and FIG. 11H show a chromatic aberration of magnification (CC) at the time of focusing at an object at a close distance.

Next, values of conditional expressions (1) to (22) in each example are given below. Moreover, '-' (hyphen) indicates that there is no corresponding arrangement or conditional expression is not satisfied.

| Conditional expressions | Example 1 | Example 2 | Example 3 |
|---|---|---|---|
| (1) $\|f_{fo}/f\|$ | 0.19 | 0.16 | 0.15 |
| (2) $f_{G2}/f$ | −0.5 | −0.7 | −1.03 |
| (3) $f_{R2}/f$ | 0.28 | 0.16 | 0.20 |
| (4) $vd_{Fp}$ | 0.10 | 0.48 | 0.09 |
|  | 81.54 | 81.54 | 94.93 |
|  | 94.93 | 81.54 | 94.93 |
| (5) $f_{G2}/f_{fo}$ | 2.67 | 4.38 | 7.01 |
| (7) $\|f_{G1}/f_{G2}\|$ | 0.64 | 0.61 | 0.36 |
| (9) $f_{FA}/f_{fo}$ | −2.35 | −3.46 | −2.87 |
| (10) $f_{FF}/f_{fo}$ | −2.35 | −3.46 | −2.87 |
| (11) $D_{G1}/f_{G1}$ | 0.69 | 0.51 | 0.63 |
| (12) $D_{G112}/f_{G1}$ | 0.24 | 0.18 | 0.24 |
| (13) $v_{G2nMAX}$ | 44.2 | 34.97 | 52.32 |
| (14) $v_{G2nMAX} - v_{G2pMIN}$ | 16.69 | 11.19 | 24.02 |
| (15) $\|MG_{ISback} \times (MG_{IS} - 1)\|$ | 2 | 1.449 | 2.06 |
| (16) $\|(MG_{foback})^2 \times \{(MG_{fo})^2 - 1\}\|$ | 4.49 | 3.284 | 5.0659 |
| (17) $MG_{G2}$ | 1.38 | 1.28 | 1.15 |
| (18) $D_{G1img}/f$ | 0.68 | 0.78 | 0.69 |
| (19) $\|f/r_{G2b}\|$ | 0.24 | 2.14 | 1.59 |
| (20) $\Phi_{fo}/\Phi_{La}$ | 0.82 | 0.83 | 0.76 |
| (21) $D_{sfo}/D_{LTL}$ | 0.030 | 0.026 | 0.059 |
| (22) $D_{sfo}/\phi_s$ | 0.25 | 0.25 | 0.47 |

| Conditional expressions | Example 4 | Example 5 | Example 6 |
|---|---|---|---|
| (1) $\|f_{fo}/f\|$ | 0.17 | 0.21 | 0.19 |
| (2) $f_{G2}/f$ | −0.69 | −0.87 | −0.50 |
| (3) $f_{R2}/f$ | 0.24 | 0.37 | 0.28 |
| (4) $vd_{Fp}$ | 0.11 | — | 0.10 |
|  | 94.93 | 94.93 | 94.93 |
|  | 94.93 | 81.54 | 81.54 |
| (5) $f_{G2}/f_{fo}$ | 4.17 | 4.09 | 2.67 |
| (7) $\|f_{G1}/f_{G2}\|$ | 0.67 | 0.42 | 0.64 |
| (9) $f_{FA}/f_{fo}$ | −2.67 | −1.91 | −2.35 |
| (10) $f_{FF}/f_{fo}$ | −3.89 | −2.19 | −2.35 |
| (11) $D_{G1}/f_{G1}$ | 0.58 | 0.46 | 0.69 |
| (12) $D_{G112}/f_{G1}$ | 0.23 | 0.17 | 0.24 |
| (13) $v_{G2nMAX}$ | 49.6 | 39.68 | 44.2 |
| (14) $v_{G2nMAX} - v_{G2pMIN}$ | −45.33 | 11.89 | 16.69 |
| (15) $\|MG_{ISback} \times (MG_{IS} - 1)\|$ | 2.01 | — | 1.996 |
| (16) $\|(MG_{foback})^2 \times \{(MG_{fo})^2 - 1\}\|$ | 4.603 | 4.851 | 4.49 |
| (17) $MG_{G2}$ | 1.39 | 2.56 | 1.27 |
| (18) $D_{G1img}/f$ | 0.78 | 0.68 | 0.68 |
| (19) $\|f/r_{G2b}\|$ | 1.07 | 0.95 | 0.24 |
| (20) $\Phi_{fo}/\Phi_{La}$ | 0.90 | 1.05 | 1.10 |
| (21) $D_{sfo}/D_{LTL}$ | 0.037 | 0.081 | 0.030 |
| (22) $D_{sfo}/\phi_s$ | 0.34 | 0.52 | 0.25 |

| Conditional expressions | Example 7 |
|---|---|
| (1) $\|f_{fo}/f\|$ | 0.16 |
| (2) $f_{G2}/f$ | −0.24 |
| (3) $f_{R2}/f$ | 0.27 |
| (4) $vd_{Fp}$ | −81.54 |
| (5) $f_{G2}/f_{fo}$ | −1.52 |
| (7) $\|f_{G1}/f_{G2}\|$ | 1.66 |
| (9) $f_{FA}/f_{fo}$ | −3.26 |
| (10) $f_{FF}/f_{fo}$ | −6.47 |
| (11) $D_{G1}/f_{G1}$ | 0.66 |
| (12) $D_{G112}/f_{G1}$ | 0.36 |
| (13) $v_{G2nMAX}$ | 40.76 |
| (14) $v_{G2nMAX} - v_{G2pMIN}$ | 18.00 |
| (15) $\|MG_{ISback} \times (MG_{IS} - 1)\|$ | — |
| (16) $\|(MG_{foback})^2 \times \{(MG_{fo})^2 - 1\}\|$ | 3.36 |
| (17) $MG_{G2}$ | 1.38 |
| (18) $D_{G1img}/f$ | 0.76 |
| (19) $\|f/r_{G2b}\|$ | 0.66 |
| (20) $\Phi_{fo}/\Phi_{La}$ | 0.86 |
| (21) $D_{sfo}/D_{LTL}$ | 0.154 |
| (22) $D_{sfo}/\phi_s$ | 0.96 |

Figure 12:
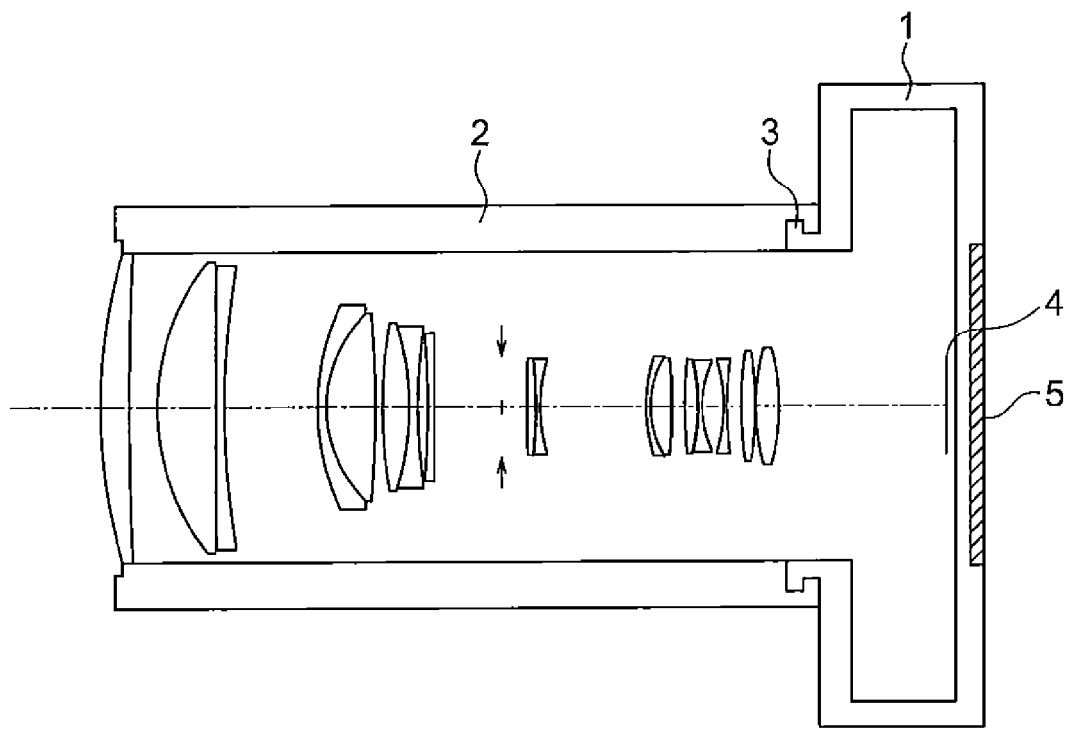
FIG. 12 is a cross-sectional view of a digital camera in which the single focal length lens system according to the example 1 is incorporated.

FIG. 12 is a cross-sectional view of a single-lens mirrorless camera as an electronic image pickup apparatus. In FIG. 12, a taking lens system 2 is disposed inside a lens barrel of a single-lens mirrorless camera 1. Amount portion 3 enables the taking lens system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the taking lens system 2 of the single-lens mirrorless camera 1, the single focal length lens system according to the present invention described in any one of the examples from the first example to the seventh example is to be used.

Figure 13:
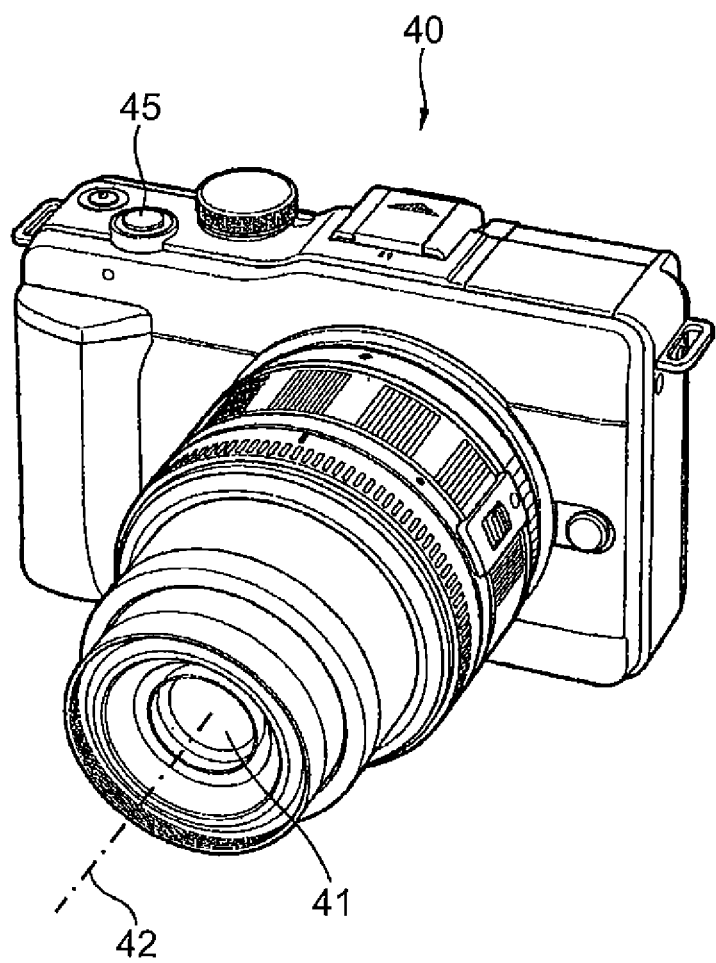
FIG. 13 is a front perspective view showing an appearance of the digital camera.
Figure 14:
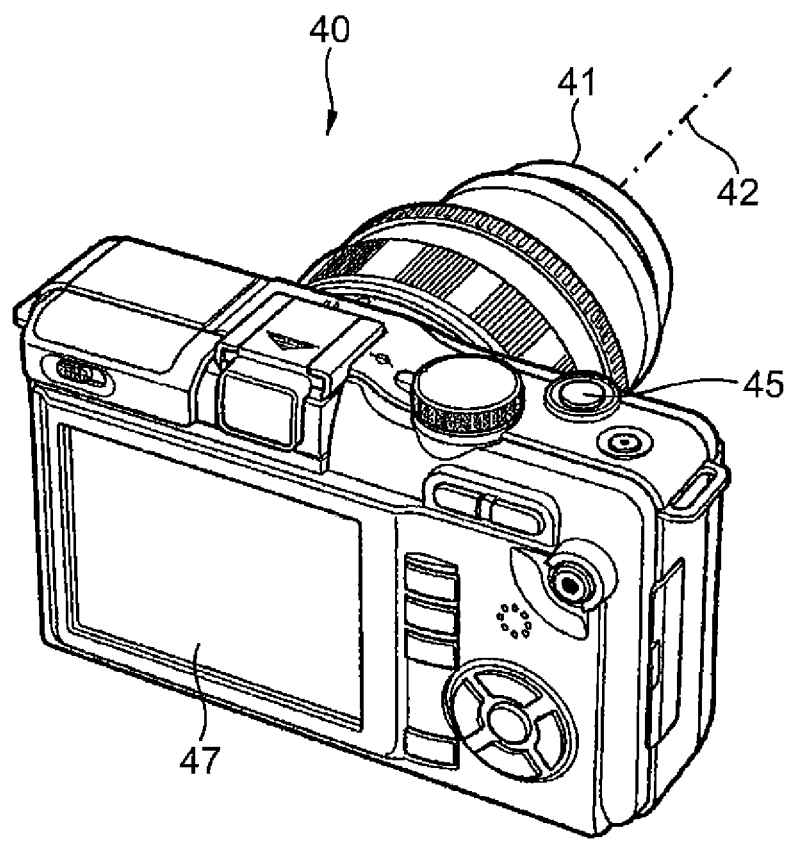
FIG. 14 is a rear perspective view of the digital camera.

FIG. 13 and FIG. 14 are conceptual diagrams of an arrangement of the image pickup apparatus according to the present invention. FIG. 13 is a front perspective view showing an appearance of a digital camera 40 as the image pickup apparatus, and FIG. 14 is a rear perspective view of the digital camera 40. The single focal length lens system according to the present invention is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the single focal length lens system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

Figure 15:
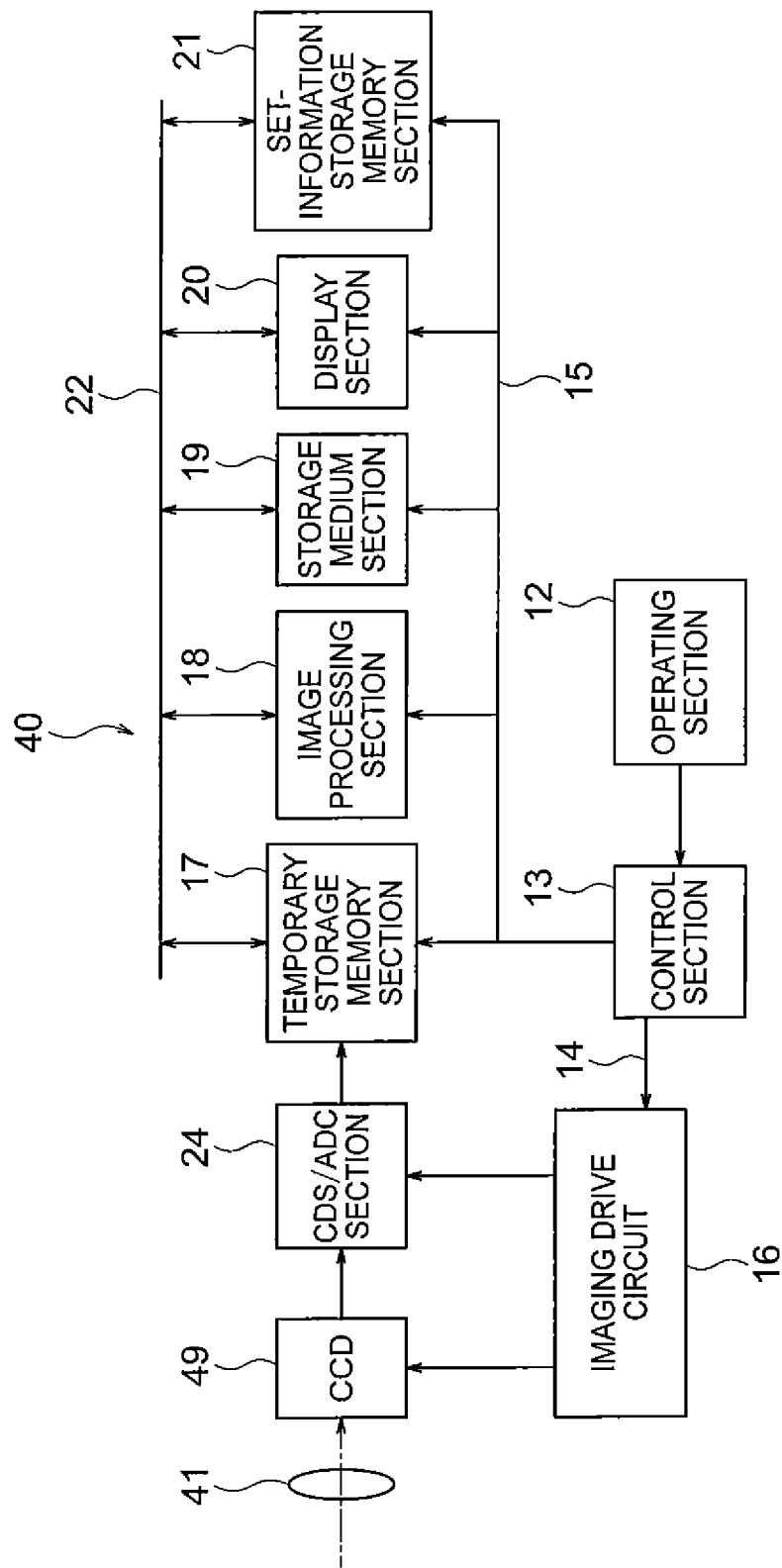
FIG. 15 is a schematic block diagram of an internal circuit of main components of the digital camera.

FIG. 15 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 15, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

In the digital camera 40 in which such an arrangement is made, by adopting the single focal length lens system according to the present invention as the photographing optical system, it is possible to make the overall optical system light-weight, and to increase the focusing speed. The digital camera 40 has a superior mobility, and enables to carry out photography with high resolution. Moreover, it is possible to use the single focal length lens system according to the present invention in an image pickup apparatus of a type having a quick-return mirror.

According to the present invention, it is possible to provide a single focal length lens system which has a superior mobility, and in which, aberrations are corrected favorably, and an image pickup apparatus using the single focal length lens system.

As described heretofore, in the single focal length lens system according to the present invention, since it is possible to shorten the overall length of the optical system and to make the focusing lens unit light-weight, it is possible to realize making the optical system light-weight. Moreover, by making the focusing lens unit light-weight, it is possible to make the focusing unit small-sized and light-weight, and accordingly it becomes easy to make the focusing speed high. For these reasons, the single focal length lens system according to the present invention is suitable for a single focal length lens system which has a superior mobility, and in which, aberrations are corrected favorably. Particularly, the single focal length lens system according to the present invention is useful for a telephoto lens and an ultra-telephoto lens. Moreover, the image pickup apparatus according to the present invention is suitable for an image pickup apparatus which has a superior mobility, and which is capable of carrying out photography with high resolution.

What is claimed is:

1. A single focal length lens system comprising in order from an object side to an image side along an optical axis:
    a front lens unit and
    a rear lens unit which includes an aperture stop, wherein
    the single focal length lens system does not include any other lens unit on the optical axis, and
    the rear lens unit includes a focusing lens unit having a negative refractive power, and
    the focusing lens unit is disposed on the image side of the aperture stop, and moves along the optical axis at the time of focusing from an object at infinity to an object at a close distance, and
    the front lens unit does not include a lens which moves in an optical axial direction, and
    the rear lens unit does not include a lens which moves in the optical axial direction except at the time of focusing, and
    the rear lens unit includes an image-side lens unit having a positive refractive power, and
    the image-side lens unit is disposed on the image side of the focusing lens unit, immediately after the focusing lens unit, and includes at least a positive lens and a negative lens, and
    the following conditional expression (1) is satisfied:

$$0.06 < |f_{fo}/f| < 0.4 \quad (1)$$

where,
    f denotes a focal length of the single focal length lens system at the time of focusing at an object at infinity, and
    $f_{fo}$ denotes a focal length of the focusing lens unit.

2. The single focal length lens system according to claim 1, wherein the front lens unit is disposed immediately before the aperture stop.

3. The single focal length lens system according to claim 1, wherein the image-side lens unit satisfies the following conditional expression (3):

$$0.07 < f_{R2}/f < 0.7 \quad (3)$$

where,
    $f_{R2}$ denotes the focal length of the image-side lens unit, and
    f denotes the focal length of the single focal length lens system at the time of focusing at an object at infinity.

4. The single focal length lens system according to claim 1, wherein the front lens unit has a positive refractive power as a whole.

5. The single focal length lens system according to claim 1, wherein the front lens unit includes a positive lens which satisfies the following conditional expression (4):

$$80 < vd_{Fp} < 98 \quad (4)$$

where,
    $vd_{Fp}$ denotes Abbe number for one of the positive lenses in the front lens unit.

6. The single focal length lens system according to claim 1, wherein
    the front lens unit includes in order from the object side to the image side, a first lens unit having a positive refractive power, and a second lens unit having a negative refractive power including a positive lens and a negative lens, and the following conditional expression (5) is satisfied:

$$1.5 < f_{G2}/f_{fo} < 6.0 \quad (5)$$

where, $f_{G2}$ denotes the focal length of the second lens unit, and
$f_{fo}$ denotes the focal length of the focusing lens unit.

7. The single focal length lens system according to claim 1, wherein
the front lens unit includes in order from the object side to the image side, a first lens unit having a positive refractive power and a second lens unit having a negative refractive power, and
the following conditional expression (7) is satisfied:

$$0.31 < |f_{G1}/f_{G2}| < 3.0 \quad (7)$$

where, $f_{G1}$ denotes a focal length of the first lens unit, and
$f_{G2}$ denotes the focal length of the second lens unit.

8. The single focal length lens system according to claim 7, wherein the second lens unit includes a positive lens and a negative lens.

9. The single focal length lens system according to claim 1, wherein
the front lens unit includes in order from the object side to the image side, a first lens unit having a positive refractive power, and a second lens unit having a negative refractive power including a positive lens and a negative lens, and
the following conditional expression (2) is satisfied:

$$-2.0 < f_{G2}/f < -0.08 \quad (2)$$

where, f denotes the focal length of the single focal length lens system at the time of focusing at an object at infinity, and
$f_{G2}$ denotes the focal length of the second lens unit.

10. The single focal length lens system according to claim 1, wherein the focusing lens unit is disposed on the image side of the aperture stop, immediately after the aperture stop.

11. The single focal length lens system according to claim 1, wherein
the front lens unit includes in order from the object side to the image side, a first lens unit having a positive refractive power, and a second lens unit having a negative refractive power, and
each of the first lens unit and the second lens unit includes a positive lens and a negative lens.

12. The single focal length lens system according to claim 1, wherein
the front lens unit includes in order from the object side to the image side, a first lens unit having a positive refractive power, and a second lens unit having a negative refractive power including a positive lens and a negative lens, and
an overall combined lens unit from the first lens unit up to a position immediately before the focusing lens unit has a positive refractive power, and
the focusing lens unit has a negative refractive power, and
the following conditional expression (9) is satisfied:

$$-4.5 < f_{FA}/f_{fo} < -1.5 \quad (9)$$

where, $f_{FA}$ denotes a focal length of the overall combined lens unit, and
$f_{fo}$ denotes the focal length of the focusing lens unit.

13. The single focal length lens system according to claim 1, wherein
the front lens unit has a positive refractive power, and
the focusing lens unit has a negative refractive power, and
the following conditional expression (10) is satisfied:

$$-8.0 < f_{FF}/f_{fo} < -1.8 \quad (10)$$

where, $f_{FF}$ denotes a focal length of the front lens unit, and
$f_{fo}$ denotes the focal length of the focusing lens unit.

14. The single focal length lens system according to claim 1, wherein
the front lens unit includes in order from the object side to the image side, a first lens unit having a positive refractive power, and a second lens unit having a negative refractive power including a positive lens and a negative lens, and
the first lens unit includes a $1\text{-}1^{th}$ sub lens unit on the object side, and a $1\text{-}2^{th}$ sub lens unit on the image side, and
an air space on an optical axis between the $1\text{-}1^{th}$ sub lens unit and the $1\text{-}2^{th}$ sub lens unit is the longest in the first lens unit, and
each of the $1\text{-}1^{th}$ sub lens unit and the $1\text{-}2^{th}$ sub lens unit has a positive refractive power, and
each of the $1\text{-}1^{th}$ sub lens unit and the $1\text{-}2^{th}$ sub lens unit includes a positive lens and a negative lens, and
the following conditional expression (11) is satisfied:

$$0.35 < D_{G1}/f_{G1} < 1.3 \quad (11)$$

where, $D_{G1}$ denotes a distance on the optical axis from a lens surface nearest to an object of the first lens unit up to a lens surface nearest to an image of the first lens unit, and
$f_{G1}$ denotes the focal length of the first lens unit.

15. The single focal length lens system according to claim 1, wherein
the front lens unit includes in order from the object side to the image side, a first lens unit having a positive refractive power, and a second lens unit having a negative refractive power including a positive lens and a negative lens, and
the first lens unit includes a $1\text{-}1^{th}$ sub lens unit on the object side, and a $1\text{-}2^{th}$ sub lens unit on the image side, and
an air space on an optical axis between the $1\text{-}1^{th}$ sub lens unit and the $1\text{-}2^{th}$ sub lens unit is the longest in the first lens unit, and
each of the $1\text{-}1^{th}$ sub lens unit and the $1\text{-}2^{th}$ sub lens unit has a positive refractive power, and
each of the $1\text{-}1^{th}$ sub lens unit and the $1\text{-}2^{th}$ sub lens unit includes a positive lens and a negative lens, and
the following conditional expression (12) is satisfied:

$$0.1 < D_{G112}/f_{G1} < 0.6 \quad (12)$$

where, $D_{G112}$ denotes a distance on the optical axis between the $1\text{-}1^{th}$ sub lens unit and the $1\text{-}2^{th}$ sub lens unit, and
$f_{G1}$ denotes the focal length of the first lens unit.

16. The single focal length lens system according to claim 1, wherein only one focusing lens unit is disposed in the rear lens unit.

17. The single focal length lens system according to claim 1, wherein
the rear lens unit includes an image-motion correcting lens unit, and
the image-motion correcting lens unit moves in a direction different from a direction of the optical axis to reduce an image motion due to shaking of the single focal length lens system.

18. The single focal length lens system according to claim 17, wherein
the rear lens unit includes a second predetermined lens unit which is disposed immediately before the image-motion correcting lens unit, and
the second predetermined lens unit has a refractive power having a sign different from a sign of a refractive power of the image-motion correcting lens unit.

19. The single focal length lens system according to claim 17, wherein
the rear lens unit includes a third predetermined lens unit which is disposed immediately after the image-motion correcting lens unit, and
the third predetermined lens unit has a refractive power having a sign different from a sign of the refractive power of the image-motion correcting lens unit.

20. The single focal length lens system according to claim 17, wherein
the image-motion correcting lens unit includes a plurality of lenses and a predetermined lens, and
the plurality of lenses have a refractive power having a sign same as the sign of the refractive power of the image-motion correcting lens unit, and
the predetermined lens has a refractive power having a sign different from the sign of the refractive power of the image-motion correcting lens unit.

21. The single focal length lens system according to claim 17, wherein
the rear lens unit includes a second predetermined lens unit which is disposed immediately before the image-motion correcting lens unit and a third predetermined lens unit which is disposed immediately after the image-motion correcting lens unit, and
each of the second predetermined lens unit and the third predetermined lens unit has a refractive power having a sign different from the sign of the refractive power of the image-motion correcting lens unit.

22. The single focal length lens system according to claim 17, wherein the image-motion correcting lens unit has a negative refractive power.

23. The single focal length lens system according to claim 1, wherein only the focusing lens unit is a lens unit which is movable in the optical axial direction.

24. The single focal length lens system according to claim 17, wherein only the focusing lens unit and the image-motion correcting lens unit are the lens units which are movable.

25. The single focal length lens system according to claim 1, wherein
the front lens unit includes in order from the object side to the image side, a first lens unit having a positive refractive power, and a second lens unit having a negative refractive power including a positive lens and a negative lens, and
the second lens unit is a lens unit which is disposed nearest to the image in the front lens unit.

26. The single focal length lens system according to claim 1, wherein
the front lens unit includes in order from the object side to the image side, a first lens unit having a positive refractive power, and a second lens unit having a negative refractive power including a positive lens and a negative lens, and
the second lens unit includes a negative lens which satisfies the following conditional expression (13):

$$37 < \nu_{G2nMAX} < 60 \quad (13)$$

where,
$\nu_{G2nMAX}$ denotes a maximum Abbe number from among Abbe numbers for negative lenses in the second lens unit.

27. The single focal length lens system according to claim 1, wherein
the front lens unit includes in order from the object side to the image side, a first lens unit having a positive refractive power, and a second lens unit having a negative refractive power including a positive lens and a negative lens, and
the focusing lens unit is disposed on the image side of the aperture stop, and
the following conditional expression (14) is satisfied:

$$1 < \nu_{G2nMAX} - \nu_{G2pMIN} < 40 \quad (14)$$

where,
$\nu_{G2nMAX}$ denotes a maximum Abbe number from among Abbe numbers for the negative lenses in the second lens unit, and
$\nu_{G2pMIN}$ denotes a minimum Abbe number from among Abbe numbers for positive lenses in the second lens unit.

28. The single focal length lens system according to claim 1, wherein the focusing lens unit consists of not more than two lenses.

29. The single focal length lens system according to claim 1, wherein the focusing lens unit consists of two lenses, which are, one positive lens and one negative lens.

30. The single focal length lens system according to claim 1, wherein the rear lens unit includes in order from the object side, a focusing lens unit having a negative refractive power, a lens unit having a positive refractive power, an image-motion correcting lens unit having a negative refractive power, and a lens unit having a positive refractive power.

31. The single focal length lens system according to claim 1, wherein the single focal length lens system includes an image-motion correcting lens unit which satisfies the following conditional expression (15):

$$0.8 < |MG_{ISback} \times (MG_{IS} - 1)| < 5.0 \quad (15)$$

where,
$MG_{IS}$ denotes a lateral magnification of the image-motion correcting lens unit in an arbitrary focused state, and
$MG_{ISback}$ denotes a lateral magnification of an overall optical system between the image-motion correcting lens unit and the image plane, in an arbitrary focused state.

32. The single focal length lens system according to claim 1, wherein the focusing lens unit satisfies the following conditional expression (16):

$$1.5 < |(MG_{foback})^2 \times \{(MG_{fo})^2 - 1\}| < 8.0 \quad (16)$$

where,
$MG_{fo}$ denotes a lateral magnification of the focusing lens unit in an arbitrary focused state, and
$MG_{foback}$ denotes a lateral magnification of the overall optical system between the focusing lens unit and the image plane, in an arbitrary focused state.

33. The single focal length lens system according to claim 1, wherein the front lens unit consists of a first lens unit and a second lens unit.

34. The single focal length lens system according to claim 1, wherein the aperture stop is disposed on the object side of any lens in the rear lens unit.

35. The single focal length lens system according to claim 1, wherein the rear lens unit includes a positive lens unit which is disposed immediately before the aperture stop.

36. The single focal length lens system according to claim 35, wherein the positive lens unit which is disposed immediately before the aperture stop in the rear lens unit is a single lens.

37. The single focal length lens system according to claim 1, wherein
the front lens unit includes in order from the object side to the image side, a first lens unit having a positive refractive power, and a second lens unit having a negative refractive power including a positive lens and a negative lens, and
the following conditional expression (17) is satisfied:

$$0 < MG_{G2} \quad (17)$$

where,
$MG_{G2}$ denotes a lateral magnification of the second lens unit at the time of focusing at an object at infinity.

38. The single focal length lens system according to claim 1, wherein
the front lens unit includes in order from the object side to the image side, a first lens unit having a positive refractive power, and a second lens unit having a negative refractive power including a positive lens and a negative lens, and
the following conditional expression (18) is satisfied $$0.4 < D_{G1img}/f < 1.3 \quad (18):$$

where,
$Dm_{G1img}$ denotes a distance along the optical axis from an object-side lens surface of the first lens unit up to the image plane at the time of focusing at an object at infinity, and
f denotes the focal length of the single focal length lens system at the time of focusing at an object at infinity.

39. The single focal length lens system according to claim 1, wherein the following conditional expression (19) is satisfied:

$$0 \le |f/r_{G2b}| < 7.0 \quad (19)$$

where,
f denotes the focal length of the single focal length lens system at the time of focusing at an object at infinity, and
$r_{G2b}$ denotes a paraxial radius of curvature of a lens surface on the object side of the focusing lens unit, immediately before the focusing lens unit.

40. The single focal length lens system according to claim 1, wherein the following conditional expression (20) is satisfied:

$$0.5 \le \phi_{fo}/\phi_{La} \le 0.92 \quad (20)$$

where,
$\phi_{fo}$ denotes a maximum effective aperture from among effective apertures of lenses in the focusing lens unit, and
$\phi_{La}$ denotes a maximum effective aperture of a lens positioned nearest to the image in the single focal length lens system.

41. The single focal length lens system according to claim 1, wherein the following conditional expression (21) is satisfied:

$$0.023 \le D_{sfo}/D_{LTL} \le 0.110 \quad (21)$$

where,
$D_{sfo}$ denotes a distance on the optical axis from the aperture stop up to a lens surface nearest to an object of the focusing lens unit,
$D_{LTL}$ denotes a distance on the optical axis from a lens surface nearest to the object of the single focal length lens system up to an image plane, and
both $D_{sfo}$ and $D_{LTL}$ are distances at the time of focusing at an object at infinity.

42. The single focal length lens system according to claim 1, wherein the following conditional expression (22) is satisfied:

$$0.2 \le D_{sfo}/\phi_s \le 0.8 \quad (22)$$

where,
$D_{sfo}$ denotes the distance on the optical axis from the aperture stop up to a lens surface nearest to an object of the focusing lens unit, and is a distance at the time of focusing at an object at infinity, and
$\Phi_s$ denotes a maximum diameter of the aperture stop.

43. The single focal length lens system according to claim 1, wherein an optical system positioned on the image side of the focusing lens unit includes at least two positive lenses and one negative lens.

44. A single focal length lens system comprising in order from an object side to an image side along an optical axis:
a front lens unit; and
a rear lens unit which includes an aperture stop, wherein
the single focal length lens system does not include any other lens unit on the optical axis, and
the rear lens unit includes a focusing lens unit having a negative refractive power, and
the focusing lens unit is disposed on the image side of the aperture stop, and moves along the optical axis at the time of focusing from an object at infinity to an object at a close distance, and
the front lens unit does not include a lens which moves in an optical axial direction, and
the rear lens unit does not include a lens which moves in the optical axial direction except at the time of focusing, and
the rear lens unit includes an image-side lens unit having a positive refractive power, and
the image-side lens unit is disposed on the image side of the focusing lens unit, and includes at least a positive lens and a negative lens, and
the front lens unit includes in order from the object side to the image side, a first lens unit having a positive refractive power, and a second lens unit having a negative refractive power, and
each of the first lens unit and the second lens unit includes a positive lens and a negative lens, and
the following conditional expression (1) is satisfied:

$$0.06 < |f_{fo}/f| < 0.4 \quad (1)$$

where,
f denotes a focal length of the single focal length lens system at the time of focusing at an object at infinity, and
$f_{fo}$ denotes a focal length of the focusing lens unit.

45. The single focal length lens system according to claim 44, wherein the front lens unit is disposed immediately before the aperture stop.

46. A single focal length lens system comprising in order from an object side to an image side along an optical axis:
a front lens unit; and
a rear lens unit which includes an aperture stop, wherein
the single focal length lens system does not include any other lens unit on the optical axis, and
the rear lens unit includes a focusing lens unit having a negative refractive power, and the focusing lens unit is disposed on the image side of the aperture stop, and moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and the rear lens unit includes an image-side lens unit having a positive refractive power, and the image-side lens unit is disposed on the image side of the focusing lens unit, and includes at least a positive lens and a negative lens, and the front lens unit includes in order from the object side to the image side, a first lens unit having a positive refractive power, and a second lens unit having a negative refractive power including a positive lens and a negative lens, and the first lens unit includes a 1-1$^{th}$ sub lens unit on the object side, and a 1-2$^{th}$ sub lens unit on the image side, and an air space on an optical axis between the 1-1$^{th}$ sub lens unit and the 1-2$^{th}$ sub lens unit is the longest in the first lens unit, and each of the 1-1$^{th}$ sub lens unit and the 1-2$^{th}$ sub lens unit has a positive refractive power, and each of the 1-1$^{th}$ sub lens unit and the 1-2$^{th}$ sub lens unit includes a positive lens and a negative lens, and the following conditional expressions (1) and (11) are satisfied:

$$0.06 < |f_{fo}/f| < 0.4 \tag{1}$$

$$0.35 < D_{G1}/f_{G1} < 1.3 \tag{11}$$

where, f denotes a focal length of the single focal length lens system at the time of focusing at an object at infinity, $f_{fo}$ denotes a focal length of the focusing lens unit, $D_{G1}$ denotes a distance on the optical axis from a lens surface nearest to an object of the first lens unit up to a lens surface nearest to an image of the first lens unit, and $f_{G1}$ denotes the focal length of the first lens unit.

47. The single focal length lens system according to claim 46, wherein the front lens unit is disposed immediately before the aperture stop.

48. A single focal length lens system comprising in order from an object side to an image side along an optical axis:

a front lens unit; and a rear lens unit which includes an aperture stop, wherein the single focal length lens system does not include any other lens unit on the optical axis, and the rear lens unit includes a focusing lens unit having a negative refractive power, and the focusing lens unit is disposed on the image side of the aperture stop, and moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and the rear lens unit includes an image-side lens unit having a positive refractive power, and the image-side lens unit is disposed on the image side of the focusing lens unit, and includes at least a positive lens and a negative lens, and the front lens unit includes in order from the object side to the image side, a first lens unit having a positive refractive power, and a second lens unit having a negative refractive power including a positive lens and a negative lens, and the first lens unit includes a 1-1$^{th}$ sub lens unit on the object side, and a 1-2$^{th}$ sub lens unit on the image side, and an air space on an optical axis between the 1-1$^{th}$ sub lens unit and the 1-2$^{th}$ sub lens unit is the longest in the first lens unit, and each of the 1-1$^{th}$ sub lens unit and the 1-2$^{th}$ sub lens unit has a positive refractive power, and each of the 1-1$^{th}$ sub lens unit and the 1-2$^{th}$ sub lens unit includes a positive lens and a negative lens, and the following conditional expressions (1) and (12) are satisfied:

$$0.06 < |f_{fo}/f| < 0.4 \tag{1}$$

$$0.1 < D_{G112}/f_{G1} < 0.6 \tag{12}$$

where, f denotes a focal length of the single focal length lens system at the time of focusing at an object at infinity, $f_{fo}$ denotes a focal length of the focusing lens unit, $D_{G112}$ denotes a distance on the optical axis between the 1-1$^{th}$ sub lens unit and the 1-2$^{th}$ sub lens unit, and $f_{G1}$ denotes the focal length of the first lens unit.

49. The single focal length lens system according to claim 48, wherein the front lens unit is disposed immediately before the aperture stop.

50. A single focal length lens system comprising in order from an object side to an image side along an optical axis:

a front lens unit; and a rear lens unit which includes an aperture stop, wherein the single focal length lens system does not include any other lens unit on the optical axis, and the rear lens unit includes a focusing lens unit having a negative refractive power, and the focusing lens unit is disposed on the image side of the aperture stop, and moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and the rear lens unit includes an image-side lens unit having a positive refractive power, and the image-side lens unit is disposed on the image side of the focusing lens unit, and includes at least a positive lens and a negative lens, and the rear lens unit includes an image-motion correcting lens unit, and the image-motion correcting lens unit moves in a direction different from a direction of the optical axis to reduce an image motion due to shaking of the single focal length lens system, and the image-motion correcting lens unit includes a plurality of lenses and a predetermined lens, and the plurality of lenses have a refractive power having a sign same as the sign of the refractive power of the image-motion correcting lens unit, and the predetermined lens has a refractive power having a sign different from the sign of the refractive power of the image-motion correcting lens unit, and the following conditional expression (1) is satisfied:

$$0.06 < |f_{fo}/f| < 0.4 \tag{1}$$

where, f denotes a focal length of the single focal length lens system at the time of focusing at an object at infinity, and $f_{fo}$ denotes a focal length of the focusing lens unit.

51. The single focal length lens system according to claim 50, wherein the front lens unit is disposed immediately before the aperture stop.

52. A single focal length lens system comprising in order from an object side to an image side along an optical axis:

a front lens unit; and a rear lens unit which includes an aperture stop, wherein the single focal length lens system does not include any other lens unit on the optical axis, and the rear lens unit includes a focusing lens unit having a negative refractive power, and the focusing lens unit is disposed on the image side of the aperture stop, and moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and the rear lens unit includes an image-side lens unit having a positive refractive power, and the image-side lens unit is disposed on the image side of the focusing lens unit, and includes at least a positive lens and a negative lens, and the following conditional expression (1) is satisfied, and the front lens unit includes in order from the object side to the image side, a first lens unit having a positive refractive power, and a second lens unit having a negative refractive power including a positive lens and a negative lens, and the second lens unit includes a negative lens which satisfies the following conditional expression (13):

$$0.06 < |f_{fo}/f| < 0.4 \quad (1)$$

$$37 < \nu_{G2nMAX} < 60 \quad (13)$$

where, f denotes a focal length of the single focal length lens system at the time of focusing at an object at infinity, $f_{fo}$ denotes a focal length of the focusing lens unit, and $\nu_{G2nMAX}$ denotes a maximum Abbe number from among Abbe numbers for negative lenses in the second lens unit.

53. The single focal length lens system according to claim 52, wherein the front lens unit is disposed immediately before the aperture stop.

54. A single focal length lens system comprising in order from an object side to an image side along an optical axis:

a front lens unit; and a rear lens unit which includes an aperture stop, wherein the single focal length lens system does not include any other lens unit on the optical axis, and the rear lens unit includes a focusing lens unit having a negative refractive power, and the focusing lens unit is disposed on the image side of the aperture stop, and moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and the rear lens unit includes an image-side lens unit having a positive refractive power, and the image-side lens unit is disposed on the image side of the focusing lens unit, and includes at least a positive lens and a negative lens, and the front lens unit includes in order from the object side to the image side, a first lens unit having a positive refractive power, and a second lens unit having a negative refractive power including a positive lens and a negative lens, and the following conditional expressions (1) and (14) are satisfied:

$$0.06 < |f_{fo}/f| < 0.4 \quad (1)$$

$$1 < \nu_{G2nMAX} - \nu_{G2pMIN} < 40 \quad (14)$$

where, f denotes a focal length of the single focal length lens system at the time of focusing at an object at infinity, $f_{fo}$ denotes a focal length of the focusing lens unit, $\nu_{G2nMAX}$ denotes a maximum Abbe number from among Abbe numbers for the negative lenses in the second lens unit, and $\nu_{G2pMIN}$ denotes a minimum Abbe number from among Abbe numbers for positive lenses in the second lens unit.

55. The single focal length lens system according to claim 54, wherein the front lens unit is disposed immediately before the aperture stop.

56. A single focal length lens system comprising in order from an object side to an image side along an optical axis:

a front lens unit; and a rear lens unit which includes an aperture stop, wherein the single focal length lens system does not include any other lens unit on the optical axis, and the rear lens unit includes a focusing lens unit having a negative refractive power, and the focusing lens unit is disposed on the image side of the aperture stop, and moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and the rear lens unit includes an image-side lens unit having a positive refractive power, and the image-side lens unit is disposed on the image side of the focusing lens unit, and includes at least a positive lens and a negative lens, and the following conditional expression (1) is satisfied, and the single focal length lens system includes an image-motion correcting lens unit which satisfies the following conditional expression (15):

$$0.06 < |f_{fo}/f| < 0.4 \quad (1)$$

$$0.8 < |MG_{ISback} \times (MG_{IS} - 1)| < 5.0 \quad (15)$$

where, f denotes a focal length of the single focal length lens system at the time of focusing at an object at infinity, $f_{fo}$ denotes a focal length of the focusing lens unit, $MG_{IS}$ denotes a lateral magnification of the image-motion correcting lens unit in an arbitrary focused state, and $MG_{ISback}$ denotes a lateral magnification of an overall optical system between the image-motion correcting lens unit and the image plane, in an arbitrary focused state.

57. The single focal length lens system according to claim 56, wherein the front lens unit is disposed immediately before the aperture stop.

58. A single focal length lens system comprising in order from an object side to an image side along an optical axis:
a front lens unit; and
a rear lens unit which includes an aperture stop, wherein
the single focal length lens system does not include any other lens unit on the optical axis, and
the rear lens unit includes a focusing lens unit having a negative refractive power, and
the focusing lens unit is disposed on the image side of the aperture stop, and moves along the optical axis at the time of focusing from an object at infinity to an object at a close distance, and
the front lens unit does not include a lens which moves in an optical axial direction, and
the rear lens unit does not include a lens which moves in the optical axial direction except at the time of focusing, and
the rear lens unit includes an image-side lens unit having a positive refractive power, and
the image-side lens unit is disposed on the image side of the focusing lens unit, and includes at least a positive lens and a negative lens, and
the following conditional expression (1) is satisfied, and
the focusing lens unit satisfies the following conditional expression (16)

$$0.06<|f_{fo}/f|<0.4 \tag{1}$$

$$1.5<|(MG_{foback})^2 \times \{(MG_{fo})^2-1\}|<8.0 \tag{16}$$

where,
f denotes a focal length of the single focal length lens system at the time of focusing at an object at infinity,
$f_{fo}$ denotes a focal length of the focusing lens unit,
$MG_{fo}$ denotes a lateral magnification of the focusing lens unit in an arbitrary focused state, and
$MG_{foback}$ denotes a lateral magnification of the overall optical system between the focusing lens unit and the image plane, in an arbitrary focused state.

59. The single focal length lens system according to claim 58, wherein the front lens unit is disposed immediately before the aperture stop.

60. A single focal length lens system comprising in order from an object side to an image side along an optical axis:
a front lens unit; and
a rear lens unit which includes an aperture stop, wherein
the single focal length lens system does not include any other lens unit on the optical axis, and
the rear lens unit includes a focusing lens unit having a negative refractive power, and
the focusing lens unit is disposed on the image side of the aperture stop, and moves along the optical axis at the time of focusing from an object at infinity to an object at a close distance, and
the front lens unit does not include a lens which moves in an optical axial direction, and
the rear lens unit does not include a lens which moves in the optical axial direction except at the time of focusing, and
the rear lens unit includes an image-side lens unit having a positive refractive power, and
the image-side lens unit is disposed on the image side of the focusing lens unit, and includes at least a positive lens and a negative lens, and
the following conditional expressions (1) and (19) are satisfied:

$$0.06<|f_{fo}/f|<0.4 \tag{1}$$

$$0 \leq |f/r_{G2b}|<7.0 \tag{19}$$

where,
f denotes the focal length of the single focal length lens system at the time of focusing at an object at infinity, and
$f_{fo}$ denotes a focal length of the focusing lens unit,
$r_{G2b}$ denotes a paraxial radius of curvature of a lens surface on the object side of the focusing lens unit, immediately before the focusing lens unit.

61. The single focal length lens system according to claim 60, wherein the front lens unit is disposed immediately before the aperture stop.

62. A single focal length lens system comprising in order from an object side to an image side along an optical axis:
a front lens unit; and
a rear lens unit which includes an aperture stop, wherein
the single focal length lens system does not include any other lens unit on the optical axis, and
the rear lens unit includes a focusing lens unit having a negative refractive power, and
the focusing lens unit is disposed on the image side of the aperture stop, and moves along the optical axis at the time of focusing from an object at infinity to an object at a close distance, and
the front lens unit does not include a lens which moves in an optical axial direction, and
the rear lens unit does not include a lens which moves in the optical axial direction except at the time of focusing, and
the rear lens unit includes an image-side lens unit having a positive refractive power, and
the image-side lens unit is disposed on the image side of the focusing lens unit, and includes at least a positive lens and a negative lens, and
the following conditional expressions (1) and (20) are satisfied:

$$0.06<|f_{fo}/f|<0.4 \tag{1}$$

$$0.5 \leq \phi_{fo}/\phi_{La} \leq 0.92 \tag{20}$$

where,
f denotes a focal length of the single focal length lens system at the time of focusing at an object at infinity,
$f_{fo}$ denotes a focal length of the focusing lens unit, $\phi_{fo}$ denotes a maximum effective aperture from among effective apertures of lenses in the focusing lens unit, and
$\phi_{La}$ denotes a maximum effective aperture of a lens positioned nearest to the image in the single focal length lens system.

63. The single focal length lens system according to claim 62, wherein the front lens unit is disposed immediately before the aperture stop.

64. A single focal length lens system comprising in order from an object side to an image side along an optical axis:
a front lens unit; and
a rear lens unit which includes an aperture stop, wherein
the single focal length lens system does not include any other lens unit on the optical axis, and
the rear lens unit includes a focusing lens unit having a negative refractive power, and
the focusing lens unit is disposed on the image side of the aperture stop, and moves along the optical axis at the time of focusing from an object at infinity to an object at a close distance, and the front lens unit does not include a lens which moves in an optical axial direction, and the rear lens unit does not include a lens which moves in the optical axial direction except at the time of focusing, and the rear lens unit includes an image-side lens unit having a positive refractive power, and the image-side lens unit is disposed on the image side of the focusing lens unit, and includes at least a positive lens and a negative lens, and the following conditional expressions (1) and (21) are satisfied:

$$0.06 < |f_{fo}/f| < 0.4 \quad (1)$$

$$0.023 \leq D_{sfo}/D_{LTL} \leq 0.110 \quad (21)$$

where, f denotes a focal length of the single focal length lens system at the time of focusing at an object at infinity, $f_{fo}$a denotes a focal length of the focusing lens unit, $D_{sfo}$ denotes a distance on the optical axis from the aperture stop up to a lens surface nearest to an object of the focusing lens unit, $D_{LTL}$ denotes a distance on the optical axis from a lens surface nearest to the object of the single focal length lens system up to an image plane, and both $D_{sfo}$ and $D_{LTL}$ are distances at the time of focusing at an object at infinity.

65. The single focal length lens system according to claim 64, wherein the front lens unit is disposed immediately before the aperture stop.

* * * * *